(12) United States Patent
Coles

(10) Patent No.: US 10,810,845 B2
(45) Date of Patent: Oct. 20, 2020

(54) SECURITY SYSTEM FOR DETECTING HAZARDOUS EVENTS AND OCCUPANTS IN A BUILDING

(71) Applicant: DRIFT NET, St. Charles, IL (US)

(72) Inventor: Aaron Brent Coles, St. Charles, IL (US)

(73) Assignee: DRIFT NET, St. Charles, IL (US)

( * ) Notice: Subject to any disclaimer, the term of this patent is extended or adjusted under 35 U.S.C. 154(b) by 0 days.

(21) Appl. No.: 16/740,145

(22) Filed: Jan. 10, 2020

(65) Prior Publication Data

US 2020/0226892 A1    Jul. 16, 2020

Related U.S. Application Data

(60) Provisional application No. 62/804,511, filed on Feb. 12, 2019, provisional application No. 62/796,224, (Continued)

(51) Int. Cl.
*G08B 5/38* (2006.01)
*G06Q 90/00* (2006.01)
(Continued)

(52) U.S. Cl.
CPC ............ *G08B 5/38* (2013.01); *G01S 5/22* (2013.01); *G06Q 90/205* (2013.01); (Continued)

(58) Field of Classification Search
None
See application file for complete search history.

(56) References Cited

U.S. PATENT DOCUMENTS 5,485,237 A    1/1996 Adermann et al.
5,598,456 A *  1/1997 Feinberg ............... H04M 11/04
                                         348/E7.081
(Continued)

FOREIGN PATENT DOCUMENTS

EP    2492883 A1    8/2012

OTHER PUBLICATIONS

ShotSpotter Technology <https://www.shotspotter.com/technology/> (2019).

(Continued)

*Primary Examiner* — Fekadeselassie Girma
(74) *Attorney, Agent, or Firm* — Marshall, Gerstein & Borun LLP

(57) ABSTRACT

A gunshot detection/security system for detecting dangerous events in a school or other building includes one or several pods placed throughout the building premises. Each pod includes a camera, a thermal camera, and an acoustic sensor for detecting video, images, heat signatures, and sound within a detection area for the respective pod. The sensor data is then analyzed to identify a dangerous event in the building, and provide alerts regarding the dangerous event via the pods or client computing devices of students/occupants in the building, administrators, parents, and emergency responders. A server computing device generates digital maps of the interior and exterior of the building having location information regarding the occupants of the building and a danger zone indicating the epicenter for the dangerous event.

20 Claims, 33 Drawing Sheets

Related U.S. Application Data filed on Jan. 24, 2019, provisional application No. 62/791,459, filed on Jan. 11, 2019.

(51) Int. Cl.

| | |
|---|---|
| *G08B 13/16* | (2006.01) |
| *G08B 25/00* | (2006.01) |
| *G01S 5/22* | (2006.01) |
| *G08B 13/196* | (2006.01) |
| *G08B 25/01* | (2006.01) |
| *G08B 25/14* | (2006.01) |
| *H04N 7/18* | (2006.01) |

(52) U.S. Cl.
CPC ... *G08B 13/1672* (2013.01); *G08B 13/19656* (2013.01); *G08B 13/19697* (2013.01); *G08B 25/006* (2013.01); *G08B 25/016* (2013.01); *G08B 25/14* (2013.01); *H04N 7/181* (2013.01); *H04N 7/188* (2013.01)

(56) References Cited

U.S. PATENT DOCUMENTS

| | | | |
|---|---|---|---|
| 6,648,292 B2* | 11/2003 | Flick | B60N 2/0705 248/430 |
| 7,382,244 B1* | 6/2008 | Donovan | G08B 13/19656 340/506 |
| 7,986,231 B1* | 7/2011 | Bentley | G08B 13/1672 340/540 |
| 8,036,065 B2 | 10/2011 | Baxter et al. | |
| 8,995,227 B1 | 3/2015 | Johnson | |
| 9,095,215 B1* | 8/2015 | Caruso | B60N 2/64 |
| 10,586,109 B1 | 3/2020 | Fowler et al. | |
| 2002/0006038 A1* | 1/2002 | Fladung | B25F 1/00 362/157 |
| 2003/0044021 A1* | 3/2003 | Wilkinson | G06F 1/163 381/56 |
| 2004/0140899 A1* | 7/2004 | Bouressa | G07C 9/27 340/573.1 |
| 2006/0225120 A1* | 10/2006 | Lee | H04N 21/4363 725/131 |
| 2007/0024708 A1* | 2/2007 | Lin | H04N 7/181 348/143 |
| 2009/0002157 A1* | 1/2009 | Donovan | H04N 7/18 340/540 |
| 2010/0063862 A1* | 3/2010 | Thompson | G06Q 30/0261 705/7.29 |
| 2010/0321183 A1* | 12/2010 | Donovan | H04N 5/23206 340/540 |
| 2012/0097806 A1* | 4/2012 | Matsushima | B60R 16/0215 248/73 |
| 2012/0182427 A1* | 7/2012 | Marshall | A61B 5/01 348/159 |
| 2012/0223554 A1* | 9/2012 | Lem | B60N 2/976 297/217.1 |
| 2013/0031420 A1 | 1/2013 | Haverkamp et al. | |
| 2013/0169817 A1* | 7/2013 | Jones | G08B 25/14 348/159 |
| 2013/0183924 A1* | 7/2013 | Saigh | A61K 31/198 455/404.2 |
| 2013/0314210 A1* | 11/2013 | Schoner | G08B 13/2485 340/8.1 |
| 2014/0139539 A1* | 5/2014 | Byers | G09G 5/10 345/589 |
| 2014/0240132 A1* | 8/2014 | Bychkov | A61B 5/18 340/576 |
| 2014/0266700 A1* | 9/2014 | Reske | G08B 13/19684 340/539.13 |
| 2015/0085133 A1 | 3/2015 | Teich et al. | |
| 2015/0175172 A1* | 6/2015 | Truong | G06F 3/017 701/36 |
| 2015/0197173 A1* | 7/2015 | Hulway | B60N 2/646 297/284.9 |
| 2015/0281774 A1* | 10/2015 | Atkin | H04N 21/64322 725/14 |
| 2016/0049064 A1* | 2/2016 | McNabb | G08B 21/10 340/540 |
| 2016/0093176 A1* | 3/2016 | Sharma | G08B 5/00 340/541 |
| 2016/0344745 A1* | 11/2016 | Johnson | H04L 63/08 |
| 2017/0089968 A1* | 3/2017 | Bagul | G01R 29/10 |
| 2017/0173203 A1* | 6/2017 | Becker | A61L 9/14 |
| 2017/0181470 A1* | 6/2017 | Li | A24B 7/04 |
| 2018/0036448 A1* | 2/2018 | Becker | A61L 9/04 |
| 2018/0262388 A1* | 9/2018 | Johnson | H04L 63/0823 |
| 2018/0309786 A1* | 10/2018 | Apelewicz | H04L 9/0861 |
| 2019/0145648 A1* | 5/2019 | Sinha | G05D 23/1917 219/482 |
| 2019/0156259 A1* | 5/2019 | Cedilnik | G06Q 10/06313 |
| 2019/0164413 A1* | 5/2019 | Allen | G08B 25/016 |
| 2019/0168036 A1* | 6/2019 | Conboy | A62C 3/0242 |
| 2019/0258879 A1* | 8/2019 | Vachhani | G06K 9/00362 |
| 2019/0308049 A1* | 10/2019 | O'Donnell | A62C 99/0081 |
| 2019/0320515 A1* | 10/2019 | Sadwick | H05B 47/11 |
| 2019/0327135 A1* | 10/2019 | Johnson | H04L 67/34 |
| 2019/0347368 A1* | 11/2019 | Duff | G06Q 10/06 |
| 2019/0360714 A1* | 11/2019 | Konrad | F24F 11/88 |

OTHER PUBLICATIONS

U.S. Appl. No. 16/740,124, filed Jan. 10, 2020.
Search Report and Written Opinion for International application No. PCT/US2020/013140, dated Jun. 25, 2020.

* cited by examiner

SECURITY SYSTEM FOR DETECTING HAZARDOUS EVENTS AND OCCUPANTS IN A BUILDING

CROSS-REFERENCE TO RELATED APPLICATIONS

This application claims the benefit of priority under 35 U.S.C. § 119 of (1) U.S. Provisional Patent Application No. 62/791,459, entitled "Security System for Detecting Gunshots and Locating an Active Shooter and Occupants in a Building," filed Jan. 11, 2019, (2) U.S. Provisional Patent Application No. 62/796,224, entitled "Security System for Detecting Gunshots and Locating an Active Shooter and Occupants in a Building" filed Jan. 24, 2019, and (3) U.S. Provisional Patent Application No. 62/804,511 entitled "Security System for Detecting Gunshots and Locating an Active Shooter and Occupants in a Building," filed Feb. 12, 2019, the disclosure of each of which is hereby expressly incorporated by reference herein in its entirety.

FIELD OF THE DISCLOSURE

The present disclosure relates to security systems and more particularly, to a security system for identifying occupants in a building during a dangerous event.

BACKGROUND

In recent years, there has been a significant increase in the number of mass shootings and the number of injuries and fatalities caused by these mass shootings. When a mass shooting occurs in a school or other building, emergency responders such as police officers may be alerted of the mass shooting and may be provided with the name of the school or name of the building in which the shooting takes place. However, typically the police officers are not made aware of the location of the shooter within the building or the locations of other occupants relative to the shooter. Accordingly, police officers enter a building with little information regarding the whereabouts of the shooter or the whereabouts of other occupants who need to be evacuated from the building. Other emergency responders such as paramedics are also unaware of the locations of injured occupants who require immediate attention and may be suffering from life-threatening injuries.

Furthermore, many occupants in the building such as students and teachers are unaware of the location of the shooter within the building. As a result, they do not know whether they need to hide or can safely exit the building and/or which exits are safe.

Additionally, other dangerous events may occur in a building such as fires, gas leaks, water leaks, weapons, suspicious bags which may contain weapons, fights, vandalism, etc. While current systems may be used to alert occupants of some types of dangerous events such as a fire, the current systems require manual input such as pulling a fire alarm. Additionally, the current systems do not provide occupants and emergency responders with the precise location of a dangerous event, with escape routes for safely evacuating the building, and/or with the locations of injured occupants who require immediate attention.

SUMMARY OF THE DISCLOSURE

To locate a shooter and other occupants in a building during a dangerous event, a gunshot detection system includes several pods installed or dispersed at various locations throughout the interior and/or exterior of a building, such as a school, airport, office building, hospital, shopping mall, sports complex, retail store, department store, train station, food court, place of worship, etc. For example, a pod may be installed in each room within the building and several pods may be installed throughout a hallway. Pods may also be installed on light poles, the roof of the building, or other structures on the building premises exterior to the building. A pod is a multi-sensor device including several sensors collecting data from the same detection area. Each of the pods may include a camera, a thermal camera, and an acoustic sensor to detect image data, heat signatures, and sound data, respectively, in the detection area for the pod. For example, when the pod is installed within a room of the building, the detection area for the pod may span the area of the room. Additionally, each of the pods may also include a communication interface having long-range and short-range communication links, a speaker, a microphone, and/or a gas sensor.

The sensor data collected at a pod is then analyzed by a computing device within the pod to detect dangerous events such as gunshots, gas leaks or other airborne contaminants, water leaks, fires, weapons, suspicious bags which may contain weapons, fights, vandalism, and/or other events in the building which may cause harm or bodily injury to occupants. When a dangerous event is detected in the building, the computing device further analyzes the sensor data to identify the location of a shooter, the type of weapon used, the number of rounds fired, and locations of other occupants in the building. Using this information received from the pods 100, along with additional information previously stored (e.g., floor plans, map displays, etc.), the computing device in the pod or a server computing device may generate a two-dimensional (2D) or three-dimensional (3D) map display of the building including a display of each of the rooms in the building, indications of entrances and exits to and from the building, indications of the number of occupants in various rooms within the building and/or the movements of the occupants, and an indication of a danger zone or a dangerous person or object based on the location of the shooter, the type of weapon being fired, and the number of rounds that have been fired.

The server computing device may also generate audio alerts or messages and provide the audio alerts or messages to the pods to be presented via the speakers. In some embodiments, the audio alerts or messages are generated specifically for a particular detection area, and the server computing device may provide the audio alert or message to the pod corresponding to the particular detection area. For example, the server computing device may generate a first audio alert for pods having detection areas outside of the danger zone. The first audio alert may indicate that there is an active shooter in the building and may instruct occupants to exit from the nearest exit. The first audio alert may also provide a description of the nearest exit, such as the science wing doorway. The server computing device may also generate a second audio alert for pods having detection areas in the danger zone. The second audio alert may indicate that there is an active shooter nearby and may instruct occupants in the danger zone to lock all doors and hide.

The server computing device may provide the map display to client computing devices of occupants in the building, such as students and teachers. The server computing device may also provide the map display to school administrators and emergency responders, such as police officers, fire fighters, paramedics, etc. Additionally, the server computing device may provide alerts to client computing devices of parents or other relatives of the occupants.

In an embodiment, a security system comprises a multi-sensor device including a camera configured to capture images within a detection area of the security system, a thermal camera configured to detect heat signatures from objects within the detection area, and an acoustic sensor configured to detect sound within the detection area. The security system also includes a computing device including one or more processors and a non-transitory computer-readable memory coupled to the one or more processors and storing instructions thereon. When executed by the one or more processors, the instructions cause the computing device to receive image data, heat signatures, and sound data from the camera, the thermal camera, and the acoustic sensor, respectively, analyze the image data, heat signatures, and sound data to identify a dangerous event at the detection area, and provide an alert indicating the dangerous event at the detection area.

In another embodiment, a gunshot detection system comprises an acoustic sensor configured to detect sound within a detection area of the gunshot detection system, and a thermal camera configured to detect heat signatures from objects within the detection area, where a gunshot is detected in response to detecting a heat signature above a threshold temperature and a sound within a threshold noise level range.

BRIEF DESCRIPTION OF THE DRAWINGS

The following detailed description will be more easily and better understood when considered in conjunction with the following figures, in which like reference numbers are employed to designate like structures. It should be understood that, with the exception of magnified images, the drawings are not to scale, as scaled drawings would not facilitate an understanding of the depicted structures.

DETAILED DESCRIPTION

Pod Hardware

Figure 1:
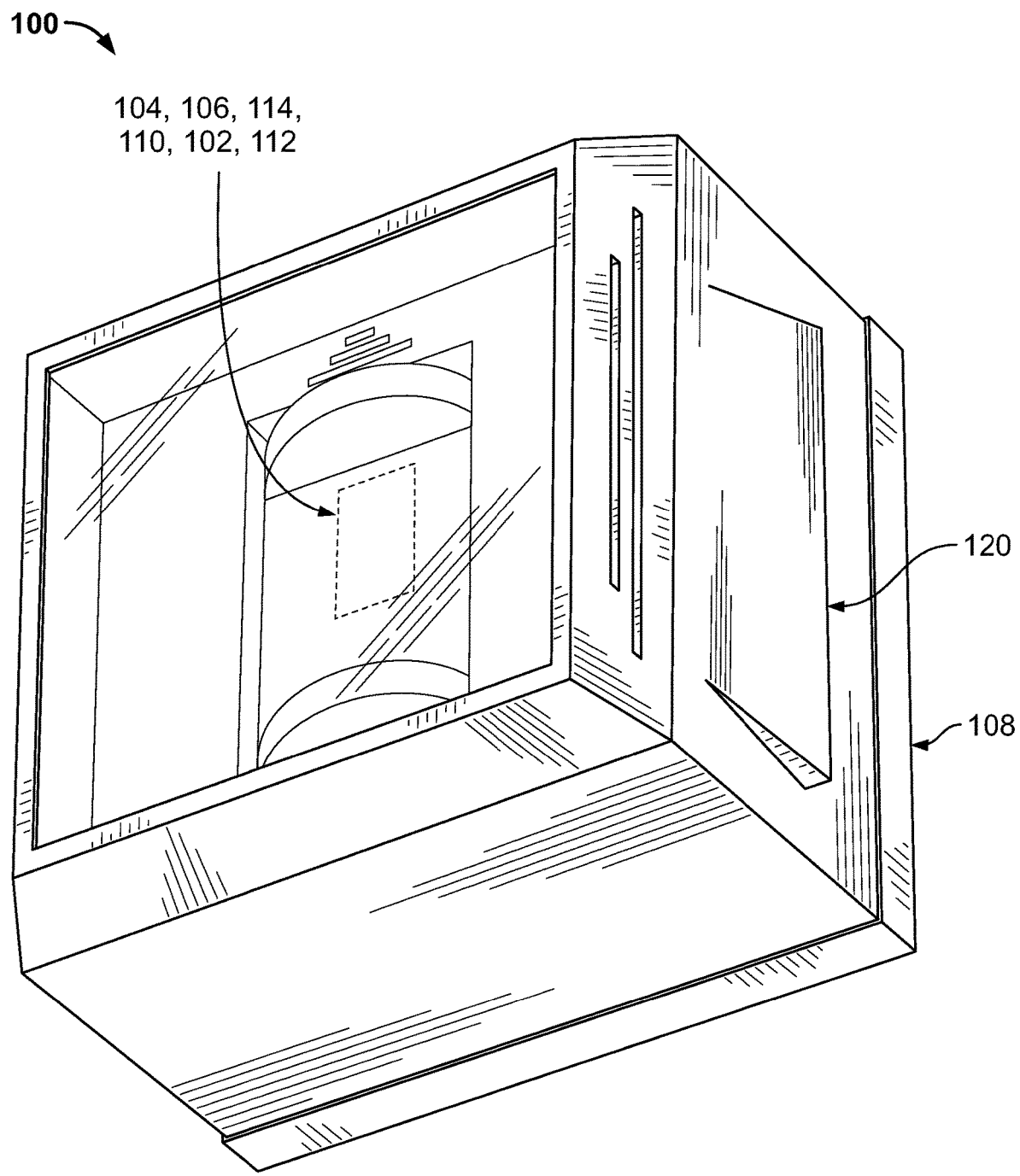
FIG. 1 illustrates an example pod installed within building premises implementing the gunshot detection system.
Figure 2A:
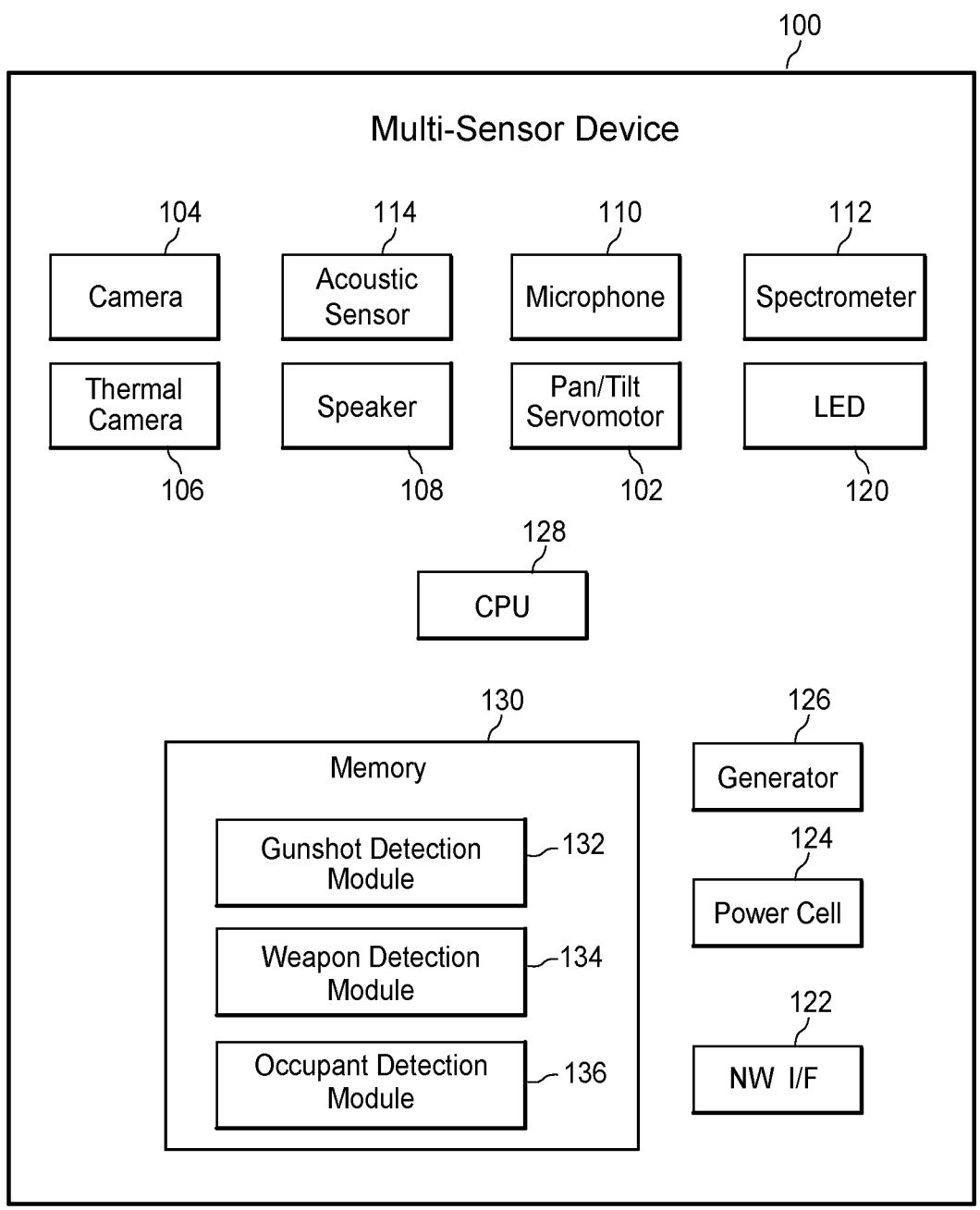
FIG. 2A illustrates a block diagram of an example pod.

Referring to FIGS. 1 and 2A, FIG. 1 illustrates an embodiment of an example housing of a pod 100 (also referred to herein as a "multi-sensor device"). FIG. 2A is a block diagram of example elements which may be included in the pod 100. As shown in FIGS. 1 and 2A, the pod 100 includes a high-definition imaging camera 104 (also referred to herein as a "camera"), a thermal camera 106, an acoustic sensor 114, a speaker 108, a microphone 110, a gas sensor 112, one or more light emitting elements 120 such as a light emitting diode (LED), a communication interface 122, and pan and tilt servomotors 102. As used herein, thermal imaging cameras capturing infrared light in the infrared spectrum may be referred to as "thermal cameras" and the term "camera" or "imaging camera" may be used to refer to a high-definition or high-speed imaging camera capturing images in the visible light spectrum.

The pan and tilt servomotors 102 may be configured to control the camera 104 and/or the thermal camera 106 so that the camera 104 and/or the thermal camera 106 may rotate side-to-side and up and down. In some embodiments, when an object is detected within the detection area of the pod 100 such as an occupant, a visitor, a shooter, a weapon, a fire, etc., the pan and tilt servomotors 102 may control the camera 104 and/or the thermal camera 106 to track the movement of the object. In some embodiments, the camera 104 and/or the thermal camera 106 may be controlled manually be sending signals from a client computing device of a building administrator or a server computing device to the pan and tilt servomotors 102. For example, the building administrator may be monitoring a live video feed from the camera 104 and may control the camera 104 to view objects within or near the detection area of the pod 100.

The light emitting elements 120 may illuminate a surface on which the pod 100 is mounted, such as a wall or may illuminate a surface adjacent to the surface on which the pod 100 is mounted. In some embodiments, as shown in FIG. 1, the light emitting elements 120 may be placed on a portion of a surface of the pod 100, where the portion is moveable and is configured to pivot from a position parallel to the surface of the pod 100 to protrude outward away from the surface. The portion is also configured to retract to the position parallel to the surface of the pod 100. The portion may be configured to protrude and retract automatically for example, via a motor which may be controlled by a computing device in the pod 100, or manually, such as by a user pressing on the portion.

In some embodiments, the speaker 108 is placed on the back surface of the pod 100 which may be facing a wall, such that the wall may be used as a resonance board to amplify the sound from the speaker 108. This configuration may amplify the sound from the speaker 108 by about 10 decibels (dB). Like the light emitting elements 120, in some embodiments, the speaker 108 may be placed on a portion of a surface of the pod 100, where the portion is moveable and is configured to pivot from a position parallel to the surface of the pod 100 to protrude outward away from the surface. The portion is also configured to retract to the position parallel to the surface of the pod 100. The portion may be configured to protrude and retract automatically for example, via a motor which may be controlled by a computing device in the pod 100, or manually, such as by a user pressing on the portion. The speaker 108 and the light emitting elements 120 may be placed on the same portions of the same surfaces of the pod 100 or may be placed on different portions and/or different surfaces of the pod 100.

The pod 100 may also include a computing device having one or more processors 128 and a memory 130 to process the data received from the sensors 104-120. The processor(s) 128 may be a specially programmed general processing unit. In other embodiments, the processor(s) 128 may be a specially programmed field programmable gate array (FPGA), an application-specific integrated circuit (ASIC)), etc. The memory 130 can be a non-transitory memory and can include one or several suitable memory modules, such as random access memory (RAM), read-only memory (ROM), flash memory, other types of persistent memory, etc. The memory 130 stores instructions executable on the processors 128 that make up a gunshot detection module 132 for detecting a gunshot within a detection area of the pod 100, a weapon detection module 134 for detecting a weapon within the detection area for the pod 100, and an occupant detection module 136 for detecting the number of occupants within the detection area for the pod 100, and/or the precise locations of the occupants within the detection area. The gunshot detection module 132, weapon detection module 134, and occupant detection module 136 are described in more detail below.

In some embodiments, the pod 100 is encased in bulletproof material such as Kevlar® infused plastic or another material with significant heat and impact resistance to prevent the pod 100 from being damaged during a shooting. The bulletproof material may be attached to the pod 100 via one or more fasteners, such as screws, nuts, bolts, pins, rivets, etc.

In some embodiments, the pod 100 includes a sensor communicatively coupled to one or more of the fasteners that is configured to detect whether the respective fastener has been removed or tampered with in any way. If the fastener has been tampered with, the computing device in the pod 100 may activate the LEDs and cause them to blink. For example, the LEDs may blink in a red color signaling an alarm. Additionally, the computing device in the pod 100 may transmit an alert to an administrator indicating that the pod 100 has been tampered with.

Also in some embodiments, the pod 100 is powered via a rechargeable power cell 124 included within the housing of the pod, such as a 2600 mAh rechargeable power bank. Accordingly, the high-definition imaging camera 104, thermal camera 106, acoustic sensor 114, speaker 108, microphone 110, gas sensor 112, and communication interface 122 may receive power via the rechargeable power cell 124.

Rechargeable Power Cell

The pod 100 may also reuse energy by including one or several generators 126 within the pod housing which are rotated (e.g., at 3600 rpm) to provide additional power that is used to recharge the power cell 124 while the power cell 124 is in use. In this manner, each pod 100 does not need extra wires to receive power from an electrical outlet.

Figure 2B:
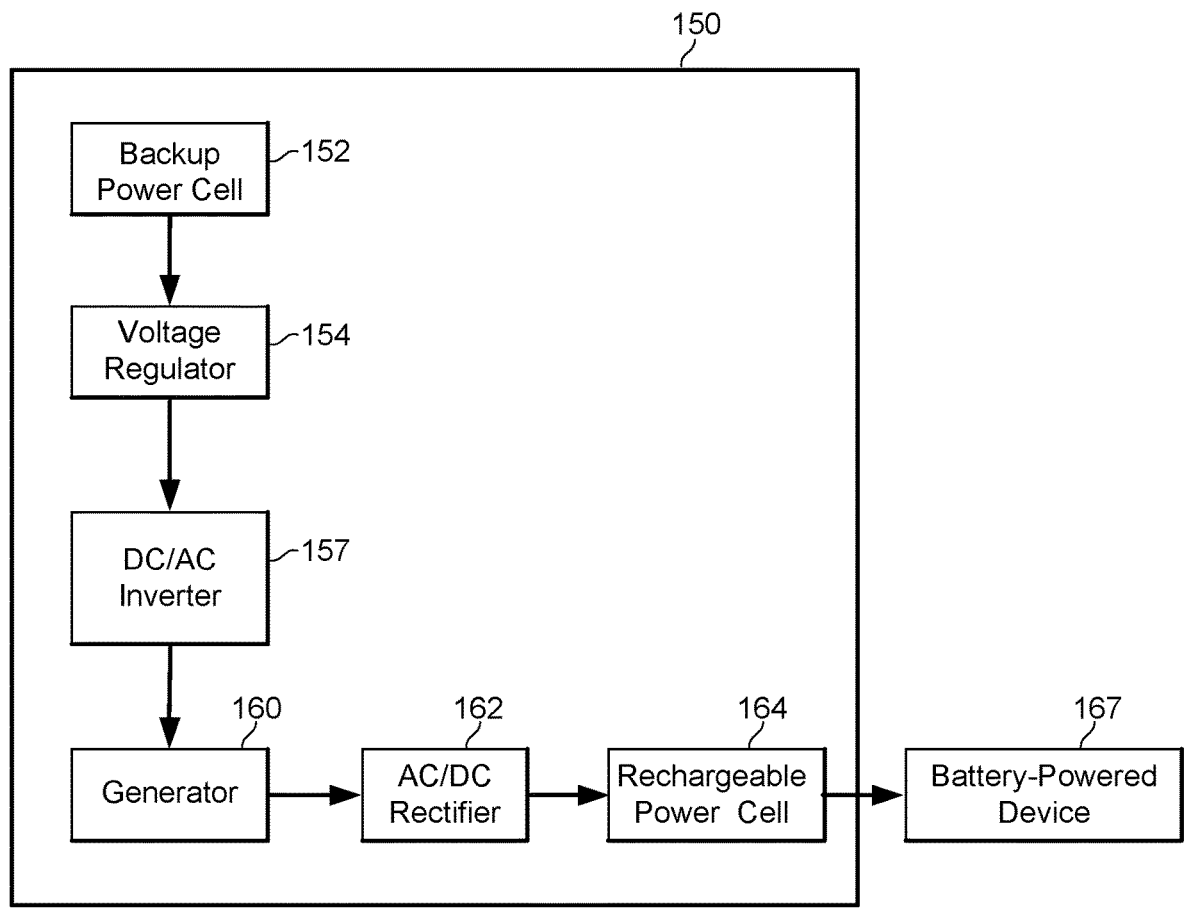
FIG. 2B illustrates a block diagram of an example recharging system for recharging a rechargeable battery.

FIG. 2B is a block diagram of a recharging system 150 for recharging a rechargeable battery 164. The rechargeable battery 164 may be used to power a resistive load/battery-powered device 167 such as the pod 100 of FIG. 1. The system 150 includes a backup battery 152 that provides DC electrical power to a voltage regulator 154. The voltage regulator 154 further provides the regulated DC power to a DC to AC power inverter 157. The voltage regulator 154 ensures that the DC voltage provided to the DC to AC power inverter 157 is within a certain voltage range. For example, it may be desirable for the DC voltage provided to the DC to AC power inverter 157 to be 3±0.5 V, 3±0.2 V, 3±0.1 V, 3±0.05 V, 3±0.01 V, or another voltage range or tolerance as required by the DC to AC power inverter 157.

In some embodiments, the voltage regulator 154 may be a low-dropout (LDO) linear voltage regulator that can regulate a DC output voltage when the input voltage to the regulator 154 is very close to the output voltage of the regulator 154. Employing an LDO regulator as the regulator 154 may reduce electrical switching noise, reduce the form factor of the system 150, and simplify the design of the system 150.

The DC to AC power inverter 157 converts the DC power to AC power, and provides AC power to a generator 160. The generator 160 generates AC electrical power at higher voltages than the DC power provided by the backup battery 152. The AC power generated by the generator 160 is provided to an AC to DC rectifier 162, and the AC to DC rectifier 162 converts the generated AC power to DC power. The AC to DC rectifier 162 provides the DC power to the rechargeable battery 164 to recharge the rechargeable battery 164. The power provided by the backup battery 152, in cooperation with the other elements of the system 150 of FIG. 2B, enable recharging of the rechargeable battery 164, to provide power to the device 167.

In some embodiments, the system 150 may be configured to selectively provide power to the rechargeable battery 164 to recharge the rechargeable battery 164. For example, the system 150 may initiate recharging of the rechargeable battery 164 when the voltage of the rechargeable battery 164 has reached a threshold value. For example, if the device 167 requires 3V to operate, the system 150 may be configured to provide power to the rechargeable battery 164 when the voltage of the rechargeable battery 164 reaches a voltage value below 3.1 V, 3.2 V, 3.5 V or another voltage threshold value. In some embodiments, the voltage threshold value for selectively providing power to the rechargeable battery 164 may depend on the voltage required for operation of the device 167, a rate of discharge of the voltage from the rechargeable battery 164, a rate of recharge of the rechargeable battery 164, another factor associated with discharging or recharging of the rechargeable battery 164, and/or another factor associated with operation of the device 167. In some embodiments, the system 150 of FIG. 2B may include other components such as a controller or processor for determining when to provide power to the rechargeable battery 164, and controlling the selective recharging of the rechargeable battery 164.

In some embodiments, the rechargeable battery 164 and/or the backup battery 152 may be a battery with multiple battery cells. For example, the rechargeable battery 164 and/or the backup battery 152 may each be 7.4 V batteries with a first and second 3.7 V battery cell. In embodiments where the rechargeable battery 164 has first and second battery cells, the system 150 may be configured to selectively provide power from the first or second battery cell to the device 167. The system 150 may provide power to the device 167 from the first or second battery cell based on a voltage threshold of the first or second battery cell.

Figure 2C:
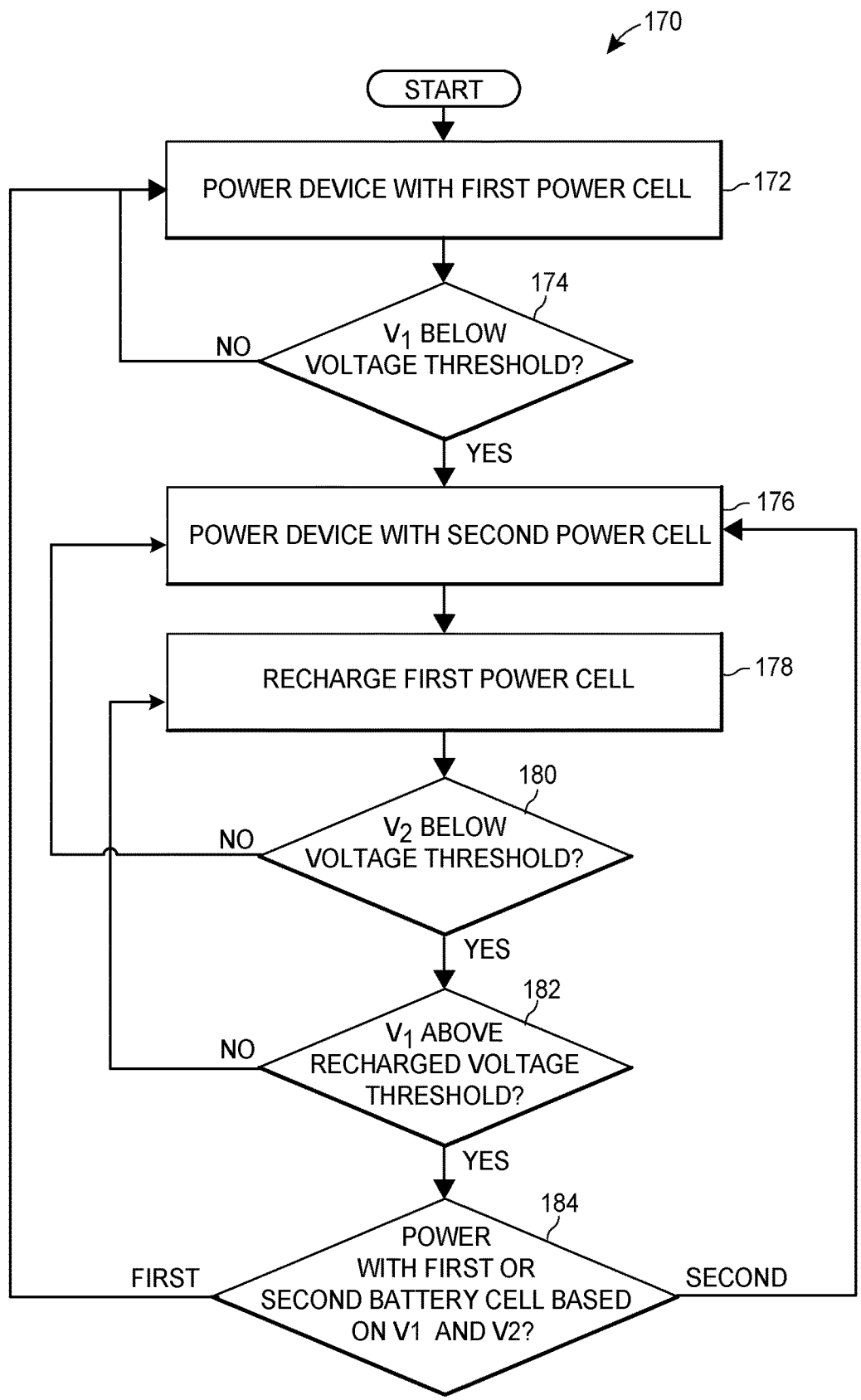
FIG. 2C is a flow diagram of an example method for recharging the rechargeable battery which can be implemented in a processor or controller communicatively coupled to the rechargeable battery.

FIG. 2C is a flow diagram of a method 170 for recharging the rechargeable battery 164 having multiple battery cells. In some embodiments, a processor or controller communicatively coupled to the rechargeable battery 164 may execute the method 170 and/or the method may be executed by the rechargeable battery 164. While the method 170 is discussed with reference to a first and second battery cell of a rechargeable battery, a rechargeable battery 164 and a backup battery 152 may also be used to execute the method.

At block 172, the first battery cell of the rechargeable battery 164 may provide power to the device 167 until the voltage of the first battery cell reaches a threshold value (e.g., 3 V, 3.1 V, 3.2 V, etc.). Then at block 174, the processor or controller may evaluate whether the first battery cell has reached a voltage threshold. If the voltage threshold has not been reached, then the first battery cell may continue to provide power to the device 167. If at block 174 it is determined that the first battery cell has reached the voltage threshold, then the processor or controller may provide the device 167 with power from the second battery cell of the rechargeable battery 164.

At block 178, the processor or controller may recharge the first battery cell of the rechargeable battery 164 while simultaneously, at block 176, providing power to the device 167 from the second cell of the rechargeable battery 164. At block 182, the processor or controller may determine whether the first battery cell has recharged to a recharged voltage threshold, and at block 180, the processor or controller may determine whether the second battery cell has reached a voltage threshold. At block 184, the processor or controller may determine whether to power the device 167 from the first or second battery cell based on the determinations from blocks 180 and 182.

Then at block 172, the processor or controller may provide power to the device 167 from the recharged first battery cell of the rechargeable battery 164 when the voltage of the second battery cell reaches a threshold (e.g., 3 V, 3.1 V, 3.2 V, etc.), and/or when the first cell reaches a recharged voltage threshold (e.g., 3.2 V, 3.3 V, 3.4 V, 3.7 V, etc.). By selectively powering the device 167 from a first or second battery cell, and selectively recharging the first or second battery cells of the rechargeable battery 164, the present embodiments advantageously allow for continuous and/or extended operation of the device 167 due to the extended battery lifetime of the rechargeable battery 164 and the rechargeable battery cells.

Imaging Camera

The imaging camera 104 may be a high definition camera (e.g., a 1080p camera, an 8 megapixel camera, etc.) and is configured to detect visible light images and video within a detection area of the pod. For example, each pod 100 within a building may have a detection area that spans a portion of the building. More specifically, when a pod 100 is installed in a room of the building, the pod 100 may be installed in a corner of the room, such that the detection area for the pod 100 is the entire room and the images detected by the imaging camera 104 cover the entire room. When a pod 100 is installed in a hallway, the detection area for the pod 100 may be a rectangular area covering a portion of the hallway, such as the entire width of the hallway but a portion of the length of the hallway. Accordingly, in the aggregate the pods 100 may be installed such that the respective detection areas for the pods 100 cover the area of the entire building. The layout of the pods 100 within a building and the respective detection areas for each pod is described in more detail below with reference to FIG. 3. In some embodiments, the imaging camera 104 may include several imaging cameras, such as a dual camera, which may be used to detect depth information. In any event, images may be detected continuously or periodically (e.g., 10 frames per second, 60 frames per second, 120 frames per second, etc.) and then provided to a server computing device or the computing device within the pod 100 for further processing as described in more detail below.

High-Resolution Thermal Camera

The thermal camera 106 may be a high-contrast thermal camera (e.g., a thermal camera having more than a threshold number of pixels such as a 300,000 pixel thermal camera) and is configured to detect infrared (IR) light within the detection area of the pod 100 to generate heat signatures from objects within the detection area. IR images may be detected continuously or periodically (e.g., 10 frames per second, 60 frames per second, 120 frames per second, etc.) and then provided to a server computing device or the computing device within the pod 100 for further processing as described in more detail below. In other embodiments, the computing device within the pod 100 analyzes the visible light images and IR images.

In some embodiments, the imaging camera 104 and the thermal camera 106 are the same camera and/or the imaging camera 104 and the thermal camera 106 share the same lens. In other embodiments, the imaging camera 104 and the thermal camera are different cameras and/or the imaging camera 104 and the thermal camera 106 include separate lenses.

In some embodiments, the server computing device or the computing device 128 within the pod 100 (e.g., the occupant detection module 136) analyzes the visible light images and IR images over the same time period (e.g., over the previous second, over the previous ten seconds, etc.) to identify objects, such as people in the detection area. To identify a person, the server computing device or the computing device 128 within the pod 100 compares temperature data or heat signatures from the IR images to a threshold body temperature range corresponding to a human (e.g., 92° F./33° C.-112° F./44° C.). If a portion of each image includes temperatures within the threshold body temperature range, the server computing device or the computing device 128 within the pod 100 analyzes the same portion (also referred to herein as an "object") of the visible light images and identifies features of the object within the visible light images, such as the geometry of the edges of the object, and RGB pixel values or colors within the object.

The features of the object may also include facial features such as the geometry and RGB pixel values or colors for eyes, a mouth, and a nose. Additionally, the features of the object may include body features such as the geometry and RGB pixel values or colors for heads, arms, legs, etc. These features may be identified by detecting stable regions within the object that are detectable regardless of blur, motion, distortion, orientation, illumination, scaling, and/or other changes in camera perspective. The stable regions may be extracted from the object using a scale-invariant feature transform (SIFT), speeded up robust features (SURF), fast retina keypoint (FREAK), binary robust invariant scalable keypoints (BRISK), or any other suitable computer vision techniques. In some embodiments, keypoints may be located at high-contrast regions of the object, such as edges within the object. A bounding box may be formed around a keypoint and the portion of the object created by the bounding box may be a feature.

In any event, the server computing device or the computing device 128 within the pod 100 may compare the features identified for the object to features from template objects (also referred to herein as "template features") using image classification and/or machine learning techniques, where at least some of the template objects represent a person. The machine learning techniques may include linear regression, polynomial regression, logistic regression, random forests, boosting, nearest neighbors, Bayesian networks, neural networks, support vector machines, or any other suitable machine learning technique. For example, the widths and heights of people may be stored as template features along with skin tones for people, the widths and heights of noses, mouths, eyes, and their respective positions relative to each other. The template objects may also include other representations which are not of humans, such as representations of computers, other electronic devices, heaters, etc., which may also generate heat detected by the thermal camera 106 and/or which may be within the threshold body temperature range. Then each of these template features may be compared to the features for an object.

In some embodiments, the template features may be compared to the features for an object using a nearest neighbors algorithm. The nearest neighbors algorithm may identify template features which are the closest to the features of the object by creating numerical representations of the features to generate feature vectors, such as a pixel width and height of a nose, RGB pixel values for the nose, and pixel distances from the edges of the face to the top, bottom, and sides of the nose, for example. The numerical representations of the features or feature vectors of the object may be compared to the feature vectors of template objects to determine a vector distance between the features of the object and each template object. The server computing device or the computing device 128 within the pod 100 may then determine whether the object is a human based on the amount of similarity, or the vector distance in the nearest neighbors algorithm, between the features for the object and the features for template objects that represent a human. If the closest template objects represent a human and the temperature data from the IR images is within the threshold body temperature range, the object is identified as a human.

The server computing device or the computing device 128 within the pod 100 (e.g., the weapon detection module 134) may also analyze visible light images using image classification and/or machine learning techniques to identify a weapon in the building premises or a suspicious bag which may contain a weapon (e.g., a rifle bag). Weapons may include firearms such as rifles, pistols, handguns, automatic weapons, etc., knives, or other dangerous objects. Weapons may also include other objects which are not designed as weapons but may be used in a dangerous manner to cause harm, such as baseball bats, hammers, etc. Weapons may be identified before a gunshot is fired/detected. For example, the server computing device or the computing device 128 within the pod 100 may obtain template objects representing guns and other weapons and may identify features from these template objects. When the server computing device or the computing device 128 within the pod 100 obtains an image detected by the imaging camera 104, the server computing device or the computing device 128 within the pod 100 may identify features of the image using the techniques described above, such as SIFT, SURF, FREAK, BRISK, or any other suitable computer vision techniques. The features of the image may be compared to the template features of template objects representing weapons. The server computing device may then determine whether the image includes a weapon based on the amount of similarity, or the vector distance in the nearest neighbors algorithm, between the features of the image and the features for template objects that represent a weapon. In other embodiments, the computing device 128 within the pod 100 performs the analysis described above to identify objects, such as people or weapons in the detection area. In this manner, weapons may be identified by the pods 100 without requiring metal detectors.

The weapon detection module 134 or the server computing device may also identify a weapon based on temperature data from the thermal camera 106. To identify the weapon, the weapon detection module 134 or the server computing device identifies an occupant in the detection area in the manner described above, by comparing temperature data or heat signatures from the IR images to a threshold body temperature range corresponding to a human (e.g., 92° F./33° C.-112°) F/44° to identify an object including temperatures within the threshold body temperature range, and comparing features of the object to features from template objects using image classification and/or machine learning techniques, where at least some of the template objects represent a person.

In response to identifying a person, the weapon detection module 134 or the server computing device may identify a weapon attached to the person, such as a weapon being carried by the person or attached to the person's clothing based on differences in temperature data within the object corresponding to the person. More specifically, the weapon detection module 134 or the server computing device may identify a portion of the object which includes temperatures outside of the body temperature range to generate a heat signature. For example, each image of a person may include several contiguous portions which are outside of the body temperature range. The weapon detection module 134 or the server computing device may generate a heat signature for each contiguous portion. The weapon detection module 134 or the server computing device may then identify features of each heat signature, such as the geometry of the edges of the heat signature, a pixel width and height of the heat signature, etc. The features of each heat signature may be compared to template features of template objects representing weapons. The weapon detection module 134 or the server computing device may then determine whether each heat signature corresponds to a weapon (e.g., whether the heat signature is in the shape of a weapon) based on the amount of similarity, or the vector distance in the nearest neighbors algorithm, between the features of each heat signature and the features for template objects that represent a weapon.

Additionally or alternatively, the weapon detection module 134 or the server computing device may identify a weapon based on any suitable combination of an analysis of visible light images and thermal images. For example, the weapon detection module 134 or the server computing device may determine that a heat signature corresponds to a weapon based on an analysis of a thermal image. The weapon detection module 134 or the server computing device may then verify that the person has a weapon by analyzing the same portion of a visible light image as the portion of the thermal image that includes the heat signature.

Turning back to the pod, the acoustic sensor 114 is configured to detect sound within the detection area of the pod 100. The sound detected by the acoustic sensor 114 may be a noise level measured in decibels (dB). Sound data may be collected continuously, periodically (e.g., every second, every minute, 10 times per second, 60 times period second, 100 times period second, etc.), or for periods when the noise level exceeds a threshold noise level (e.g., 50 dB). Then the sound data is provided to a server computing device or the computing device within the pod 100 for further processing as described in more detail below.

In some embodiments, the computing device 128 in each pod 100 performs an analysis of the sensor data within the detection area of the pod 100 to for example, identify a dangerous event within the detection area, identify the location of a shooter within the detection area, identify the type of weapon used, identify the number of rounds fired, identify the number of occupants within the detection area, identify the locations of the occupants within the detection area, etc. The computing device 128 in each pod 100 then provides these interpretations of the sensor data to the server computing device which uses the data from the detection area of each pod 100 to generate data regarding larger areas, such as the exterior of the building, the interior of the building, a floor of the building, etc. This data may include a representation of a danger zone for the dangerous event, indoor or outdoor map data including indications of the locations of the occupants within an indoor or outdoor map of the building, a representation of a route to a safe exit from the building, a representation of a recommended entrance to the building for an emergency responder to enter, etc. In other embodiments, the sensor data, the interpretations of the sensor data, and the representations of the sensor data may be analyzed and/or generated by the computing device 128 in a pod 100, the server computing device, or any suitable combination of these devices.

Gunshot Detection System

In some embodiments, the server computing device, the computing device 128 within the pod 100, or a gunshot detection system or module within the server computing device or the computing device 128 within the pod 100, analyzes the sound data and IR images over the same time period (e.g., over the previous second, over the previous ten seconds, etc.) to identify a gunshot. More specifically, to identify a gunshot the server computing device or the computing device 128 within the pod 100 (e.g., the gunshot detection module 132) compares the noise level from the sound data during a particular time period to a threshold noise level range indicative of a gunshot (e.g., 140-190 dB). If the noise level during the particular time period is within the threshold noise level range, the server computing device or the computing device 128 within the pod 100 compares temperature data from the IR images during the same time period to a threshold explosion temperature indicative of a blast from a bullet exiting the barrel of a gun (e.g., 200° C.). If the IR images during the same time period include temperatures or heat signatures exceeding the threshold explosion temperature and the sound data includes a noise level within the threshold noise level range, the server computing device or the computing device 128 within the pod 100 identifies a gunshot within the building.

In some embodiments, the server computing device or the computing device 128 within the pod 100 may also compare a change in temperature during the particular time period to a threshold change in temperature to identify a gunshot. For example, the blast created by firing the bullet may cause a sudden increase in temperature and then the heat from the blast may quickly dissipate upon the bullet leaving the barrel. These rapid changes in temperature may be compared to threshold temperature changes to identify the gunshot.

In some embodiments, the server computing device, the computing device 128 within the pod 100, or the gunshot detection system or module within the server computing device or the computing device 128 within the pod 100 identifies a gunshot when the IR images include temperatures or heat signatures exceeding the threshold explosion temperature before the noise level is within the threshold noise level range, because light travels faster than sound. Accordingly, the server computing device or the computing device 128 within the pod 100 may detect the gunshot when the threshold noise level is detected at least a threshold time offset after the threshold explosion temperature. In other embodiments, the computing device 128 within the pod 100, and more specifically, the gunshot detection module 132, performs the analysis described above to identify a gunshot in the detection area.

In addition to identifying the gunshot, the server computing device or the computing device 128 within the pod 100 may analyze sound data from the acoustic sensor 114 and/or temperature data from the thermal camera 106 to identify the type of weapon and the number of rounds fired. The server computing device or the computing device within the pod 100 may identify the number of rounds fired based on the number of times the noise level from the sound data reaches the threshold noise level range. More specifically, the server computing device or the computing device within the pod 100 may identify an additional round has been fired each time the noise level from the sound data decreases from the threshold noise level range below a second threshold noise level and then increases once again to the threshold noise level range. The server computing device or the computing device within the pod 100 may identify the type of weapon based on the frequency in which rounds are fired (e.g., when the frequency exceeds a threshold frequency, the weapon may be an automatic weapon) and/or the number of rounds fired, the particular noise level within the noise level range associated with each blast (e.g., the noise level for a rifle may be 140 dB while the noise level for a pistol may be 175 dB), the temperature of the blast, and/or other sensor data characteristics such as visual characteristics of the weapon determined by analyzing the visible light images.

In some embodiments, the server computing device or the computing device 128 within the pod 100 obtains characteristics of several types of weapons and compares the characteristics of each type of weapon to the characteristics of the weapon that was fired. The server computing device or the computing device within the pod 100 then identifies the type of weapon as the type having matching characteristics to the characteristics of the weapon that was fired. In other embodiments, the type of weapon is identified using machine learning techniques, such as random forests, boosting, nearest neighbors, Bayesian networks, neural networks, support vector machines, etc.

Moreover, the server computing device or the computing device 128 within the pod 100 may analyze the temperature data from the thermal camera 106 to identify the trajectory of the projectile fired from the weapon. The server computing device or the computing device 128 within the pod 100 may perform a frame-by-frame analysis of the IR images to detect changes in the position of the projectile over time based on the portion of each IR image having a heat signature exceeding the threshold explosion temperature range. The server computing device or the computing device 128 within the pod 100 may then determine the trajectory of the projectile based on the changes in the position of the projectile over time from the frame-by-frame analysis. In this manner, the server computing device or the computing device 128 within the pod 100 may alert an administrator or emergency responders of the direction in which the projectiles are being fired. The pods 100 may also announce the direction in which the projectiles are being fired from the speakers 108.

Furthermore, the server computing device or the computing device 128 within the pod 100 determines the location of the gunshot based on the pod 100 that captured the sound data and IR images indicative of a gunshot. The locations of each pod 100 within the building may be stored within a database. The server computing device or the computing device 128 within the pod 100 may retrieve the location for the pod 100 that captured the sound data and IR images to identify the location of the gunshot. The server computing device or the computing device 128 within the pod 100 then determines the location of the shooter based on the location of the gunshot and may track the location of the shooter to provide real-time updates on the shooter's location. More specifically, the server computing device or the computing device 128 within the pod 100 may determine the shooter's location based on movements from the shooter's initial location where the gunshot was fired or based on the locations of additional gunshots that are subsequently fired. The movements may be detected, for example, by continuously or periodically (e.g., every second, every minute, 10 times per second, 60 times period second, 100 times period second, etc.) identifying the location of the weapon based on visible light images from each pod 100. In other embodiments, the computing device within the pod 100 performs the analysis described above to identify the type of weapon, the number of rounds fired, and the location of the gunshot. The pods 100 may communicate with each other to track the location of the shooter based on movements from the shooter's initial location where the gunshot was fired or based on the locations of additional gunshots that are subsequently fired.

In some embodiments, the server computing device or the computing device 128 within the pod 100 may also determine the identity of the shooter. For example, images of each of the students, teachers, and/or other employees of the building may be stored within a database. The server computing device or the computing device within the pod 100 may retrieve these images and/or additional images from criminal or other public databases, such as public social networking databases. Then the server computing device or the computing device within the pod 100 may analyze visible light images of the shooter using image classification and/or machine learning techniques to determine the identity of the shooter. The visible light images of the shooter may be identified based on the images captured from the pod 100 where a gunshot or weapon is detected, and/or where a person is identified using the techniques described above. The server computing device or the computing device within the pod 100 may identify features of the images of the shooter using the techniques described above, such as SIFT, SURF, FREAK, BRISK, or any other suitable computer vision techniques. The features of the images of the shooter may be compared to the features of the images of the students, teachers, and/or other employees of the building. The server computing device or the computing device within the pod 100 may then determine the identity of the shooter based on the amount of similarity, or the vector distance in the nearest neighbors algorithm, between the features of the images of the shooter and the features of the images of the students, teachers, and/or other employees of the building. The student, teacher, or other employee having features which are the closest to the features of the shooter may be identified as the shooter for example, if the vector distance is below a threshold. If the vector distance of the closest features are not within the threshold distance, the shooter may not be identified. In other embodiments, the computing device within the pod 100 performs the analysis described above to determine the identity of the shooter.

Speaker

Once again turning back to the pod 100, the speaker 108 is configured to provide audio alerts to occupants within the detection area. The alerts may be specific to the particular detection area for the pod 100. In some scenarios, a first set of pods 100 in the building may provide a first audio alert and a second set of pods 100 may provide a second audio alert. More specifically, pods 100 within a threshold range of the shooter or other dangerous person or object (also referred to herein as a "danger zone") may provide audio alerts instructing occupants to hide, lock doors, stay away from the windows, etc. Pods 100 outside of the danger zone may provide audio alerts instructing occupants to exit the building immediately from the nearest exit. The audio alerts may also include a description of the nearest exit and/or directions for reaching the nearest exit.

Additionally, the audio alerts may include information regarding the dangerous event, such as a description of the type of dangerous event (e.g., a gunshot, a weapon, a fire, a gas leak, etc.), a location of an active shooter or a location of the dangerous event, etc. In some embodiments, the server computing device or the computing device within the pod 100 generates audio alerts specific to each detection area and provides each generated audio alert to a respective pod 100 for the corresponding detection area. In other embodiments, the computing device within the pod 100 generates the audio alert specific to that pod 100. In other scenarios, the speaker 108 is configured to provide announcements, such as general announcements in a public address (PA) system.

Microphone

The microphone 110 is configured to receive voice communications from occupants within the detection area. In this manner, the occupants may communicate with the pod 100. For example, the audio alert from a particular pod may instruct the occupants to exit the building from Entrance A. The occupants may then inform the security system that Entrance A is inaccessible, and the server computing device or the computing device within the particular pod 100 may generate an additional audio alert with different instructions. The voice communications may also include status information regarding the occupants, such as "Bob is injured," or "Jim is safe." In some embodiments, the voice communications from the occupants may be transmitted to emergency responders or school/building administrators so that the occupants may assist and communicate with the emergency responders or the school/building administrators.

Gas Sensor

In addition to the high-definition imaging camera 104, thermal camera 106, acoustic sensor 114, speaker 108, and microphone 110, the pod 100 also includes a gas sensor 112 such as a spectrometer configured to detect a gas leak in the detection area. The spectrometer 112 may test for carbon monoxide, carbon dioxide, acetylene, methanol, ethanol, or any other chemicals. Additionally, the spectrometer 112 may be used to measure air quality.

The server computing device or the computing device within the pod 100 may analyze sensor data from the thermal camera 106 to identify a fire. For example, the server computing device or the computing device 128 within the pod 100 may compare temperature data from the IR images during a particular time period to a threshold fire temperature (e.g., 400° C.) indicative of a fire. The server computing device or the computing device 128 within the pod 100 may then detect a fire when the temperature data within the detection area includes temperatures which exceed the threshold fire temperature. To verify the existence of a fire, the server computing device or the computing device 128 within the pod 100 may analyze images detected by the imaging camera 104 or temperature data from the thermal camera 106 to for example, determine the size of the flame. If the size of the flame exceeds a threshold size (e.g., six inches), the server computing device or the computing device 128 within the pod 100 detects a fire.

Furthermore, if the gas sensor 112 indicates that there is a gas leak, the server computing device or the computing device within the pod 100 provides an alert of the gas leak within the detection area for the corresponding pod 100. The alert may be an audio alert provided via the speakers 108 of the pod 100 or a text-based alert provided to client computing devices. In other embodiments, the computing device 128 within the pod 100 performs the analysis described above to identify a fire or a gas leak and/or generate an alert.

More generally, the pod 100 may use any combination of two sensors to detect and verify a dangerous event, such as a fire, a gas leak or other airborne contaminant, a water leak, a gunshot, a weapon, etc. In some embodiments, a first type of sensor data from the first sensor may be used to detect the dangerous event, and a second type of sensor data from the second sensor may be used to verify that the dangerous event is occurring.

In one example, when the dangerous event is a fire, the server computing device or the computing device 128 within the pod 100 may compare temperature data from the thermal camera 106 during a particular time period to a threshold fire temperature (e.g., 400° C.) indicative of a fire. The server computing device or the computing device 128 within the pod 100 may then detect a fire when the temperature data within the detection area includes temperatures which exceed the threshold fire temperature. To verify the existence of a fire, the server computing device or the computing device 128 within the pod 100 may analyze images detected by the imaging camera 104 or temperature data from the thermal camera 106 to for example, determine the size of the flame. If the size of the flame exceeds a threshold size (e.g., six inches), the server computing device or the computing device 128 within the pod 100 detects a fire. Otherwise, the server computing device or the computing device 128 within the pod 100 does not detect a fire, and flames less than the threshold size may be candles or burners. The server computing device or the computing device 128 within the pod 100 may analyze any suitable combination of two or more types of sensor data from the imaging camera 104, and the thermal camera 106 to detect and verify a fire in the detection area of the pod 100.

In another example, when the dangerous event is a water leak, the server computing device or the computing device 128 within the pod 100 may compare temperature data from the thermal camera 106 during a particular time period to a threshold water temperature range (e.g., 10-15° C. and 40-50° C.) indicative of water. The water may need to be hot or cold water for the server computing device or the computing device 128 within the pod 100 to distinguish the water from the environment at room temperature. The server computing device or the computing device 128 within the pod 100 may then detect a water leak when the temperature data within the detection area includes temperatures which are within the threshold water temperature range. To verify the existence of the water leak, the server computing device or the computing device 128 within the pod 100 may analyze images detected by the imaging camera 104 to for example, determine the size of the water leak. If the size of the water leak exceeds a threshold size (e.g., one foot), the server computing device or the computing device 128 within the pod 100 detects a water leak. Otherwise, the server computing device or the computing device 128 within the pod 100 does not detect a water leak, and the water may be from a faucet, for example.

In yet another example, as described above, when the dangerous event is a gunshot, the server computing device or the computing device 128 within the pod 100 compares temperature data from IR images from the thermal camera 106 to a threshold explosion temperature indicative of a blast from a bullet exiting the barrel of a gun (e.g., 200° C.). If the IR images include temperatures or heat signatures exceeding the threshold explosion temperature, the server computing device or the computing device 128 within the pod 100 detects a gunshot. To verify that the gunshot occurred, the server computing device or the computing device 128 within the pod 100 may compare the noise level from sound data from the acoustic sensor 114 captured during the same time period as the IR images to a threshold noise level range indicative of a gunshot (e.g., 140-190 dB). If the noise level during the particular time period is within the threshold noise level range, the server computing device or the computing device 128 within the pod 100 verifies that the gunshot occurred.

In another example, as described above, when the dangerous event is a weapon, the server computing device or the computing device 128 within the pod 100 may compare temperature data or heat signatures from the IR images from the thermal camera 106 to a threshold body temperature range corresponding to a human (e.g., 33° C.-44° C.) to identify an object including temperatures within the threshold body temperature range, and comparing features of the object to features from template objects using image classification and/or machine learning techniques, where at least some of the template objects represent a person. In response to identifying a person, the server computing device or the computing device 128 within the pod 100 may identify a weapon attached to the person, such as a weapon being carried by the person or attached to the person's clothing based on differences in temperature data within the object corresponding to the person. More specifically, the server computing device or the computing device 128 may identify a portion of the object which includes temperatures outside of the body temperature range to generate a heat signature. For example, each image of a person may include several contiguous portions which are outside of the body temperature range. The server computing device or the computing device 128 may generate a heat signature for each contiguous portion. The server computing device or the computing device 128 may then identify features of each heat signature which may be compared to template features of template objects representing weapons. The server computing device or the computing device 128 may then determine whether each heat signature corresponds to a weapon (e.g., whether the heat signature is in the shape of a weapon) based on the amount of similarity, or the vector distance in the nearest neighbors algorithm, between the features of each heat signature and the features for template objects that represent a weapon. To verify that there is a weapon in the building premises, the server computing device or the computing device 128 within the pod 100 may analyze the same portion of the visible light image as the portion of the thermal image that includes the heat signature corresponding to a weapon using image classification and/or machine learning techniques. If the same portion of the visible light image is identified as a weapon, the server computing device or the computing device 128 within the pod 100 verifies that there is a weapon in the building premises.

As mentioned above, the pod 100 includes one or more light emitting elements 120, such as LEDs, which are configured to emit monochromatic light. The light emitting elements 120 may include several sets of light emitting elements each configured to emit a different color (e.g., red, green, blue, etc.). In some embodiments, the light emitting elements 120 are positioned on the pod 100 so that the light from the light emitting elements 120 projects onto a wall behind the pod 100. In response to detecting a dangerous event, the server computing device or the computing device 128 within the pod 100 may activate one or more of the LEDs 120 to act as an alert to occupants within the building premises. For example, the server computing device or the computing device 128 within the pod 100 may activate the LEDs 120 that emit a red color. The server computing device or the computing device 128 within the pod 100 may cause the LEDs 120 to turn on and off or blink at a particularly frequency to signal an alert to the occupants. In some embodiments, when the dangerous event has ended, the server computing device or the computing device 128 within the pod 100 may activate the LEDs 120 that emit a green color to signal that it is safe to resume normal activities and move throughout the building premises. The server computing device or the computing device 128 within the pod 100 may also control the LEDs 120 within multiple pods 100 to signal a path leading to a safe exit for the occupants. This is described in more detail below.

Still further, the pod 100 includes a communication interface 122 having long-range and short-range communication links. The short-range communication link may be wired (e.g., wired Universal Serial Bus (USB)) or wireless (e.g., Bluetooth®, Bluetooth® Low Energy (LE), Wi-Fi Direct, wireless USB, radio-frequency identification (RFID)). The long-range communication link may be a third-, fourth-, or fifth-generation cellular network (3G, 4G, or 5G respectively) and/or the Internet. For example, the communication interface 122 may include a Wi-Fi transceiver for connecting to the Internet via Wi-Fi. The communication interface 122 may also include a 3G, 4G, or 5G transceiver for connecting to the Internet via a cellular network, for example if there is a connectivity issue with the Wi-Fi in the area. In this manner, the pod 100 may transmit, via long-range communication links, sensor data including image data, temperature data, heat signatures, sound data, flame data, gas leak data, and voice data from the imaging camera 104, thermal camera 106, acoustic sensor 114, gas sensor 112, and microphone 110 respectively, to the server computing device or any other suitable remote computing device. In other embodiments, the pod 100 may transmit an interpretation of the sensor data to the server computing device or any other suitable remote computing device. The interpretations of the sensor data may include an indication that a dangerous event has been detected, indications of the danger zone, indications of the locations of occupants within the building premises, an indication of the location of an active shooter, etc. The server computing device may then analyze the sensor data, or interpretations of the sensor data provided by the pod 100, and generate and transmit various representations of the sensor data to client computing devices of emergency responders such as police officers, firefighters, and paramedics, occupants of the building such as students and teachers, building/school administrators, and parents of the students. In other embodiments, the computing device 128 within the pod 100 may generate and transmit various representations of the sensor data to client computing devices.

In some embodiments, portable client computing devices of occupants in the building may identify their respective locations within the building via the short-range communication links. More specifically, the pod 100 may broadcast a Bluetooth LE signal which is received at a portable device of an occupant. If, for example, the strength of the signal exceeds a threshold signal strength, the portable device may determine that the portable device is within the detection area of the pod 100 broadcasting the Bluetooth LE signal. The Bluetooth LE signal may also include a unique identifier for the pod 100, so that the portable device obtains an indication of the particular pod 100 broadcasting the signal. The portable device may then transmit an indication of its location within the building to the server computing device. In this manner, the security system may not only determine the number of people within a particular detection area, such as a room or portion of the building, the security system may determine the identities of the people in the particular detection area. In some embodiments, one of the portable computing devices may be a visitor badge for a visitor having an RFID tag that transmits an RFID signal to the pods 100. A pod 100 that receives the RFID signal may determine that the visitor is within the detection area of the pod 100.

Furthermore, in addition to identifying the number of people within a particular detection area, the pod 100 may identify precise locations of each person within the detection area for the pod 100. More specifically, when a pod 100 is installed within a room of a building, for example, the pod 100 obtains measurements of dimensions of the detection area (e.g., the size of the room in which the pod 100 is installed is 10 m by 10 m). The pod 100 or the server computing device then creates a mapping of the precise location of each pixel or group of pixels generated by the imaging camera 104 and/or the thermal camera 106 based on the size of the detection area and/or the orientations of the imaging camera 104 and/or the thermal camera 106. In some embodiments, the pod 100 or the server computing device may create the mapping using the pan and tilt servomotors 102 in the pod 100 to rotate the imaging camera 104 and/or the thermal camera 106. For example, if the room is 10 m wide, the width of an image is 10,000 pixels, and the orientation of the imaging camera 104 is such that the width of the image is parallel to the width of the room, each pixel may represent a physical width of approximately 1 mm. Then when the server computing device identifies a person in the detection area, the server computing device identifies the pixel locations of the group of pixels that include the person and maps the pixel locations to a precise physical location of the person within the detection area. When the server computing device generates a map of the building, the server computing device may place an indicator on the map such as a dot at the precise physical location within the detection area where the person is identified.

In some embodiments, the detection area for a pod 100 may cover a wider area than the room or zone (e.g., a hallway, a portion of a hallway, a stairwell, etc.) in which the pod 100 is located. For example, when a pod 100 is installed within a room of the building, the detection area for the pod may include locations outside of the room. In this scenario, the pod 100 may generate pixel boundaries within the detection area on the perimeter of the room or zone in which the pod 100 is located. The pod 100 may then identify a person within the detection area when the person is located within the pixel boundaries. If the person is not located within the pixel boundaries or crosses over to the other side of a pixel boundary, the pod 100 or the server computing device no longer counts the person as an occupant in the room or zone for the pod 100. The pod 100 or the server computing device may maintain separate counts of the number of occupants in the room or zone for the pod 100 and the number of occupants outside of the pixel boundary. In this manner, the pod 100 may be able to count occupants in adjacent rooms or zones when for example, the pods 100 in the adjacent rooms or zones are malfunctioning, have been tampered with, or are not currently operating. This may also serve to analyze the performance of the adjacent pods 100. For example, if the pod 100 detects one or more occupants outside of the pixel boundary, but none of the adjacent pods 100 detects an occupant in their respective pixel boundaries at least one of the pods 100 is not detecting occupants or the pod 100 is falsely detecting an occupant which is not there. The pods 100 or the server computing device may verify that the occupancy numbers are consistent across adjacent pods 100, and if there is an inconsistency, the pods 100 or the server computing device may generate an alert requesting maintenance or repair of the pods 100.

Figure 3:
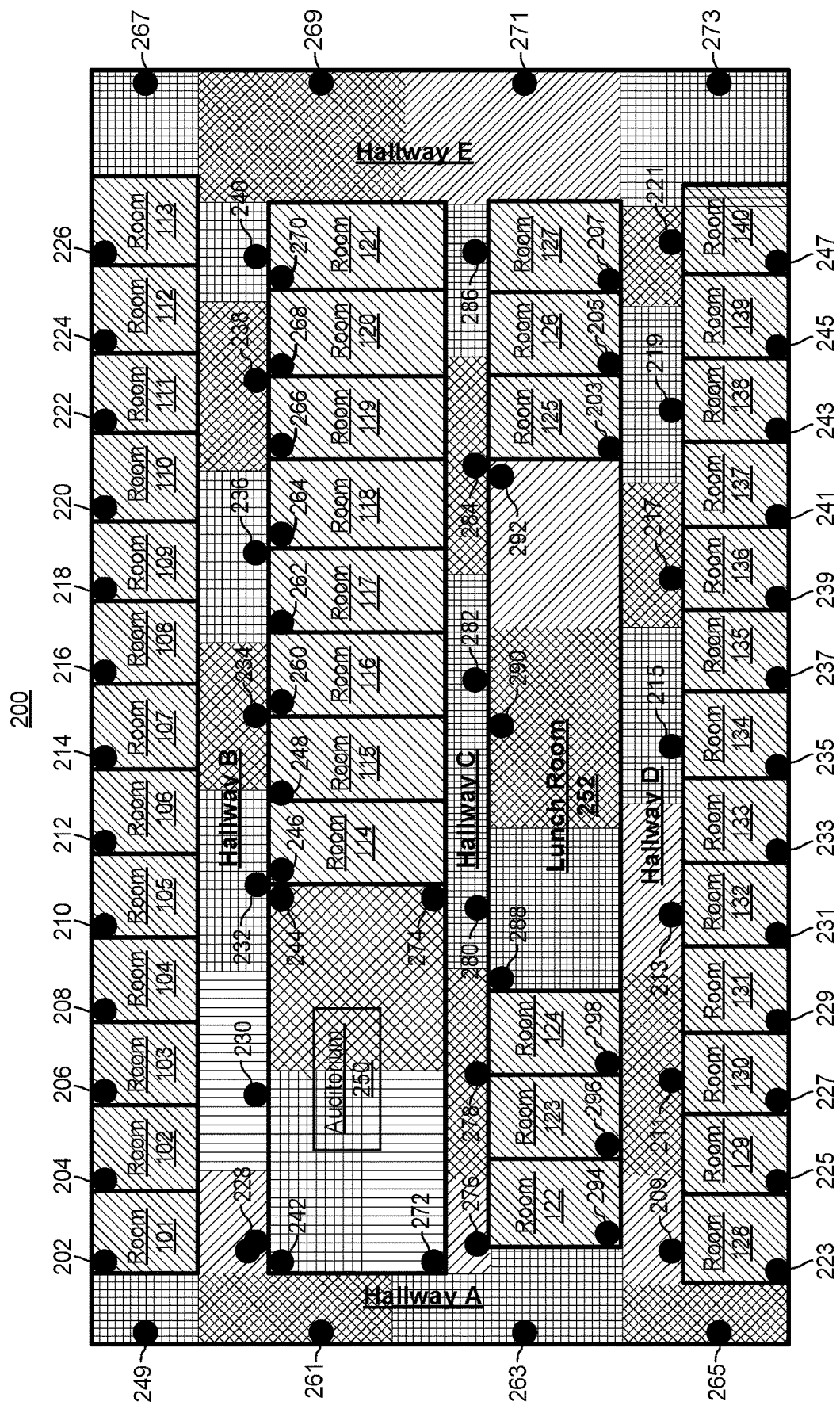
FIG. 3 illustrates an example layout of pods installed in various rooms and hallways of a building and the respective detection areas for the pods.

As described above, a building may include several pods 100 (e.g., 300-400) each having its own detection area. FIG. 3 illustrates an example layout 200 of a floor of a school having pods 202-249, 260-298 installed in various rooms and hallways. The example layout 200 also includes detection areas for each pod 202-249, 260-298. Each detection area is represented by a shaded region. In the example layout 200, the pods 202-249, 260-298 are installed in the corners of each room, such that the detection areas may cover the entire room. In some larger rooms, such as the auditorium 250 and the lunch room 252, multiple pods 242, 244, 272, 274, 288, 290, 292 may be installed in the room, such as in each of the corners or across one of the walls. Accordingly, the detection areas for the pods installed in the same room 242, 244, 272, 274, 288, 290, 292 may overlap. However, having multiple pods in the same room may allow for sensor data from objects which are far away from one of the pods to be collected from another pod closer to the objects.

Pods 202-249, 260-298 installed in the hallways may be spaced apart, such that their respective detection areas cover the entire hallway. As shown in FIG. 3, the detection areas for the pods 202-249, 260-298 installed in the hallways are rectangular regions which combine to cover the entire area of the hallway. In some embodiments, pods 202-249, 260-298 may be placed such that the pods 202-249, 260-298 have overlapping detection areas for redundancy or as an emergency backup. If one of the pods 202-249, 260-298 fails, sensor data from the pod 202-249, 260-298 having an overlapping detection area may be used.

While the layout 200 illustrates the pods 100 being placed inside the building, pods 100 may also be placed outside of the building within the building premises. For example, the pods 100 may be placed on the roof of the building, on light poles, or other structures on the building premises exterior to the building.

Smart Locking System

In some embodiments, one or more of the doors in the building, including doors along the perimeter of the building that provide access to and egress from the building, and internal doors providing access between interior spaces within the building, may include electronically-controlled locking mechanisms, such as the August Smart Lock®. The electronically-controlled locking mechanisms have communication interfaces to communicate over short- and long-range communication links. Accordingly, the electronically-controlled locking mechanisms can be locked and unlocked remotely by sending control signals to the electronically-controlled locking mechanism from a computing device 128 within the pod 100, the server computing, or the client computing devices. In response to identifying a dangerous event, the server computing device or the computing device 128 within the pod 100 may automatically lock one or more of the doors in the building and/or may automatically unlock one or more of the doors in the building. The server computing device or the computing device 128 within the pod 100 may automatically lock or unlock doors by transmitting control signals to the electronically-controlled locking mechanisms for the doors indicating to the electronically-controlled locking mechanisms to lock or unlock the doors. In some embodiments, the server computing device or the computing device 128 within the pod 100 may detect the danger zone for the dangerous event and automatically lock doors associated with the danger zone, while automatically unlocking doors that will be used for emergency egress.

For example, when the dangerous event is a gunshot or weapon and the danger zone corresponds to locations inside the building, the server computing device or the computing device 128 within the pod 100 may automatically lock each of the doors within a threshold distance of the danger zone so that occupants may not run out into the line of fire and an active shooter may not gain access to nearby rooms. In another example, when the dangerous event is a gunshot or weapon and the danger zone corresponds to locations exterior to the building, the server computing device or the computing device 128 within the pod 100 may automatically lock each of the doors along the perimeter of the building that provide access to and/or egress from the building. In this manner, an active shooter may not be able to access the building.

In some scenarios, the danger zone may change over time. When the danger zone is in a first area of the building at a first point in time, the server computing device or the computing device 128 within the pod 100 may automatically lock each of the doors within a threshold distance of the danger zone in the first area. Then when the danger zone moves to a second area of the building at a second point in time for example, because the active shooter moves from one floor to the next, the server computing device or the computing device 128 within the pod 100 may automatically lock each of the doors within a threshold distance of the new danger zone in the second area. In some scenarios, such as when the first area is no longer within a threshold distance of the new danger zone and it is safe for the occupants to exit the building from the first area, the server computing device or the computing device 128 within the pod 100 may automatically unlock each of the doors within a threshold distance of the danger zone in the first area. In this manner, the occupants in the first area may exit the building and/or first responders may enter the building.

In addition to automatically locking doors from the server computing device or the computing device 128 within the pod 100, an administrator may be able to automatically lock and unlock doors from her client computing device, for example via an administrator application. The administrator application may include user controls for automatically locking and unlocking doors and for selecting which doors to lock and unlock. Additionally, the administrator application may present notifications when doors are locked and unlocked including the location of each door which is locked or unlocked. The administrator application may also present indications of current lock states (e.g., locked or unlocked) of each of the doors. For example, the administrator application may present an indoor map display including indications of each of the doors and their current lock states.

In an example scenario, an active shooter approaches the building premises with a firearm. Pods 100 placed exterior to the building, such as on light poles on the building premises may detect the firearm in the manner described above. Before the shooter has a chance to enter the building, the server computing device or a computing device 128 within a pod 100 may transmit alerts to administrators, emergency responders, students/occupants, and/or parents notifying them of a dangerous event. The server computing device or computing device 128 within a pod 100 may also automatically lock each of the doors along the perimeter of the building that provide access to and/or egress from the building, so that the active shooter may not be able to access the building. The police and/or other emergency responders may then arrive at the scene before the active shooter has even been able to enter the building and harm the occupants.

Communication System

Figure 4:
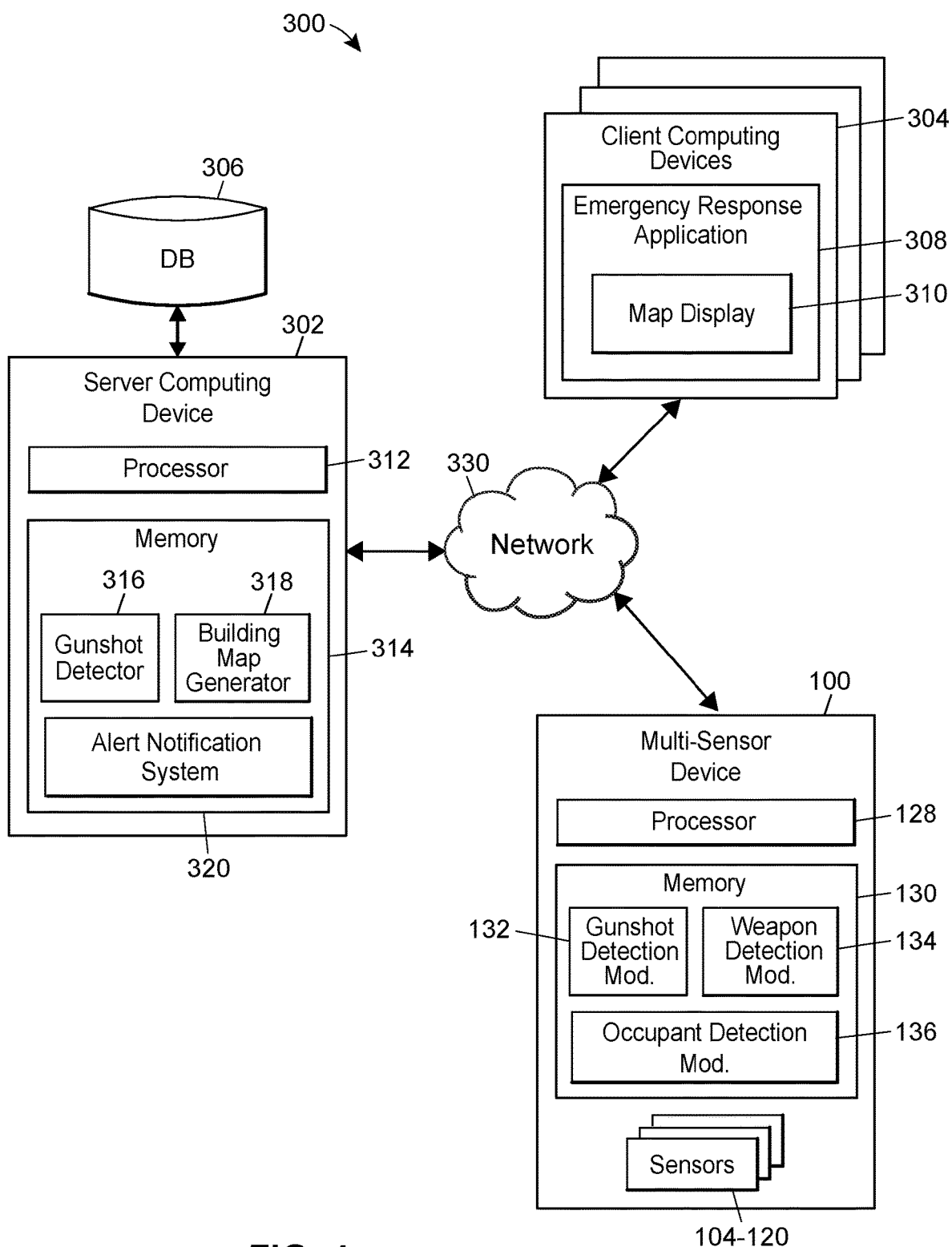
FIG. 4 illustrates an example communication system in which techniques for detecting gunshots and providing alerts can be implemented.

FIG. 4 illustrates an example communication system 300 in which the gunshot detection/security system can be implemented. The communication system 300 includes one or several pods 100 placed throughout the premises of a building, such as a school. In addition to the pods 100, the communication system 300 includes a server computing device 302 configured to receive sensor data from the pods 100 and/or interpretations of the collected sensor data (e.g., an indication that a dangerous event has been detected, indications of the danger zone, indications of the locations of occupants within the building premises, an indication of the location of an active shooter, etc.) and generate and transmit various representations of the sensor data to client computing devices 304 of emergency responders such as police officers, firefighters, and paramedics, occupants of the building such as students and teachers, and building/school administrators, and/or parents of the students. The server computing device 302 may be communicatively coupled to a database 306 that stores, in an example implementation, location and identification information for each of the pods within the building premises. The database 306 may also store machine learning models for detecting people based on the sensor data and detecting a type of weapon from the sensor data in addition to training data for training the machine learning models, such as template objects in various images. Additionally, the database 306 may store map data for generating two-dimensional and three-dimensional indoor maps of buildings as well as user profile information for parents, students, teachers, administrators, and emergency responders having client computing devices 304 that interact with the gunshot detection/security system via one or several client applications.

More generally, the server computing device 302 can communicate with one or several databases that store any type of suitable information related to the gunshot detection/security system. The devices operating in the communication system 300 can be interconnected via a long-range communication network 330.

Client Computing Devices

In various implementations, the client computing devices 304 may be smart phones, tablet computers, laptop computers, desktop computers, smart glasses, smart watches, lanyards, or bracelets, wearable computing devices, vehicle head units, or any suitable portable or non-portable computing device. Each client computing device 304 may include a memory, one or more processors (CPUs), a graphics processing unit (GPU), an I/O module including a microphone and speakers, a user interface (UI), and one or several sensors 19 including a Global Positioning Service (GPS) module. The memory can be a non-transitory memory and can include one or several suitable memory modules, such as random access memory (RAM), read-only memory (ROM), flash memory, other types of persistent memory, etc. The I/O module may be a touch screen, for example. In various implementations, each client computing device 304 can include fewer components or conversely, additional components.

The memory stores an operating system (OS), which can be any type of suitable mobile or general-purpose operating system. The memory also stores client applications, such as an emergency response application 308, which is configured to provide alerts to a user when the user is in a building during a dangerous event such as a school shooting, the user is a parent of a student in the building during the dangerous event, the user is an administrator for the school or building, or the user is an emergency responder. The emergency response application 308 may also generate digital maps of the exterior of the building and the building premises and digital maps of the interior of the building presented via the map display 310. The digital map may include an indication of a danger zone depicting an area within a threshold range of the shooter or within a threshold range of the center of the dangerous event. The digital map may also include indications of the number of occupants in various rooms within the building and/or various zones within the building premises.

While the client computing devices 304 depicted in FIG. 4 include a single emergency response application 308 for interacting with the gunshot detection/security system, the client computing device 304 may include several client applications. In some embodiments, the client computing devices 304 may include a student/occupant application for providing alerts, map data, and other information to occupants in the building during the dangerous event. Alternatively, the client computing devices 304 may include a parent application for providing alerts to parents of the occupants in the building during the dangerous event. Still further, the client computing devices 304 may include an administrator application for providing alerts, live video feeds, map data, and other information to building/school administrators, and an emergency responder application for providing alerts, live video feeds, map data, and other information to police officers, fire fighters, paramedics, etc. In other embodiments, the emergency response application 308 obtains login information from the user and provides specific alerts, map data, and other information according to the user's role as a student/occupant, parent, administrator, or emergency responder. In some scenarios, a client computing device 304 may include multiple client applications of the student/occupant application, the parent application, the administrator application, and the emergency responder application. In other scenarios, each client computing device 304 includes one of the client applications based on the user associated with the client computing device 304. For example, if the user is an emergency responder, the associated client computing device 304 may include the emergency responder application. If the user is a building administrator on the other hand, the associated client computing device 304 may include the building administrator application.

In some embodiments, the client computing device 304 may be a device temporarily programmed with identification information for a visitor of a school, hospital, museum, airport, office building, shopping mall, sports complex, retail store, department store, train station, food court, place of worship, or other type of building. For example, the client computing device 304 may be a lanyard that is worn around the neck of a visitor or guest. The lanyard may have a programmable radio frequency identification (RFID) tag embedded in the lanyard. In some embodiments, the pods 100 may include RFID reader modules, or RFID detectors as part of the communication interface 122, for detecting RFID signals and identifying information associated with an RFID tag. The pods 100 with RFID readers may include RF antennas, RF transceivers configured to send and receive RF signals, and as mentioned above, a computing device 128 having a processor, and a memory for storing machine readable instructions. The computing device 128 within a pod 100 may obtain an RF signal from an RFID tag, analyze the RF signal to identify information associated with the RFID tag (e.g., identification information for a visitor associated with the RFID tag, a location of the RFID tag, a bearing of the received RFID signal, a movement of the RFID tag in a building, etc.). Further, the computing device 128 within the pod 100 may interface with a server computing device 302 to determine if the identified visitor associated with the RFID tag is in a permitted or prohibited location.

In some embodiments, the computing device 128 within the pod 100 may determine the location of the RFID tag based on a signal strength of the RF signal received at the RFID reader within the pod 100. As the signal strength increases, the computing device 128 may determine that the RFID tag is getting closer to the pod 100. Also in some embodiments, the computing device 128 within the pod 100 may determine the location of the RFID tag based on any suitable combination of the received RF signal from the RFID tag and sensor data from other sensors within the pod 100, such as the imaging camera 104 and the thermal camera 106. For example, the computing device 128 within the pod 100 may determine that the RFID tag is within the detection area of the pod 100 upon receiving an RF signal from the RFID tag. The computing device 128 within the pod 100 may then determine the location of the RFID tag and/or the visitor associated with the RFID tag within the detection area by analyzing sensor data from the imaging camera 104 and/or the thermal camera 106 to identify a person within the detection area of the pod 100 in the manner described above and the person's precise location.

In any event, if it is determined that the visitor is in, or near, an unauthorized or prohibited location, the client computing device 304 may emit, through a speaker, a warning to the visitor to proceed to a permitted location. Further, the client computing device 304, or pod 100 with the RFID reader, may send a signal to other client computing devices 304 to inform school officials, students, teachers, parents, or other building administrators of the guest in the prohibited location.

In some embodiments, the client computing device 304 may be a lanyard, an identification card, a wristband, a ring, an item to be carried in a pocket, purse, or satchel, or another wearable RF technology. In some embodiments, such as when the client computing device 304 is a wearable device, the client computing device 304 may include an accelerometer to determine if the wearable client computing device 304 has been removed from the visitor or guest. For example, the client computing device 304 may be a lanyard worn around the neck of a visitor or guest. The lanyard may include an RFID tag, and a z-axis accelerometer. The z-axis accelerometer may communicate accelerometer data with the processor in the client computing device 304, or the lanyard may communicate the accelerometer data to a pod 100 or server computing device 302 through a suitable means of communication (e.g., Bluetooth, RF communication, other wireless communication, etc.).

The processor, the computing device 128 in the pod 100, and/or the server computing device 304 may analyze the z-axis accelerometer data and may determine that the lanyard has been removed from the visitor or guest, and that the visitor or guest is now moving around the building without the RFID tag. For example, the processor in the wearable client device 304 may analyze the z-axis accelerometer data to determine whether there is an acceleration in the z-direction above a threshold acceleration. If the acceleration in the z-direction is above the threshold acceleration, the wearable client device 304 may determine that is has been removed from the visitor or guest. In another example, the processor in the wearable client device 304 may analyze the z-axis accelerometer data using machine learning techniques to determine whether the wearable client device 304 has been removed from the visitor or guest.

For example, the server computing device 302 may obtain training data as z-axis accelerometer data from users who removed the wearable client devices 304 and users who did not remove the wearable client device 304. The server computing device 302 may compare the z-axis accelerometer data for users who removed the wearable client device 304 to the z-axis accelerometer data for users who did not remove the wearable client device 304 using machine learning techniques to generate a machine learning model or removal signature for determining whether a user has removed the wearable client device 304 based on the z-axis axis accelerometer data. The machine learning techniques may include artificial neural networks, support vector machines, naïve Bayes, random forests, boosting, linear regression, logistic regression, k-nearest neighbors, decision trees, hidden Markov models, etc. The machine learning techniques may include performing averages, filters, regressions, other mathematical transforms, masks, and/or statistical processes on the accelerometer data to identify potential signatures or trends in the z-axis accelerometer data that are indicative of the removal of the wearable client device 304 from the visitor or guest. For example, the removal signature may include a maximum upward z-acceleration, a maximum downward z-acceleration, a duration in which the wearable client device 304 accelerates above a threshold acceleration, an average acceleration during the period where the wearable client device 304 accelerates above a threshold acceleration, etc. In some embodiments, the server computing device 302 may provide the machine learning model or removal signature to the wearable client device 304. Then the wearable client device 304 may apply the z-axis accelerometer data to the machine learning model or removal signature to determine whether the wearable client device 304 has been removed from the visitor or guest.

The lanyard 304, pod 100, or server computing device 302 may then generate an alert that the RFID tag has been removed from the visitor and the security system may take appropriate measures to inform officials, parents, students or others associated with the building.

While the examples above describe the wearable client device 304 as a lanyard, any other wearable client devices with an accelerometer may also be included. For example, a ring worn on a finger may record acceleration data to determine physical activity and motion of a visitor wearing the ring. Stagnancy of the ring location, or stagnancy of motion of the ring may indicate that the ring has been removed from the visitor and appropriate alerts may be generated. In some embodiments, the accelerometer may be a single axis accelerometer, two-axis accelerometer, three-axis accelerometer, a piezoelectric accelerometer, a capacitive accelerometer, a capacitive micro-electrical-mechanical system accelerometer, a piezoresistive accelerometer, or another accelerometer for sensing acceleration information associated with the client computing device 304.

The RFID tag may be a passive RFID tag that has no independent power source associated with the RFID tag or lanyard. The passive RFID tag may be powered by a signal provided by the RFID reader in the pod 100. In other embodiments, the RFID tag in the wearable client device 304 may be an active RFID tag having its own dedicated battery to power the RFID tag. The active RFID tag may continuously broadcast its associated RFID signal to be read and detected by RFID readers in the pods 100.

Security systems that employ an RFID tag in the wearable client device 304 may include RFID tag hubs that are configured to electrically couple to the RFID tags to recharge a battery associated with the RFID tag. The RFID hubs may physically and electrically couple to the RFID tags to delete information on the RFID tags, and to transmit data to the RFID tags to store information on the RFID tag (e.g., guest identification information). Additionally, the RFID tag hub may store permissions on the RFID tag to enable the RFID to unlock or open certain doors, or give the guest access to cabinets, closets, computer stations, or other locations or devices.

For example, when a visitor enters the building, the visitor may be required to check-in at a visitor station that includes a computing device and the RFID tag hubs. The visitor may be required to provide identification information which may be provide to the computing device at the visitor station. The computing device at the visitor station may run a background check on the visitor. In some embodiments, if the visitor has a criminal history or a particular type of criminal history the visitor may not be allowed to remain in the building. Also in some embodiments, the RFID tag hub may transmit visitor identification information to an RFID tag included in a wearable client device 304. The visitor identification information may include a name of the visitor, biographical information for the visitor, information uncovered from the background check, permissions for the visitor such as the ability to unlock or open certain doors, or access to cabinets, closets, computer stations, or other locations or devices, etc. In some embodiments, the computing device at the visitor station may generate the visitor identification information and download the visitor identification information to an RFID tag hub which transmits the visitor identification information to the RFID tag included in the wearable client device 304.

The computing device at the visitor station may generate a set of locations that the visitor is authorized to enter which may be provided to the wearable client device 304 as visitor identification information. The computing devices 128 within the pods 100 may also obtain the set of locations that the visitor is authorized to enter and may compare the set of authorized locations to the current location of the visitor (e.g., as determined based on the RF signal from the RFID tag) to determine whether the visitor has entered an unauthorized location. Additionally, the computing device at the visitor station may compare the set of authorized locations to the current location of the visitor (e.g., as determined based on the RF signal from the RFID tag) to determine whether the visitor has entered an unauthorized location.

As mentioned above, the wearable client device 304 may continuously broadcast its associated RFID signal to RFID readers in the pods 100. In some embodiments, the RFID readers in the pods 100 may communicate the information from the RFID signal to the computing device at the visitor station to present indications of the current location of the visitor on the computing device at the visitor station and/or present alerts indicating that the visitor has entered an unauthorized location, for example. The alert may include an indication of the visitor associated with the RFID tag and/or the location of the RFID tag.

Then when the visitor leaves the building, the visitor may return the wearable client device 304 to the visitor station, and the RFID hub may delete the information on the RFID tag within the wearable client device 304. In this manner, the wearable client device 304 may be reused for a subsequent visitor.

It is noted that although FIG. 4 illustrates the emergency response application 308 as a standalone application, the functionality of the emergency response application 308 also can be provided in the form of an online service accessible via a web browser executing on the client computing device 304, as a plug-in or extension for another software application executing on the client computing device 304, etc. The emergency response application 308 generally can be provided in different versions for different respective operating systems. For example, the maker of the client computing device 304 can provide a Software Development Kit (SDK) including the emergency response application 308 for the Android™ platform, another SDK for the iOS™ platform, etc.

In some implementations, the server computing device 302 includes one or more processors 312 and a memory 314. The memory 314 may be tangible, non-transitory memory and may include any types of suitable memory modules, including random access memory (RAM), read-only memory (ROM), flash memory, other types of persistent memory, etc. The memory 314 stores instructions executable on the processors 312 that make up a gunshot detector 316, a building map generator 318, and an alert notification system 320. As described above, the gunshot detector 316 may identify a gunshot by receiving and analyzing sound data and IR images over the same time period (e.g., over the previous second, over the previous ten seconds, etc.) from the pods 100. In addition to identifying a gunshot, the gunshot detector 316 may identify the type of weapon and the number of rounds fired. In some embodiments, when a gunshot is identified or other dangerous event is detected, the server computing device 302 begins recording video, image, and other sensor data collected from the pods 100 by storing the video data, image data, and other sensor data in the database 306. Also in some embodiments, in some scenarios such as when a weapon is detected, a building/school administrator may receive an alert on her client computing device 304, for example via the administrator application. The administrator application may also include a user control for determining whether to begin recording video, image, and other sensor data collected from the pods 100. If the building/school administrator selects the user control, the server computing device 302 begins recording video, image, and other sensor data collected from the pods 100 by storing the video data, image data, and other sensor data in the database 306.

The building map generator 318 may generate a 2D or 3D digital map of the exterior of the building and the building premises including a 3D model of the exterior of the building, a layout of the building premises, indications of the number of occupants in various zones within the building premises, indications of the precise locations of occupants within a particular zone within the building premises, and an indication of a danger zone determined based on the location of the dangerous event. The building map generator 318 may also generate a 2D or 3D digital map of the interior of the building including a display of each of the rooms in the building, indications of entrances and exits to and from the building, indications of the number of occupants in various rooms within the building, indications of the precise locations of occupants within a particular room within the building, and an indication of a danger zone determined based on the location of the shooter, the type of weapon being fired, the number of rounds that have been fired, and an estimated number of rounds remaining in the weapon. The building map generator 318 may also provide the digital map to the client computing devices 304 for presentation, via the map display 310.

The alert notification system 320 may generate and provide audio alerts to be presented via the speakers 110 of the pods 100. In some embodiments, the alert notification system 320 generates audio alerts or messages specifically for a particular detection area, and provides the audio alert or message to the pod 100 corresponding to the particular detection area. For example, the alert notification system 320 may generate a first audio alert for pods 100 having detection areas outside of the danger zone. The alert notification system 320 may also generate a second audio alert for pods 100 having detection areas in the danger zone. Additionally, the alert notification system 320 may generate and provide text-based alerts to the client computing devices 304. The text-based alerts may include a message that there is an active shooter in the building, messages to emergency responders and parents about the statuses of students/occupants in the building and/or the locations of students/occupants in need of medical attention, and/or location-specific messages instructing the students/occupants on how to evacuate the building or how to respond to the dangerous event. Furthermore, the alert notification system 320 may receive status information from students/occupants in the building via the client computing devices 304 and may report the status information to parents.

The gunshot detector 316, the building map generator 318, the alert notification system 320, and the map display 310 can operate as components of a gunshot detection/security system. Alternatively, the gunshot detection/security system can include only server-side components and simply provide the map display 310 with instructions to present the digital map and alerts. As another alternative, the entire functionality of the gunshot detector 316, the building map generator 318, and/or the alert notification system 320 can be implemented in the map display 310. In yet other embodiments, at least some of the functionality of the gunshot detector 316, the building map generator 318, and/or the alert notification system 320 may be implemented in one or more of the pods 100 or the pods 100 may communicate with each other to implement the functionality of the gunshot detector 316, the building map generator 318, and/or the alert notification system 320.

For simplicity, FIG. 4 illustrates the server computing device 302 as only one instance of a server. However, the server computing device 302 according to some implementations includes a group of one or more server computing devices, each equipped with one or more processors and capable of operating independently of the other server computing devices. Server computing devices operating in such a group can process requests from the client computing devices 304 individually (e.g., based on availability), in a distributed manner where one operation associated with processing a request is performed on one server computing device while another operation associated with processing the same request is performed on another server computing device, or according to any other suitable technique. For the purposes of this discussion, the term "server computing device" may refer to an individual server computing device or to a group of two or more server computing devices.

Figure 5:
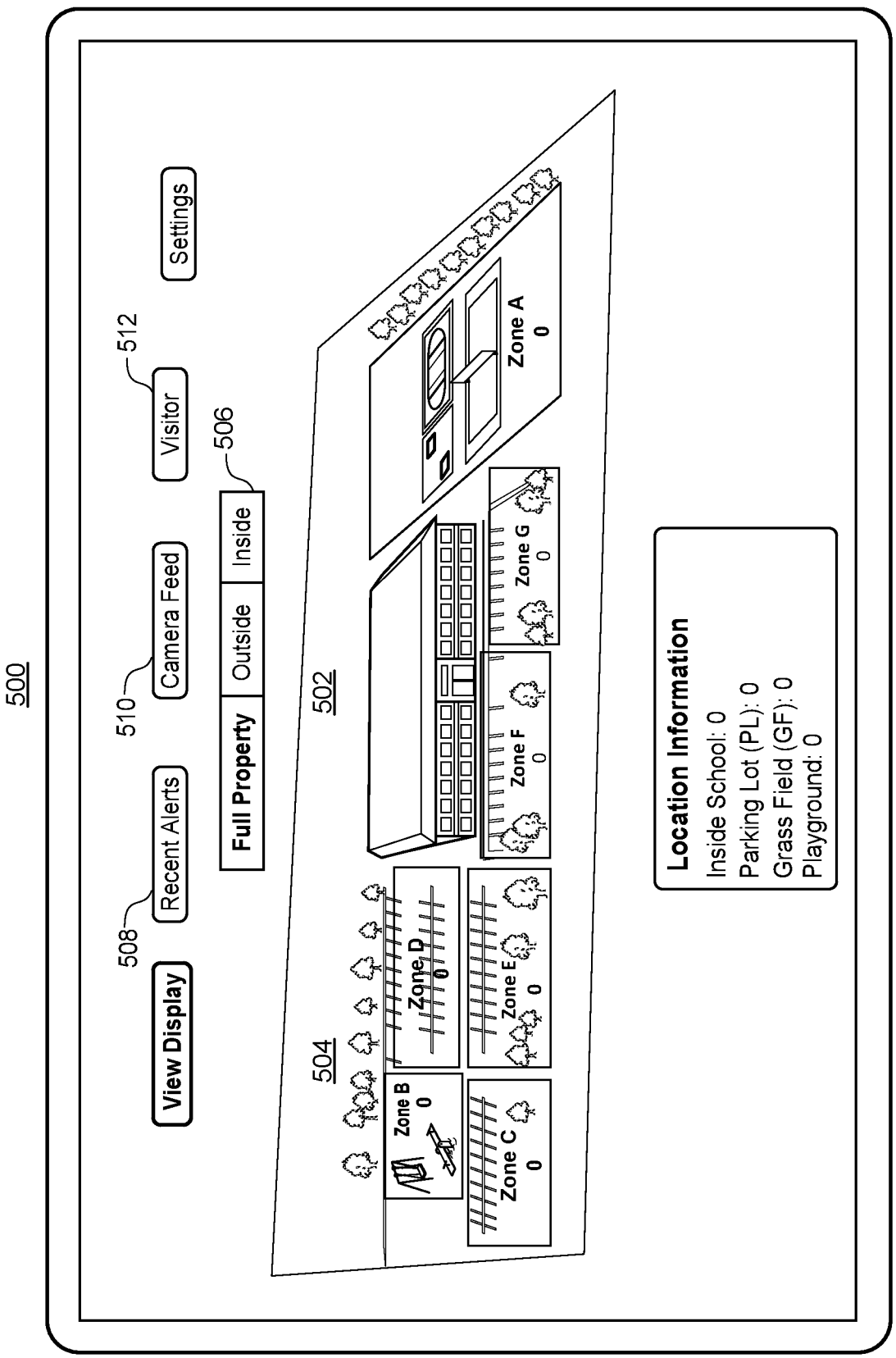
FIG. 5 illustrates an example outdoor map display screen of an administrator application or emergency responder application.

As described above, the client computing devices 304 may include any one or more of an administrator application, a student/occupant application, a parent application, and an emergency responder application. The screenshots shown in FIGS. 5-6F are examples of what may be displayed to an administrator as part of an administrator application. The screenshots shown in FIGS. 5 and 7A-7E are examples of what may be displayed to a student/occupant as part of a student/occupant application. Moreover, the screenshots shown in FIGS. 5 and 8A-8C are examples of what may be displayed to a parent as part of a parent application. Furthermore, the screenshots shown in FIGS. 5 and 9A-10B are examples of what may be displayed to emergency responders such as police or paramedics as part of an emergency responder application. As will be appreciated by those of ordinary skill in the relevant art(s), the exemplary screenshots shown in FIGS. 5-10B are for illustrative purposes, and their associated functionality may be implemented using any suitable format and/or design for facilitating their corresponding described functionalities without departing from the spirit and scope of the present disclosure. The corresponding applications may execute on any suitable client computing device. For example, the student/occupant application may execute on a smart phone, tablet, or smart watch of a student/occupant. In another example, the emergency responder application may execute in the head unit of an emergency response vehicle (e.g., the dashboard-mounted computer in a police car). In yet another example, the administrator application may execute on a smart phone, tablet, laptop, or desktop computer of a school or building administrator. Furthermore, the parent application may execute on a smart phone, tablet, or smart watch of a parent.

For each application, the client computing devices 304 executing the respective application may communicate with the server computing device 302 or the computing devices within the pods 100 to retrieve information specific to the application. The information is then displayed by the client computing device 304, for example in a manner indicated in the screenshots of FIGS. 5-10B.

Administrator Application

The administrator application presents information related to a dangerous event for display on a school or building administrator's client computing device 304. The information may include an alert notifying the administrator that a gunshot or other dangerous event has been detected with user controls for the administrator to alert students/occupants, parents, and/or emergency responders of the dangerous event. The information may also include outdoor map data including a 3D model of the exterior of the building, and a layout of the building premises. Additionally, the information may include indoor map data including floor layouts of one or several floors of the building with indications of the different areas of the building, such as classrooms, hallways, auditoriums, cafeterias, etc., and indications of the entrances and/or exits to and/or from the building.

Furthermore, the information may include the location of the shooter or of the center of dangerous event, such as the location of a fire. Still further, the information may include a danger zone indicating an area within a threshold distance of the shooter or of the center of the dangerous event, or an area from which occupants cannot safely exit the building. If the dangerous event is a gunshot, the danger zone may be determined based on the location of the shooter, the type of weapon being fired, the number of rounds that have been fired, and an estimated number of rounds remaining in the weapon. For example, the danger zone may include locations within the range of fire based on the type of weapon. If the dangerous event is a weapon, the danger zone may be determined based on the location of the person carrying the weapon, the type of weapon, and an estimated number of rounds included in the weapon. If the dangerous event is a fire, the danger zone may be determined based on the size and location of the fire, and/or areas in which the fire is likely to spread.

Additionally, the information may include indications of the number of occupants in each area of the building or zone of the building premises, such as the number of occupants in each classroom, hallway, auditorium, cafeteria, parking lot, field, court, playground, etc., as well as the precise locations of each occupant within a particular area or zone. The server computing device 302 may generate the indoor and outdoor map views based on map data from a map database.

FIG. 5 illustrates an example outdoor map display screen 500 of an administrator application. While the outdoor map display screen 500 is referred to as part of the administrator application, the outdoor map display screen 500 may be included in the student/occupant application, parent application, or emergency responder application. In any event, the outdoor map display screen 500 includes a 3D model of the exterior of the building 502, and a layout of the building premises 504. The 3D model of the exterior of the building 502 may depict the location of the building within the building premises 504, entrances and exits to the building, etc. Additionally, the layout of the building premises 504 may be divided into zones (e.g., Zones A-G) and may include an indication of the number of occupants in each zone (e.g., 0 occupants in Zone A) and/or indications of the precise locations of each occupant within a particular zone. Each occupant may be indicated by a dot or any other suitable indicator.

In some embodiments, each zone may correspond to a detection area of one of the pods 100 located on the building premises exterior to the building. In other embodiments, a zone may correspond to multiple detection areas of multiple pods 100 located on the building premises exterior to the building. The zones may be distributed such that each zone is the same size or the zones may be different sizes. For example, the zones may be divided such that the zones correspond to different surfaces or structures within the building premises 504 (e.g., Zone A corresponds to a grass field with a tennis court, Zone B corresponds to a playground, Zones C-G correspond to a parking lot, etc.). Moreover, the outdoor map display screen 500 may include indications of the number of occupants within each portion of the exterior and interior of the building, such as the number of occupants inside the building, the number of occupants in the parking lot, the number of occupants on the grass field, and the number of occupants on the playground.

In some embodiments, the outdoor map display screen 500 is presented as a home screen when a dangerous event has not been detected. When the server computing device 302, and more specifically, the gunshot detector 316 or the computing device 128 in a pod 100 identifies a dangerous event, the server computing device 302 provides an alert to the administrator application for display in the outdoor map display screen 500. The server computing device 302 also begins recording video, image, and other sensor data collected from the pods 100 by storing the video data, image data, and other sensor data in the database 306. Also in some embodiments, in some scenarios such as when a weapon is detected, the server computing device 302 provides an alert to the administrator application for display in the outdoor map display screen 500. The administrator application may include a user control for determining whether to begin recording video, image, and other sensor data collected from the pods 100. If the building/school administrator selects the user control, the server computing device 302 begins recording video, image, and other sensor data collected from the pods 100 by storing the video data, image data, and other sensor data in the database 306.

The collected sensor data or interpretations of the collected sensor data (e.g., an indication that a dangerous event has been detected, indications of the danger zone, indications of the locations of occupants within the building premises, an indication of the location of an active shooter, etc.) is/are then used by the server computing device 302, and more specifically, the building map generator 318 to generate indoor and outdoor map data for display on the client computing device 304, via the administrator application. The outdoor map display screen 500 includes a user control 506 for presenting the outdoor map display 500 (e.g., by selecting the "Full Property" or "Outside" tabs) or an indoor map display (e.g., by selecting the "Inside" tab) depicting the interior of the building. Indoor map displays are discussed in more detail below with reference to FIGS. 6A-8C and 10A-10B. Moreover, the outdoor map display screen 500 includes a user control to view recent alerts 508, such as an alert that a dangerous event has been detected as described above, alerts regarding the location of the dangerous event and/or the danger zone, alerts regarding the number of occupants in the danger zone, alerts regarding the number of injured occupants and their respective locations, alerts regarding whether the dangerous event is ongoing or has ended, etc. The outdoor map display screen 500 may also include a user control for viewing a live video feed 510 from one or several of the pods 100. For example, the administrator application may present a live video feed from the pod 100 closest to the shooter or from pods 100 having detection areas within the danger zone during a dangerous event. Furthermore, the outdoor map display screen 500 includes a user control for viewing visitor information 512, such as biographical information for each visitor, the location of each visitor within the building, the check-in times for each visitor, etc.

When a user launches the administrator application, the student/occupant application, the parent application, or the emergency responder application, the home screen may initially display the outdoor map display screen 500. In other embodiments, the home screen may initially display an indoor map display depicting the interior of the building. In yet other embodiments, when a dangerous event occurs, the home screen may initially display the exterior or the interior of the building based on whether the danger zone for the dangerous event is at the exterior or the interior of the building. When the home screen initially displays the outdoor map display screen 500, an indoor map display screen may be presented in response to selecting the user control 506 requesting an indoor map display.

Figure 6A:
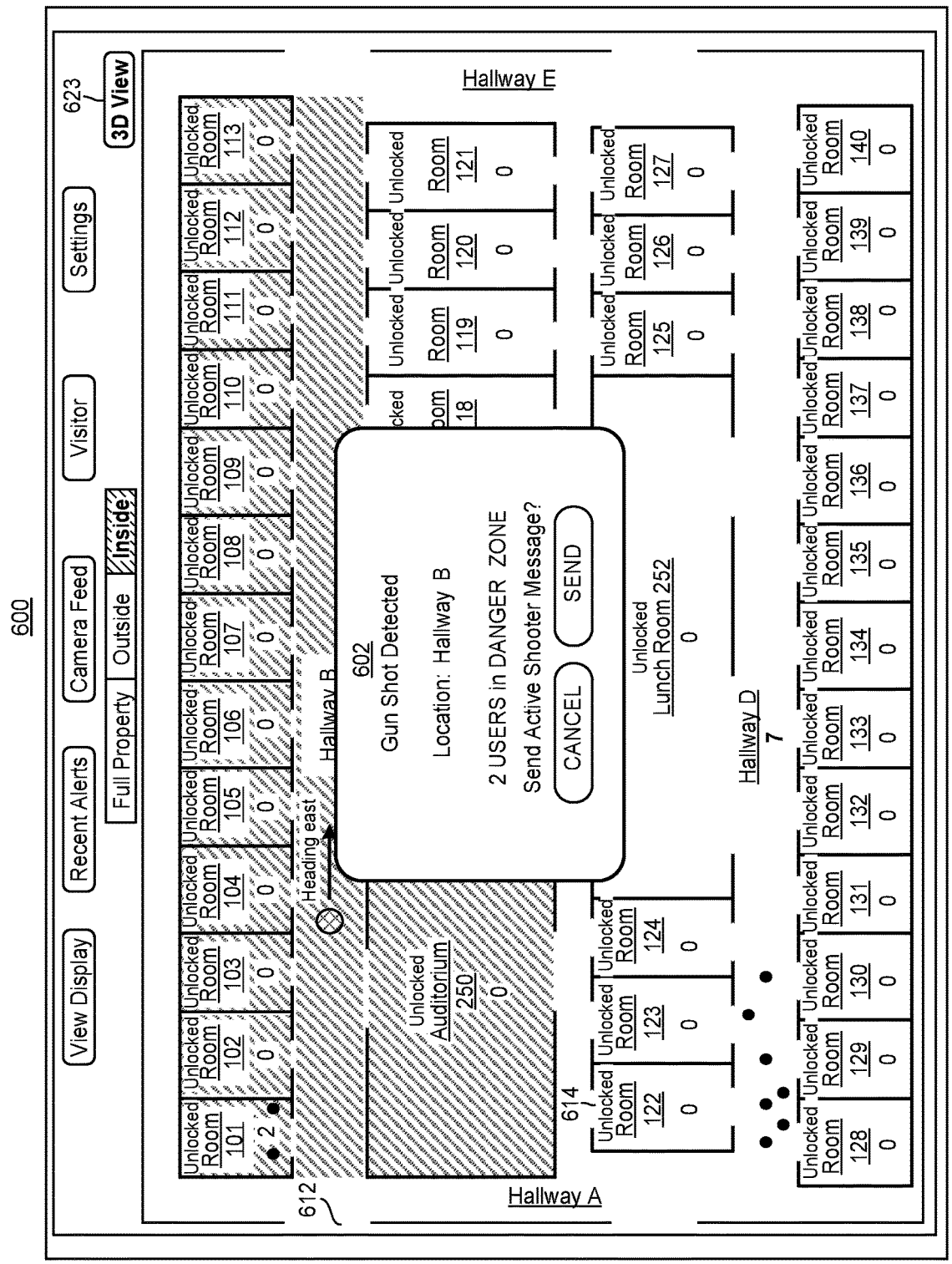
FIG. 6A illustrates an example gunshot alert screen of an administrator application.

FIG. 6A illustrates an example gunshot alert screen 600 of an administrator application. The gunshot alert screen 600 presents a gunshot alert 602 indicating that a gunshot has been detected in the building, the location of the gunshot (Hallway B), and the number of users in the danger zone. The gunshot alert screen 600 may also include user controls for sending an active shooter message to students/occupants, parents, emergency responders, or other interested parties. If the administrator selects the "SEND" button, the administrator application may provide a request to the server computing device 302 to send an alert for the building. In turn, the server computing device 302 may identify each user having permission to receive alerts for the particular building, and may retrieve contact information (e.g., an email address, a phone number, an application identifier) for the users. The server computing device 302 may then provide alerts to each of the users via the contact information. For example, the server computing device 302 may send push notifications to each of the users alerting the users of the dangerous event.

In this example, the gunshot alert screen 600 is presented within an indoor map display for example, because the gunshot is detected in the interior of the building. The gunshot alert screen 600 may be presented within the outdoor map display screen 500 of FIG. 5, such as when the dangerous event is detected at a location exterior to the building.

In some embodiments, the administrator application presents a home screen, such as an indoor map of the building without any occupant location information when a dangerous event has not been detected. When the server computing device 302, and more specifically, the gunshot detector 316 identifies a dangerous event, the server computing device 302 provides an alert to the administrator application for display in the gunshot alert screen 600. The server computing device 302 also begins recording video, image, and other sensor data collected from the pods 100 by storing the video data, image data, and other sensor data in the database 306. Also in some embodiments, in some scenarios such as when a weapon is detected, the server computing device 302 provides an alert to the administrator application for display in the gunshot alert screen 600. The administrator application may include a user control for determining whether to begin recording video, image, and other sensor data collected from the pods 100. If the building/school administrator selects the user control, the server computing device 302 begins recording video, image, and other sensor data collected from the pods 100 by storing the video data, image data, and other sensor data in the database 306.

Figure 6B:
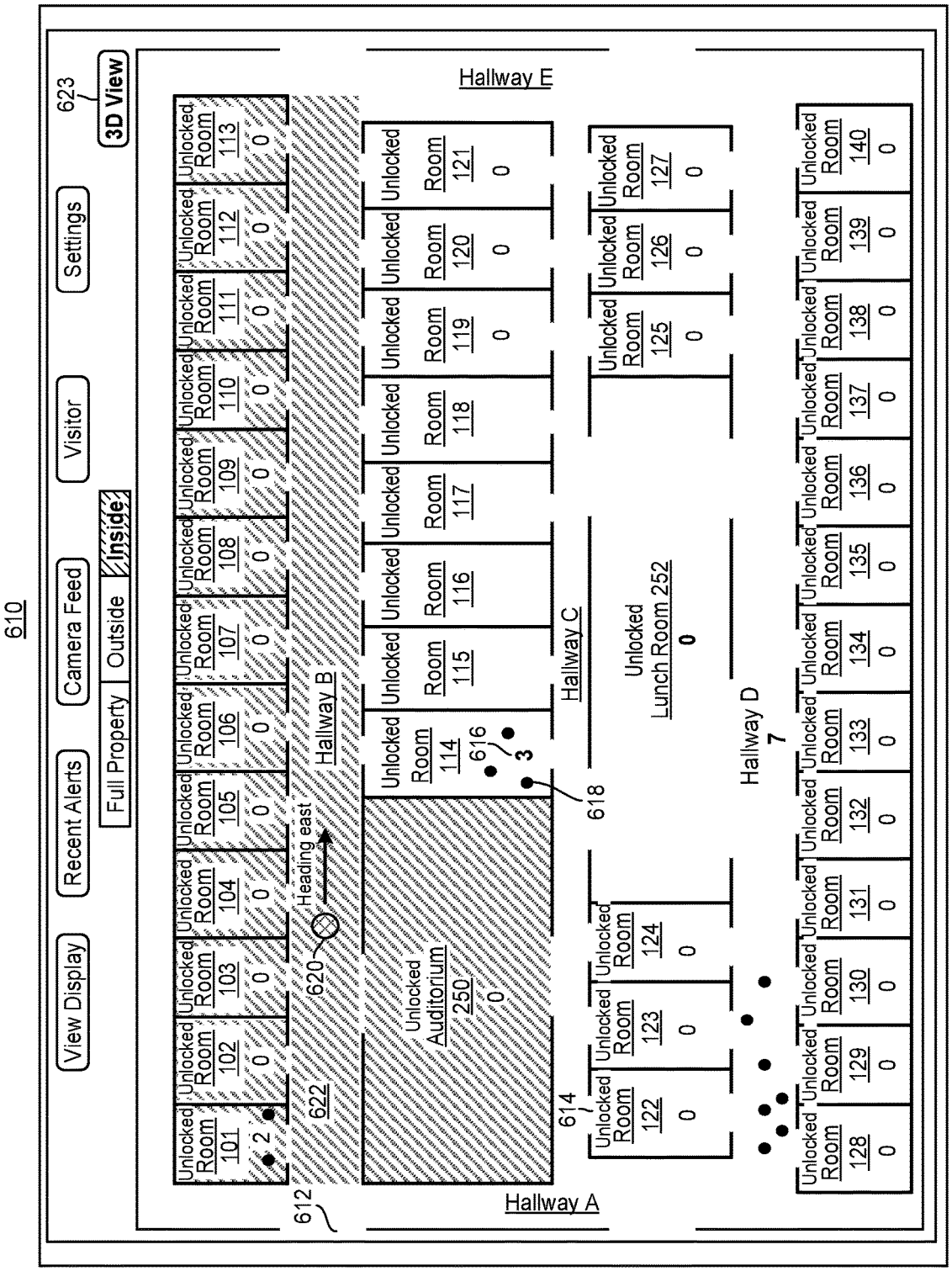
FIG. 6B illustrates an example indoor map display screen of an administrator application.

The collected sensor data is then used by the server computing device 302, and more specifically, the building map generator 318 to generate indoor and outdoor map data for display on the client computing device 304, via the administrator application. FIG. 6B illustrates an example indoor map display screen 610 of the administrator application. The indoor map display screen 610 may include a floor layout indicating each area of the floor, such as rooms, hallways, auditoriums, cafeterias, etc. The indoor map display screen 610 may also indicate each of the exits 612 from the building or stairwells and exits from each of the rooms 614. Furthermore, the indoor map display screen 610 may indicate the number of occupants 616 in each area of the building, such as the number of occupants in each room and hallway. Still further, the indoor map display screen may include indications of the precise locations of each occupant 618 within a particular area. For example, Room 114 has three occupants each located in the bottom half of the room. In some embodiments, each occupant is indicated by a dot 618 or other suitable indicator. Moreover, the indoor map display screen 610 may indicate whether each door on the floor is locked or unlocked. As described above, the administrator application may include user controls for automatically locking and unlocking doors and for selecting which doors to lock and unlock. Additionally, the administrator application may present notifications when doors are locked and unlocked including the location of each door which is locked or unlocked. The indoor map display screen 610 may present indications of current lock states (e.g., locked or unlocked) of each of the doors.

The indoor map display screen 610 also may indicate the location 620 of the shooter and/or the direction the shooter is moving (e.g., "Heading east"). The indoor map display screen 610 may use a different icon, symbol, or indicator for the location of the shooter 620 than for the locations of the occupants. In some embodiments, the location of the shooter 620 may be indicated by a larger icon than the locations of the occupants. Also in some embodiments, the shooter indicator 620 may be highlighted in a different color or shading than the other occupant indicators. In any event, in addition to presenting the location of the shooter, the indoor map display screen 610 may present an indication of a danger zone 622. The danger zone 622 is an area within a threshold distance of the shooter or of the center of the dangerous event, or an area from which occupants cannot safely exit the building. The administrator application may highlight the danger zone in a different color (e.g., red) or shading from the rest of the floor layout. As shown in FIG. 6B, Rooms 101-113, Hallway B, and Auditorium 250 are included in the danger zone. These areas may be included because Auditorium 250, parts of Hallway B, and Rooms 102-105 are within a threshold distance of the shooter 620. While Rooms 101, 106-113, and other parts of Hallway B may not be within the threshold distance of the shooter 620, these areas are included in the danger zone because occupants cannot safely exit the building from these areas without encountering the shooter. For example, while Room 113 appears to be far away from the shooter, the only exit out of Room 113 is into Hallway B which could be in the line of vision of the shooter. On the other hand, Room 114 is much closer to the shooter than Room 113, but is not included in the danger zone 622 because occupants can exit Room 114 from the south exit into Hallway C where the occupants can head west and leave from the building from the southwestern exit without ever encountering the shooter 620.

As mentioned above, the server computing device 302 generates the indoor map data by retrieving and analyzing sensor data or interpretations of the sensor data from the pods 100. As used herein, the term "sensor data" may also be used to refer to interpretations of the sensor data or any other data derived from the sensor data. The server computing device 302 analyzes the sensor data or interpretations of the sensor data to identify the location of a gunshot which is then used to locate the shooter in the indoor map display 610. The server computing device 302 may identify an occupant in a particular detection area via a combination of temperature data or heat signatures from an IR image that are within a threshold body temperature range corresponding to a human and image data having features resembling a person. The server computing device 302 may also determine a precise physical location of the occupant within the particular detection area from the image data based on the pixel locations of the group of pixels that include the person. The server computing device 302 may then provide an indication of the number of occupants in a particular detection area and their precise physical locations to the client computing device 304 for display in the indoor map display screen 610.

In other embodiments, the computing device 128 in a pod 100 may identify an occupant in the particular detection area for the pod 100 via a combination of temperature data or heat signatures from an IR image that are within a threshold body temperature range corresponding to a human and image data having features resembling a person. The computing device 128 in the pod 100 may also determine a precise physical location of the occupant within the particular detection area from the image data based on the pixel locations of the group of pixels that include the person. The computing device 128 in the pod 100 may provide an indication of the number of occupants and their precise physical locations within the detection area for the pod 100, and an indication of the location of the pod 100 and/or identification information for the pod 100 to the server computing device 302. The server computing device 302 may then provide the indication of the number of occupants in the detection area and their precise physical locations to the client computing device 304 for display in the indoor map display screen 610.

The indoor map display screen 610 may present indications of the occupants' and shooter's locations in real-time or at least near real-time by receiving updated location information from the server computing device 302. For example, as described above, the pods 100 may detect images and IR images continuously or periodically (e.g., 10 frames per second, 60 frames per second, 120 frames per second, etc.), and the server computing device 302 or the computing device 128 within a pod 100 may analyze the most recent images to identify real-time or at least near real-time locations of the occupants and/or the shooter. In this manner, an administrator viewing the indoor map display screen 610 may track movement of the shooter and the occupants. Furthermore, the server computing device 302 or the computing device 128 within the pod 100 may also determine movement of the shooter and the occupants based on changes in the shooter's and occupants' locations over time. The server computing device 302 or the computing device 128 within the pod 100 may utilize the movement data to identify occupants who have not moved over a threshold time period, may be injured, and may require emergency assistance. The server computing device 302 or the computing device 128 within the pod 100 may also utilize the movement data to identify an occupant moving toward the danger zone. This may cause the server computing device 302 to generate and provide additional alerts to the occupant's client computing device 304 via the student/occupant application, as described in more detail below.

In some embodiments, the server computing device 302 also determines the identities of the occupants in addition to their locations. For example, the occupants may have lanyards or other client computing devices 304 with communication interfaces to communicate with the pods 100 over short-range communication links (e.g., Bluetooth®, Bluetooth® LE). More specifically, the pod 100 may broadcast a Bluetooth LE signal which is received at a lanyard or other client computing device 304 of an occupant. If, for example, the strength of the signal exceeds a threshold signal strength, the lanyard or other client computing device 304 may determine that the lanyard or other client computing device 304 is within the detection area of the pod 100 broadcasting the Bluetooth LE signal. The Bluetooth LE signal may also include a unique identifier for the pod 100, so that the lanyard or other client computing device 304 obtains an indication of the particular pod 100 broadcasting the signal. The lanyard or other client computing device 304 may then transmit an indication of its location within the building to the server computing device 302 in addition to identification information for the user of the lanyard or other client computing device 304. Accordingly, the server computing device 302 may compare the received location to the identified locations of the occupants to determine the identities of the occupants. For example, John Doe's client computing device 304 may indicate that he is in a similar location as the occupant indicated by dot 618 in the indoor map display screen 610. The server computing device 302 may determine that the occupant indicated by dot 618 is John Doe, and identification information for John Doe may be presented on the indoor map display screen 610. For example, the identification information may be presented adjacent to dot 618. In another example, the identification information may be presented in response to a selection of dot 618.

While the indoor map display screen 610 in FIG. 6B includes a floor layout for a single floor, the indoor map display screen 610 may present any suitable number of floor layouts for any suitable number of floors. The indoor map display screen 610 may also include a user control for selecting one of the floors for displaying the corresponding floor layout. For example, the indoor map display screen 610 may present a floor layout of the first floor with a user control for selecting floor layouts corresponding to floors one to four. Then in response to a selection of a user control requesting to display the third floor, the indoor map display screen 610 may present a floor layout of the third floor and may remove the floor layout of the first floor from the display. In other embodiments, the indoor map display screen 610 may present the floor layouts for higher floors above the floor layouts for lower floors, such that multiple floor layouts may be presented simultaneously. Additionally, while the indoor map display screen 610 presents a 2D map display of the building, the indoor map display screen 610 may present a 3D map display, for example in response to a selection of the user control 623 for presenting a 3D view of the floor layout.

Figure 6C:
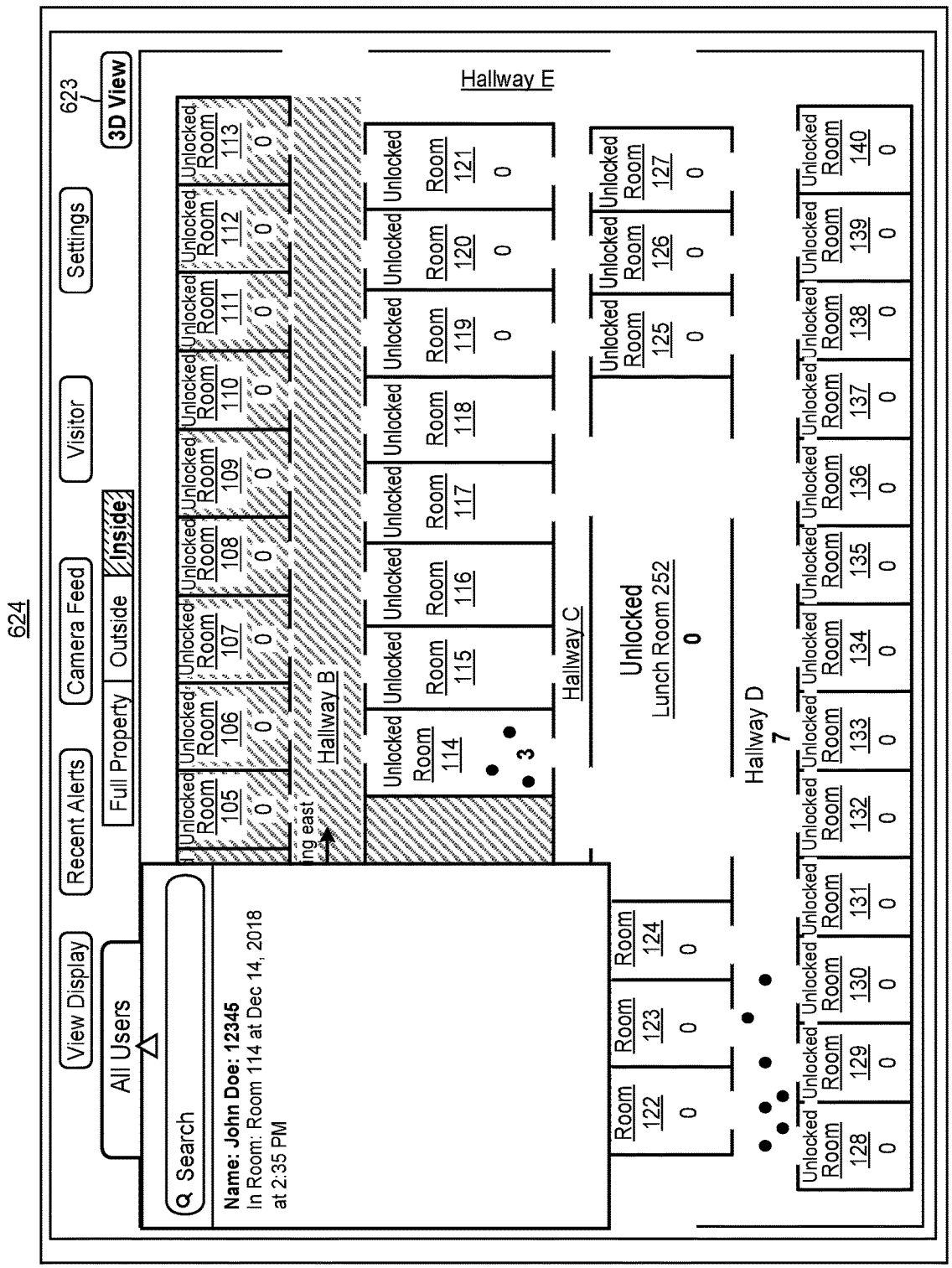
FIG. 6C illustrates an example search screen of an administrator application.
Figure 6D:
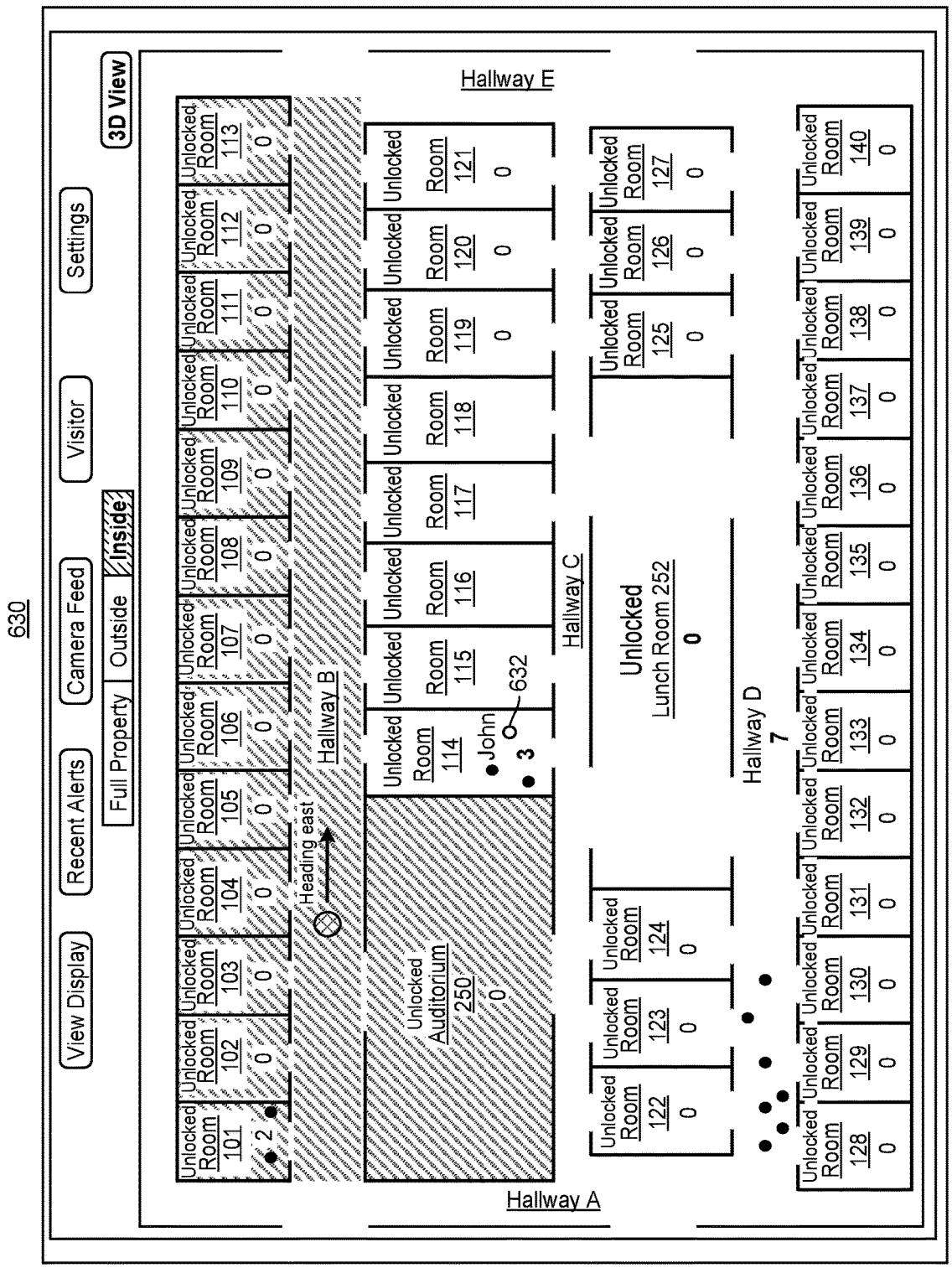
FIG. 6D illustrates an example indoor map display screen of an administrator application including highlighted search results.

In any event, the administrator application may also include search functionality for the administrator to search for a particular student/occupant in the building. FIG. 6C illustrates an example search screen 624 of the administrator application. In the search screen 624, the administrator may enter a particular student or occupant's name or other identification information into a search bar. In some embodiments, the administrator application transmits the search query to the server computing device 302 which, in turn, identifies one or more occupants in the building matching the search query and provides search results to the administrator application. In other embodiments, the client computing device 304 locally stores a listing of each of the occupants in the building, and the client computing device 304 retrieves search results in response to the search query. In any event, the search results may include the name of the occupant (e.g., John Doe), a unique identifier for the occupant (e.g., 12345), an indication of the location of the occupant (e.g., Room 114), and an indication of the most recent time in which the occupant was identified at that location (e.g., 2:35 PM). If the administrator selects the search result, the indoor map display screen 630 may highlight the indication of the occupant's location 632 by for example, presenting the occupant's location in a different color or shading as shown in FIG. 6D. The indoor map display screen 630 may also present identification information for the occupant at or near the occupant's location.

Figure 6E:
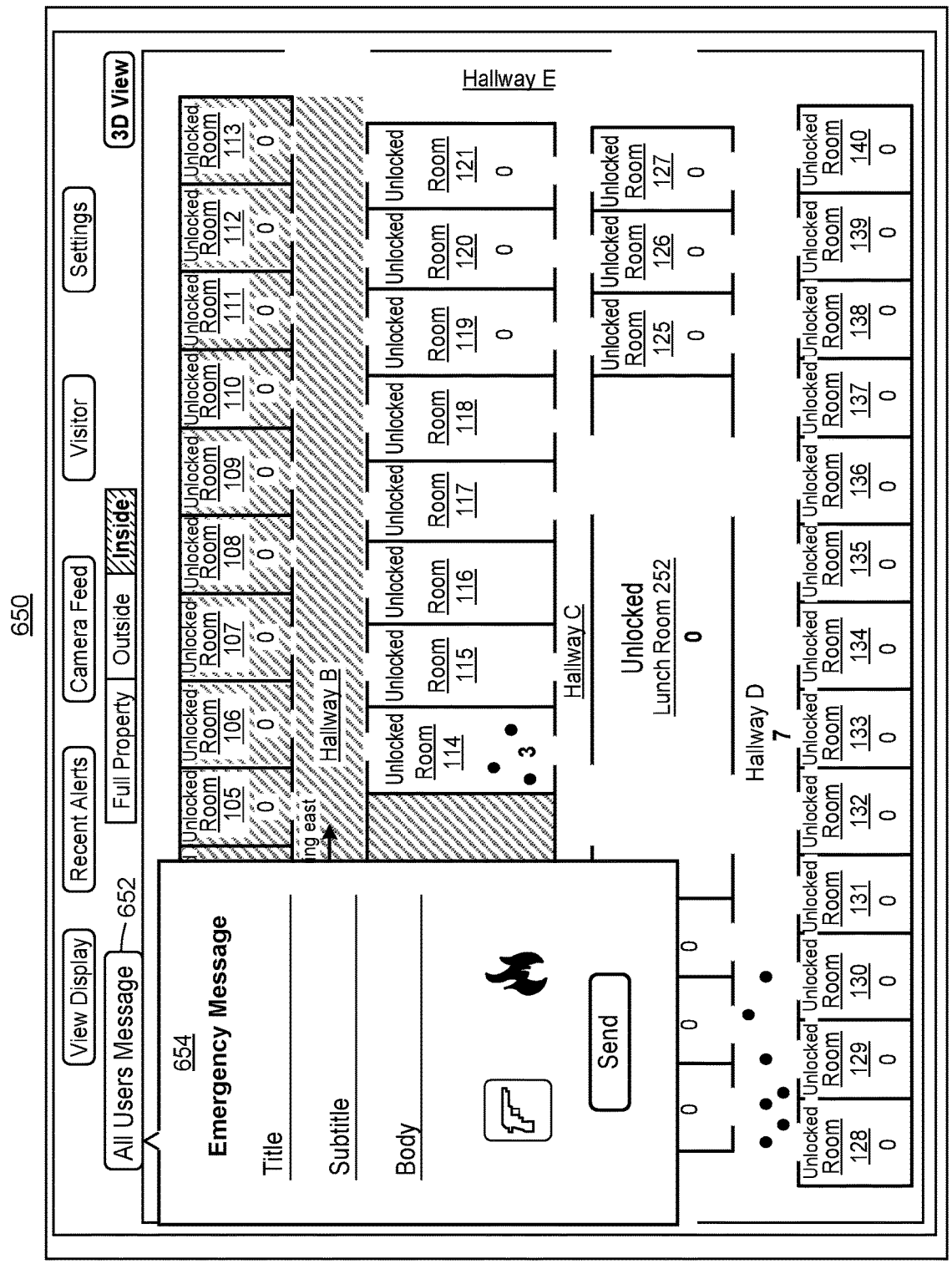
FIG. 6E illustrates an example message screen of an administrator application for sending a message to all users.
Figure 6F:
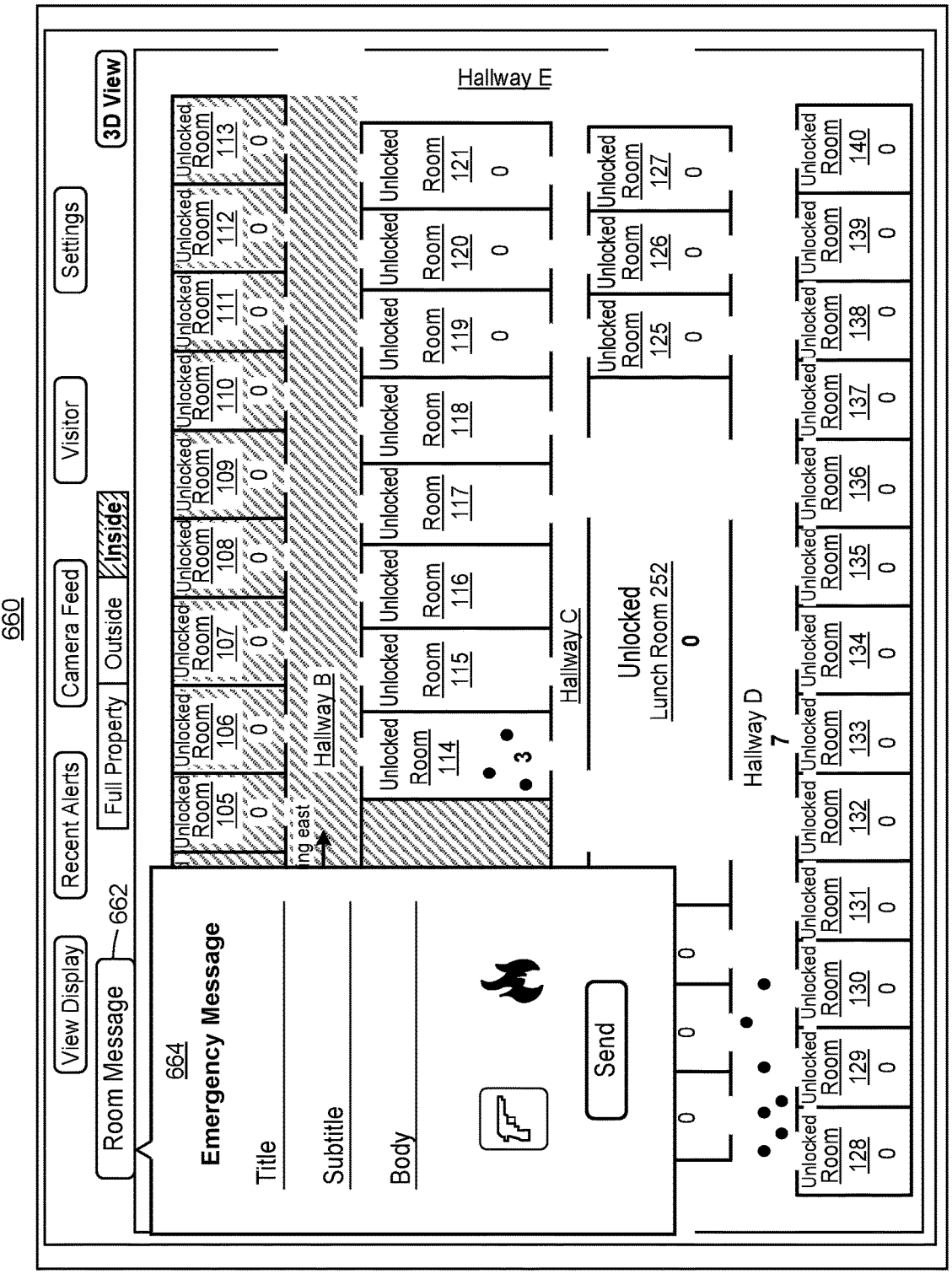
FIG. 6F illustrates an example room message screen of an administrator application for sending a room-specific message to corresponding users.

In addition to displaying an indoor map of the building, the administrator application may include a user control for generating and sending emergency messages to students/occupants, parents, emergency responders, or other interested parties. FIG. 6E illustrates an indoor map display screen 650 having a user control 652, which when selected, presents a message display 654 for the administrator to enter an emergency message which may be sent to each of the students/occupants as well as parents, emergency responders, or other interested parties. In some embodiments, the emergency message may be transmitted to client computing devices 304 of the students/occupants, parents, and emergency responders via email, SMS, or push notification. The emergency message may also be converted into an audio message, which may be presented via the speakers of the pods 100. FIG. 6F illustrates an indoor map display screen 660 having a user control 662, which when selected, presents a message display 664 for the administrator to enter a room-specific message which may be sent to students/occupants in a particular room. In some embodiments, the emergency message may be transmitted to client computing devices 304 of the students/occupants in the particular room via email, SMS, or push notification. The emergency message may also be converted into an audio message, which may be presented via the speakers of the pods 100 that are located in the particular room. The message display 664 may include user controls for the administrator to select the room(s) for the emergency message.

In some embodiments, the administrator application may present a live video feed from one or several of the pods 100. For example, the administrator application may present a live video feed from the pod 100 closest to the shooter.

Figure 6G:
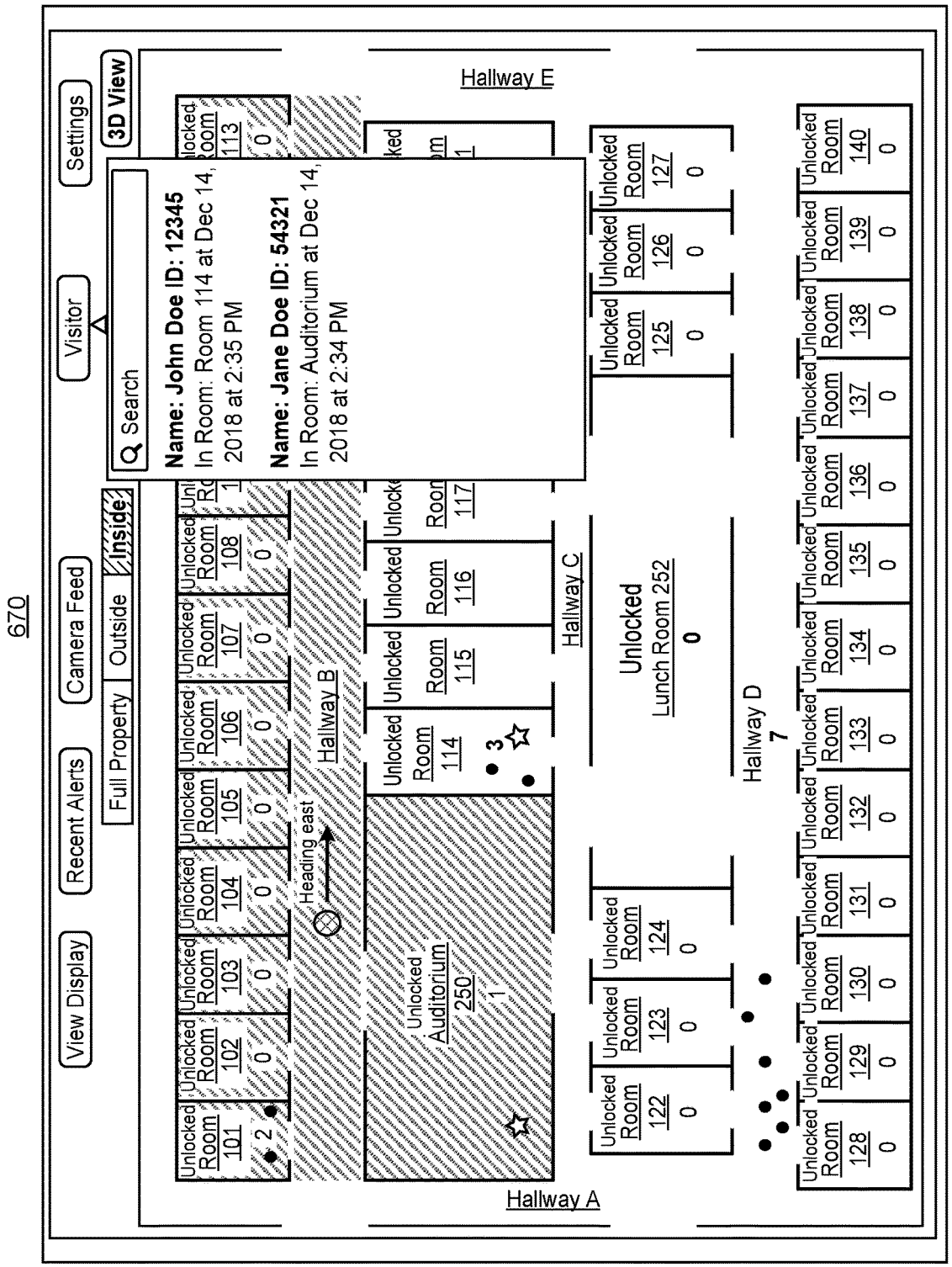
FIG. 6G illustrates an example guest search screen of an administrator application for searching for the location of a visitor.

As mentioned above, the administrator application may also provide a view of the location of a guest within the building. FIG. 6G is an example guest search screen 670 of an administrator application displayed on a client computing device 304 (e.g., smartphone, laptop, tablet, monitor, etc.), such as a computing device at a visitor station. The guest search screen 670 may present a view of each of the guests in the building, and/or may include a user control for an administrator to enter a particular guest's name or other identification information, for example via a search bar. In some embodiments, the administrator application transmits the search query to the server computing device 302 which, in turn, identifies one or more guests in the building matching the search query and provides search results to the administrator application. In other embodiments, the client computing device 304 locally stores a listing of each of the guests in the building, and the client computing device 304 retrieves search results in response to the search query. In any event, the search results may include the name of the guest (e.g., John Doe, Jane Doe, etc.), a unique identifier for the guest (e.g., 12345, 54321), an indication of the location of the guest (e.g., Room 114, Auditorium), and an indication of the most recent time in which the guest was identified at that location (e.g., 2:35 PM, 2:34 PM).

Figure 6H:
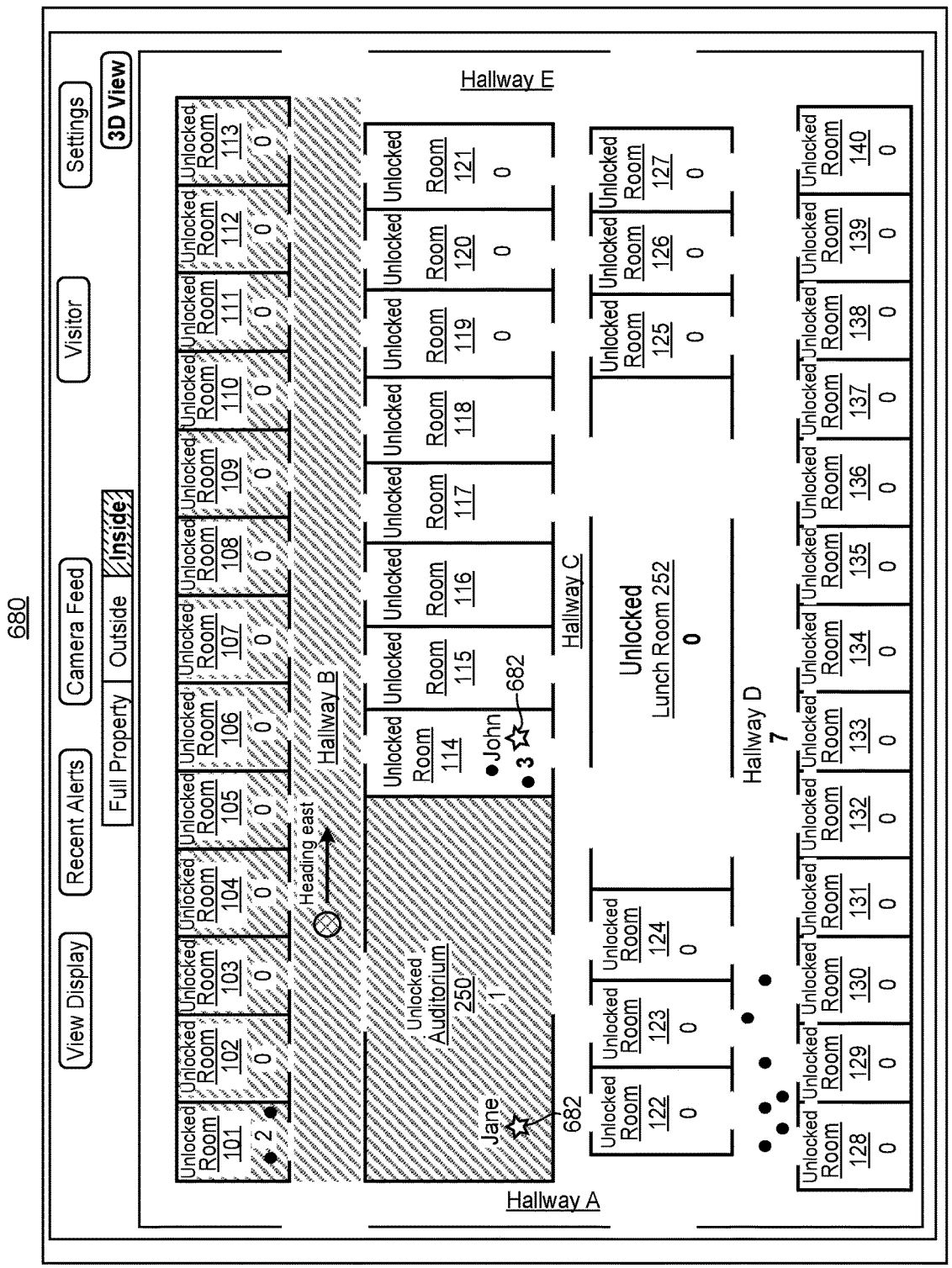
FIG. 6H illustrates an example indoor map display screen of an administrator application which includes indications of the locations of visitors.

If the administrator selects the search result, the indoor map display screen 360, illustrated in FIG. 6H, may highlight the indication of the guest's location. The administrator may select an 'All' button to display all of the guests' locations simultaneously on the indoor map display screen 680. For example, the indoor map display screen 680 may indicate the guest's location with a symbol different than that of the students, teachers, or other occupants of the building allowing an administrator to easily identify the location of the guests, for example as indicated by the stars 682 in FIG. 6H. In some embodiments, the location of the guests may be indicated on the indoor map display screen 680 by using symbols of different colors or shades than the symbols indicating the locations of students, teachers, and other occupants of the building. The indoor map display screen 680 may also present identification information for the guest at or near the guest's location.

Student/Occupant Application

The student/occupant application presents similar information as the administrator application, such as an alert notifying the student/occupant that a gunshot or other dangerous event has been detected, and indoor map data including floor layouts, an indication of the location of the shooter, a danger zone, and indications of the number of occupants in each area of the building and precise locations of each occupant within a particular area. The student/occupant application may also include information specific to the user. For example, the student/occupant application may identify the location of the user and highlight the indication of the user in the indoor map display. Additionally, the student/occupant application may determine whether it is safe for the user to exit the building based on the user's proximity to the shooter and/or the danger zone. If it is safe for the user to exit the building, the student/occupant application may present an indication of the exit and/or a path for the user to travel along on her way to the exit without entering the danger zone or the line of fire.

Figure 7A:
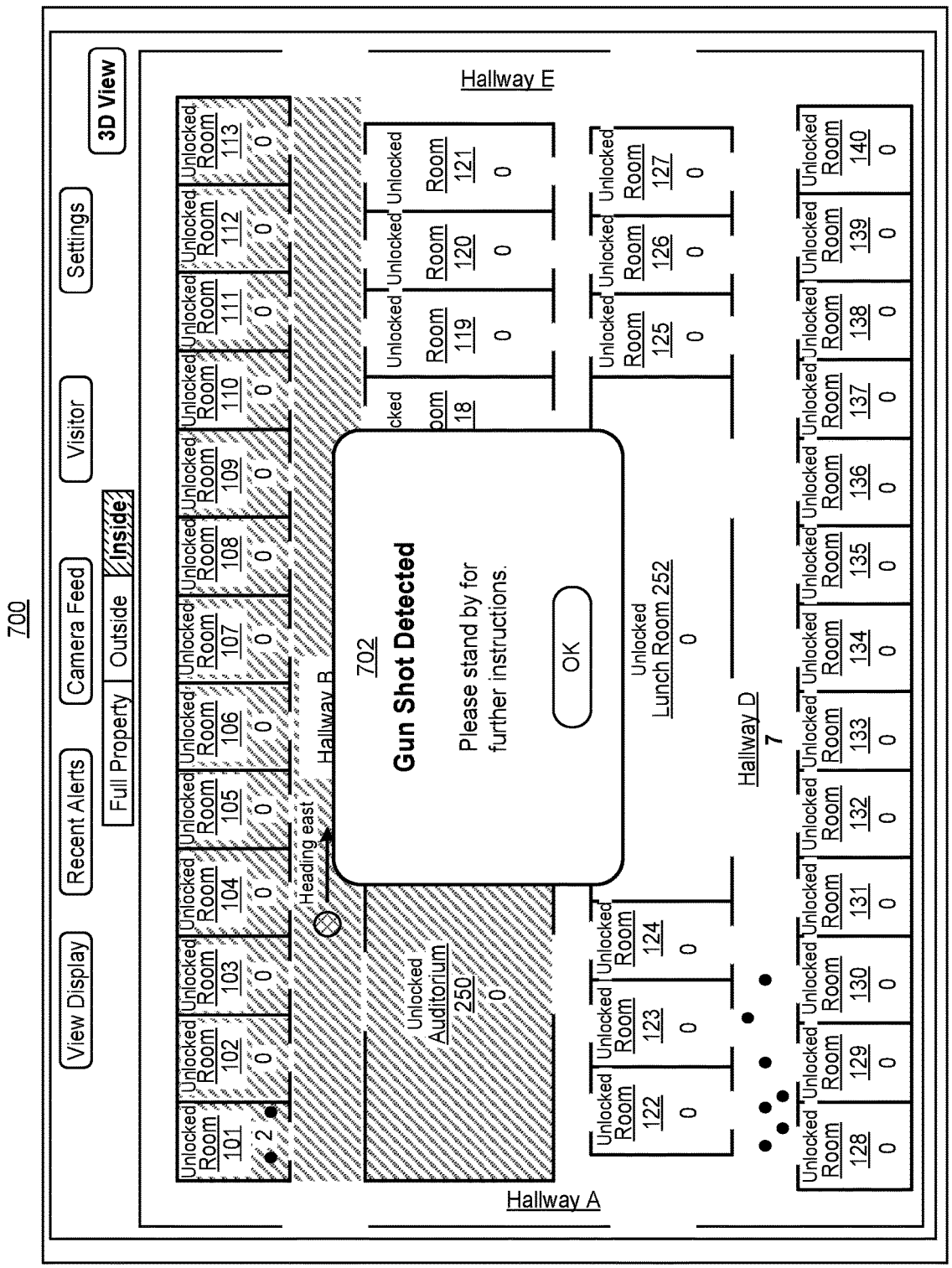
FIG. 7A illustrates an example gunshot alert screen of a student/occupant application.

FIG. 7A illustrates an example gunshot alert screen 700 of a student/occupant application. The gunshot alert screen 700 presents a gunshot alert 702 indicating that a gunshot has been detected in the building, and instructs the student/occupant to wait for further instructions. In some embodiments, the student/occupant application presents a home screen (not shown), such as an indoor map of the building without any occupant location information when a dangerous event has not been detected. The student/occupant application may also present a user profile/login screen (not shown) for receiving identification information for the user, and storing user profile information such as the user's name, phone number, the names of the user's parents or other relatives, etc. The user profile information may be stored at the server computing device 302 or the client computing device 304. In any event, when the server computing device 302, and more specifically, the gunshot detector 316 identifies a dangerous event or when the administrator selects a user control on the administrator application to send an active shooter message to students/occupants, the server computing device 302 provides an alert to the student/occupant application for display in the gunshot alert screen 700. The server computing device 302 also begins recording video, image, and other sensor data collected from the pods 100 by storing the video data, image data, and other sensor data in the database 306.

Figure 7B:
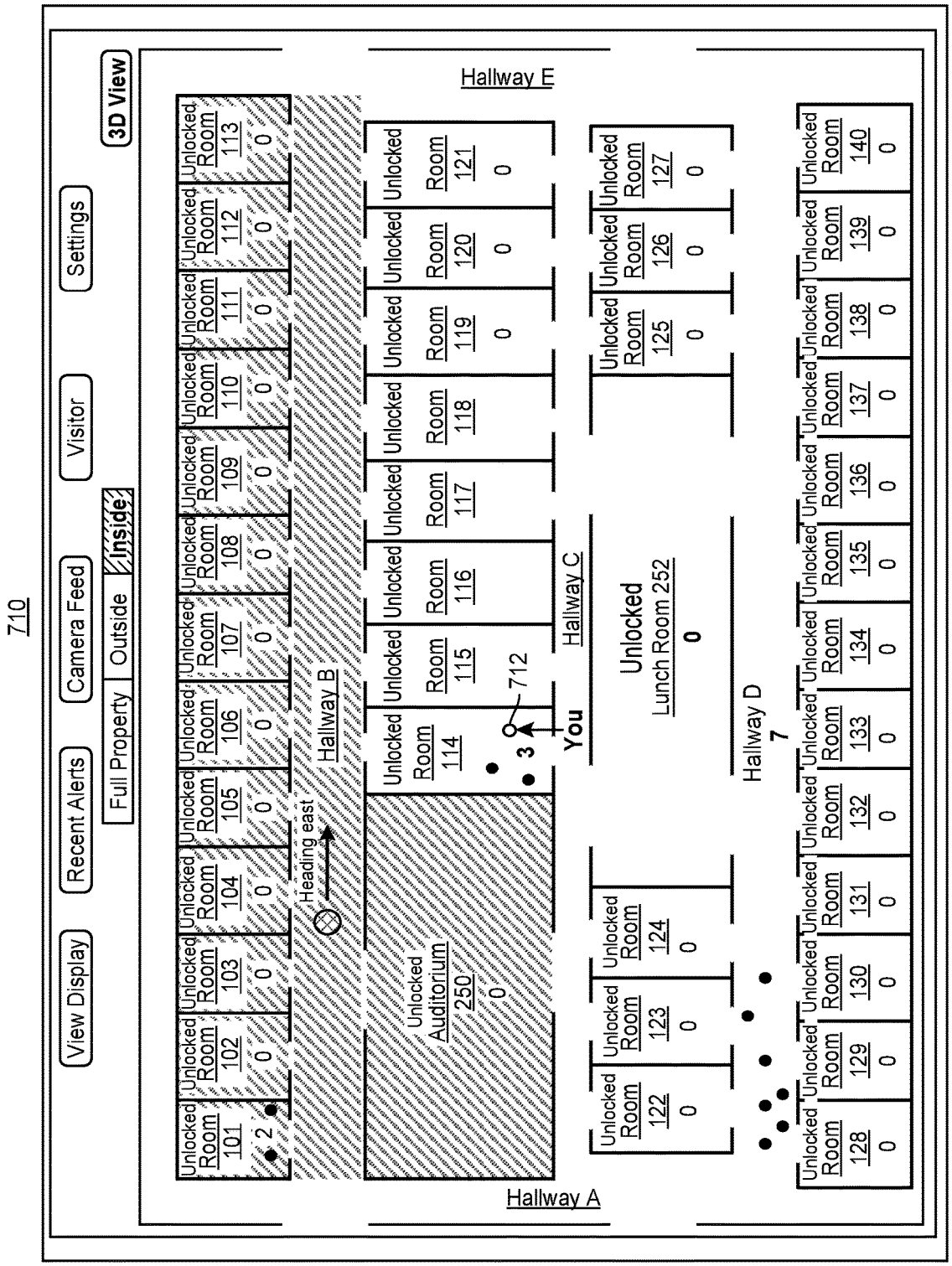
FIG. 7B illustrates an example indoor map display screen of a student/occupant application.

The collected sensor data is then used by the server computing device 302, and more specifically, the building map generator 318 to generate indoor map data for display on the client computing device 304, via the student/occupant application. FIG. 7B illustrates an example indoor map display screen 710 of the student/occupant application. The indoor map display screen 710 of the student/occupant application is similar to the indoor map display screen 610 of the administrator application. In some embodiments, the indoor map display screen 710 of the student/occupant application includes a different indication 712 for the location of the user than for the other occupants. For example, while the locations of the other occupants may be indicated with dark colored dots, the location of the user 712 may be indicated with a dot having a different color or shading. The location of the user 712 may also be highlighted with an arrow pointing to the location indicator for the user, and may include identification information for the user, such as the user's name or another term referring to the user, such as "You."

To determine the location of the user, the user's client computing device 304 may obtain a short-range communication signal (e.g., Bluetooth®, Bluetooth® LE) from one of the pods 100. The short-range communication signal may also include a unique identifier for the pod 100, so that the client computing device 304 obtains an indication of the particular pod 100 broadcasting the signal. If, for example, the strength of the signal exceeds a threshold signal strength, the client computing device 304 may determine that the client computing device 304 is within the detection area of the pod 100 broadcasting the Bluetooth LE signal. The client computing device 304 may then transmit an indication of its location within the building to the server computing device 302 in addition to identification information for the user. Accordingly, the server computing device 302 may compare the received location to the identified locations of the occupants to identify the occupant location indicator corresponding to the user. In some embodiments, the client computing device 304 then identifies the occupant location indicator in the indoor map display that is closest to the location of the user, and changes the identified occupant location indicator (e.g., a dark colored dot) to the indication for the location of the user 712 (e.g., a light colored dot with an arrow pointing at the light colored dot and the user's name or the word "You" adjacent to the arrow).

The user's location may further be determined via facial recognition techniques. For example, the client computing device 304 may determine that the user is within a particular detection area corresponding to one of the pods 100 when the client computing device 304 detects a short-range communication signal from the pod 100. To determine the precise physical location of the user within the detection area, the server computing device 302 may identify pixel locations of groups of pixels that include people in the detection area and may map the pixel locations to precise physical locations within the detection area. In some embodiments, the client computing device 304 or the server computing device 302 compares an image of the user to each group of pixels using facial recognition techniques to identify the group of pixels that depict the user. The client computing device 304 may then identify the location of the user as the precise physical location within the detection area that corresponds to the group of pixels matching with the image of the user.

In addition to locating the user within the indoor map display 710, the student/occupant application may determine whether it is safe for the user to exit the building based on the user's proximity to the shooter and/or the danger zone. For example, if the user is not within the danger zone, the client computing device 304 may determine it is safe for the user to exit the building. In some embodiments, the student/occupant application may present instructions to the user for handling the dangerous event based on the location of the user by presenting an indication of the exit and/or a path for the user to travel along on her way to the exit without entering the danger zone or the line of fire. If the user is within the danger zone, the student/occupant application may present instructions to the user for handling the dangerous event based on the location of the user by instructing the user not to leave her current location, and providing further instructions such as to lock and barricade the doors.

Figure 7C:
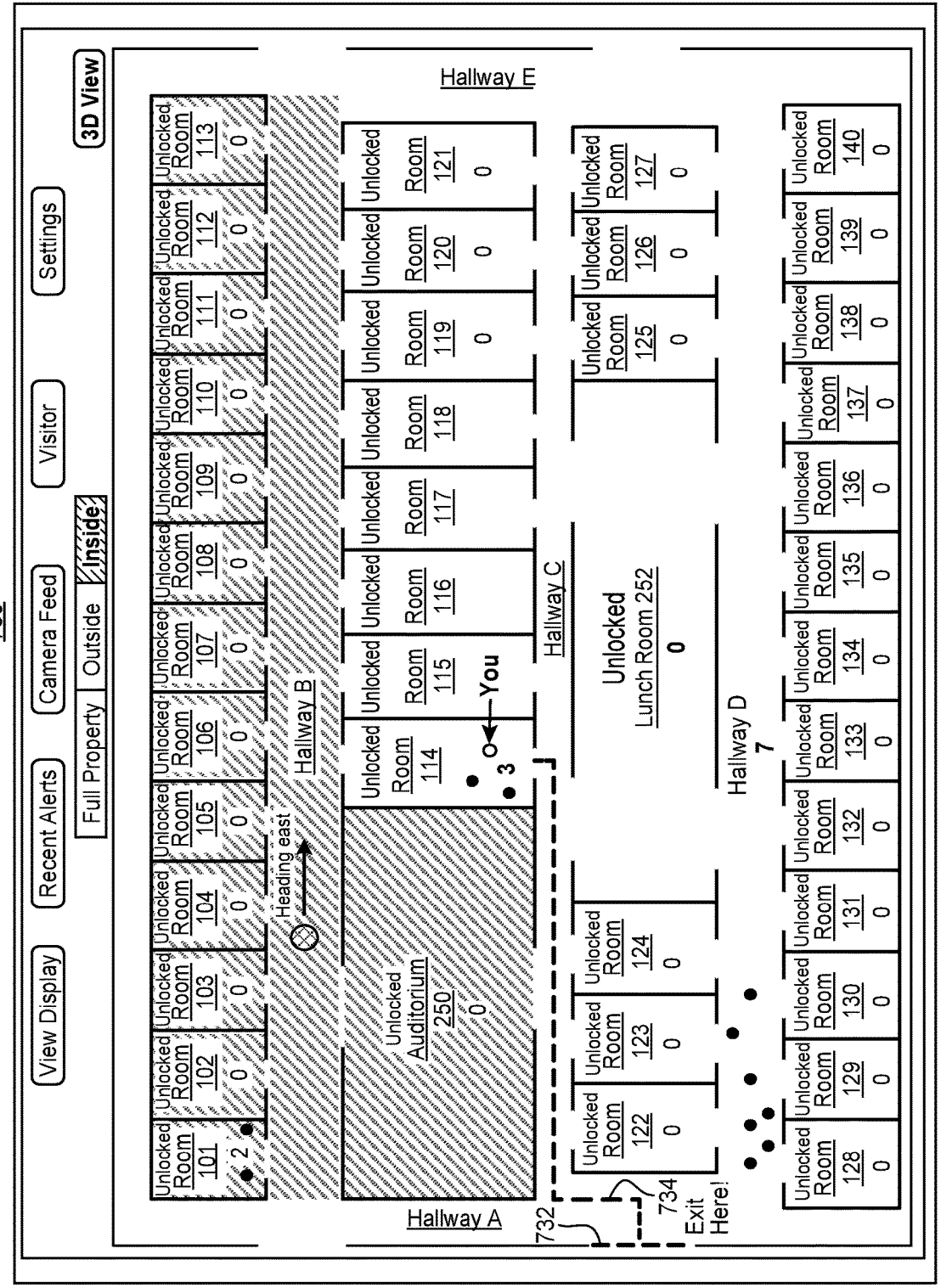
FIG. 7C illustrates an example navigation route to the nearest and/or safest exit overlaid on the example indoor map display screen of FIG. 7B.

FIG. 7C illustrates an example indoor map display 730 including an indication of a closest and/or safest exit 732 for the user and an indication of the path 734 for the user to travel along to reach the exit 732. The closest or safest exit 732 may be indicated in a different color or shading than the other exits or may be highlighted relative to the other exits. For example, the exits in the indoor map display 710 may be depicted with empty space, whereas the closest and/or safest exit 732 is depicted with a dashed line. The path 734 may be depicted with dashed lines along the route, by highlighting the route, or in any other suitable manner.

In any event, the server computing device 302 or the computing device 128 in a pod 100 may continuously or periodically determine the location of the user based on sensor data from the pods 100. The server computing device 302 may determine whether it is safe for the user to exit the building by comparing the most recent location of the user to the area included in the danger zone. The server computing device 302 may also determine whether any of the exits are outside of the danger zone. For example, as shown in FIG. 7C, the danger zone includes Rooms 101-113, Hallway B, and Auditorium 250. The user is in Room 114 and there are exits outside of the danger zone. Accordingly, the server computing device 302 determines that the user can safely exit the building.

Furthermore, the server computing device 302 may identify the closest and/or safest exit by comparing the locations of each of the exits to the location of the user and the location of the shooter. The server computing device 302 may generate proximity and safety scores, where the proximity score increases as the distance between the user and the exit decreases, and the safety score increases as the distance between the shooter and the exit increases. The proximity and safety scores may be aggregated, weighted, and/or combined in any suitable manner to generate an overall exit score, and the server computing device 302 may select the highest scoring exit as the exit for the user.

To determine the route from the user to the exit 732, the server computing device 302 may identify a series of waypoints along a shortest path to the exit 732 using a pathfinding method. More specifically, the server computing device 302 may generate a set of vertices in the indoor map display 730 where each vertex is a point on the indoor map display 730 which is not obstructed by a wall or door. The vertices may be distributed throughout the indoor map display 730, such that each vertex is at least a threshold distance away from the nearest vertex (e.g., one meter, three meters, etc. of real-world distance). Each pair of vertices may have an assigned weight according to the distance between the pair. The server computing device 302 may then find the shortest path to the exit 732 by identifying a subset of the vertices having the shortest combined distance to the exit 732 according to the respective weights. The subset of vertices may be referred to as waypoints.

If one of the waypoints intersects with the danger zone, the server computing device 302 may identify an alternate path from the previous waypoint to the exit 732. For example, the route 734 to the exit 732 may be for the user to exit Room 114 from the south exit, turn right down Hallway C, turn left down Hallway A, and exit from the southwest exit 732. If for example, the route 734 were to intersect with the danger zone at a waypoint after the right turn down Hallway C, the server computing device 302 may adjust the route to include a left turn down Hallway C. In any event, the server computing device 302 may provide an indication of the closest and/or safest exit 732 and the path 734 for the user to travel along to reach the exit 732 to the client computing device 304 for presentation in the indoor map display 730.

In addition to presenting the an indication of the closest and/or safest exit 732 and the path 734 for the user to travel along to reach the exit 732 on the client computing device 304, the server computing device 302 may communicate with the pods 100 on the path 734 to cause each of the pods 100 on the path 734 to activate light emitting elements 720 to signal the path 734 to the user, for example by sending control signals to the pods 100 on the path 734. For example, each of the pods 100 along the path 734 may activate LEDs having the same color (e.g., blue) or having the same blinking frequency or pattern (e.g., twice per second, three consecutive short blinks, a longer blink followed by a shorter blink, etc.) to signal the path 734 to the user. One or more of the pods 100, such as a pod 100 in Room 114 may announce via a respective speaker 108 the color or blinking frequency or pattern for the path 734. Occupants may then follow along the path 734 according to the announced color or blinking frequency or pattern to reach the closest and/or safest exit 732.

In some scenarios, the closest and/or safest exit 732 and path 734 to the closest and/or safest exit 732 may be different in different parts of the building. Accordingly, for a first occupant or set of occupants in a first area of the building, the server computing device 302 may determine a first route on a first path to a first exit. For a second occupant or set of occupants in a second area of the building, the server computing device 302 may determine a second route on a second path to a second exit. The server computing device 302 may also identify a first set of pods 100 along the first path and a second set of pods 100 along the second path. The server computing device 302 may then cause each of the first set of pods 100 along the first path to activate LEDs having a first color (e.g., yellow) or blinking frequency or pattern (e.g., once per second), and may also cause each of the second set of pods 100 along the second path to activate LEDs having a second color (e.g., purple) or blinking frequency or pattern (e.g., every two seconds) different from the first color or blinking frequency or pattern. One or more of the pods 100 in the first set of pods 100 may announce via a respective speaker 108 the color or blinking frequency or pattern for the first path, and one or more of the pods 100 in the second set of pods 100 may announce via a respective speaker 108 the color or blinking frequency or pattern for the second path. Then the occupants may follow along the corresponding path according to the announced color or blinking frequency or pattern to reach the closest and/or safest exit.

Figure 7D:
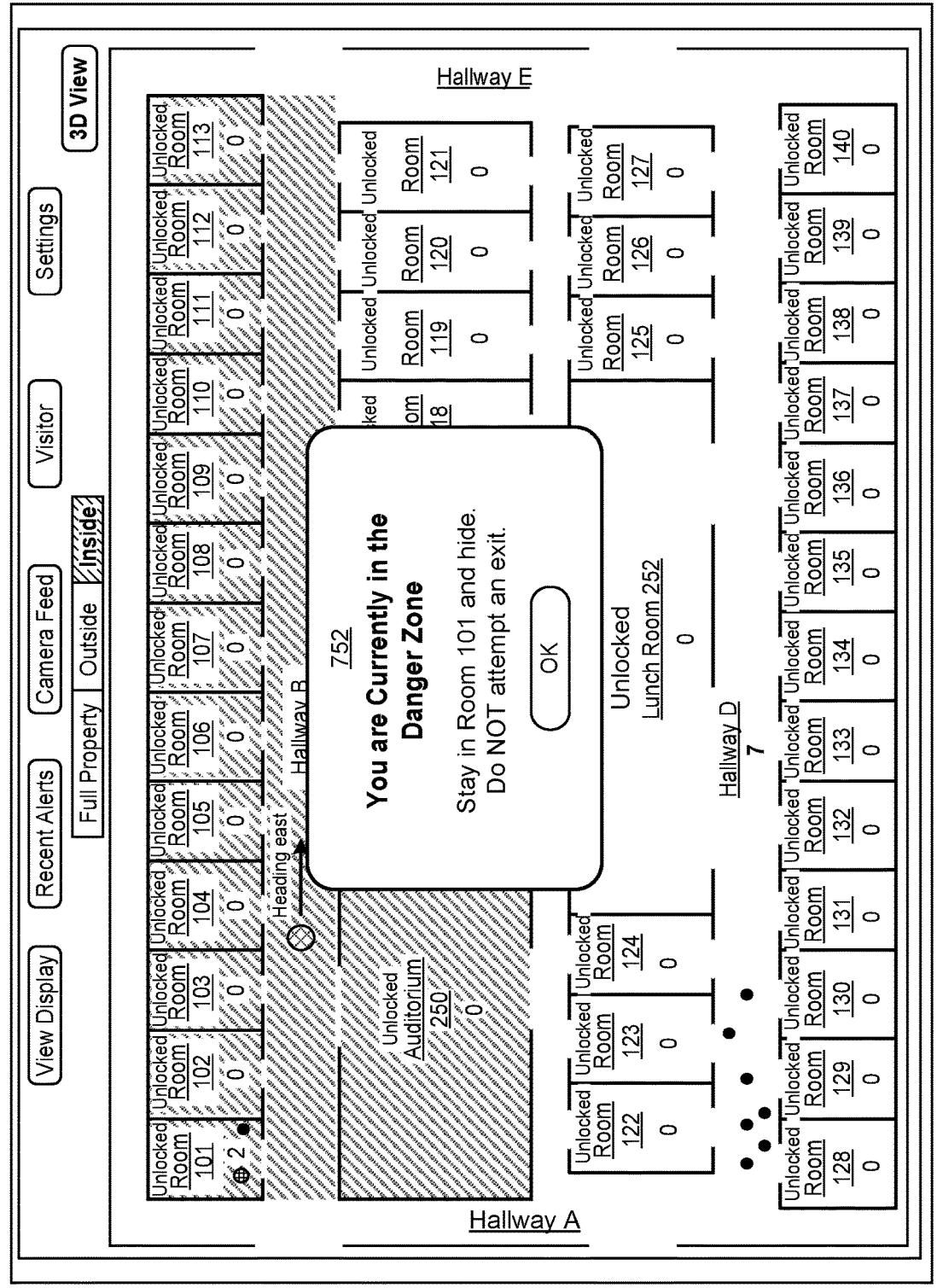
FIG. 7D illustrates an example instruction screen of a student/occupant application when there is no safe exit.

On the other hand, if the user is within the danger zone, the client computing device 304 may present an alert 752 indicating that the user is within the danger zone and instructing the user not to leave her current location, as shown in the indoor map display 750 of FIG. 7D. In some embodiments, the alert 752 may include further instructions such as to hide under a desk, lock and barricade the doors, turn off the lights, etc.

Figure 7E:
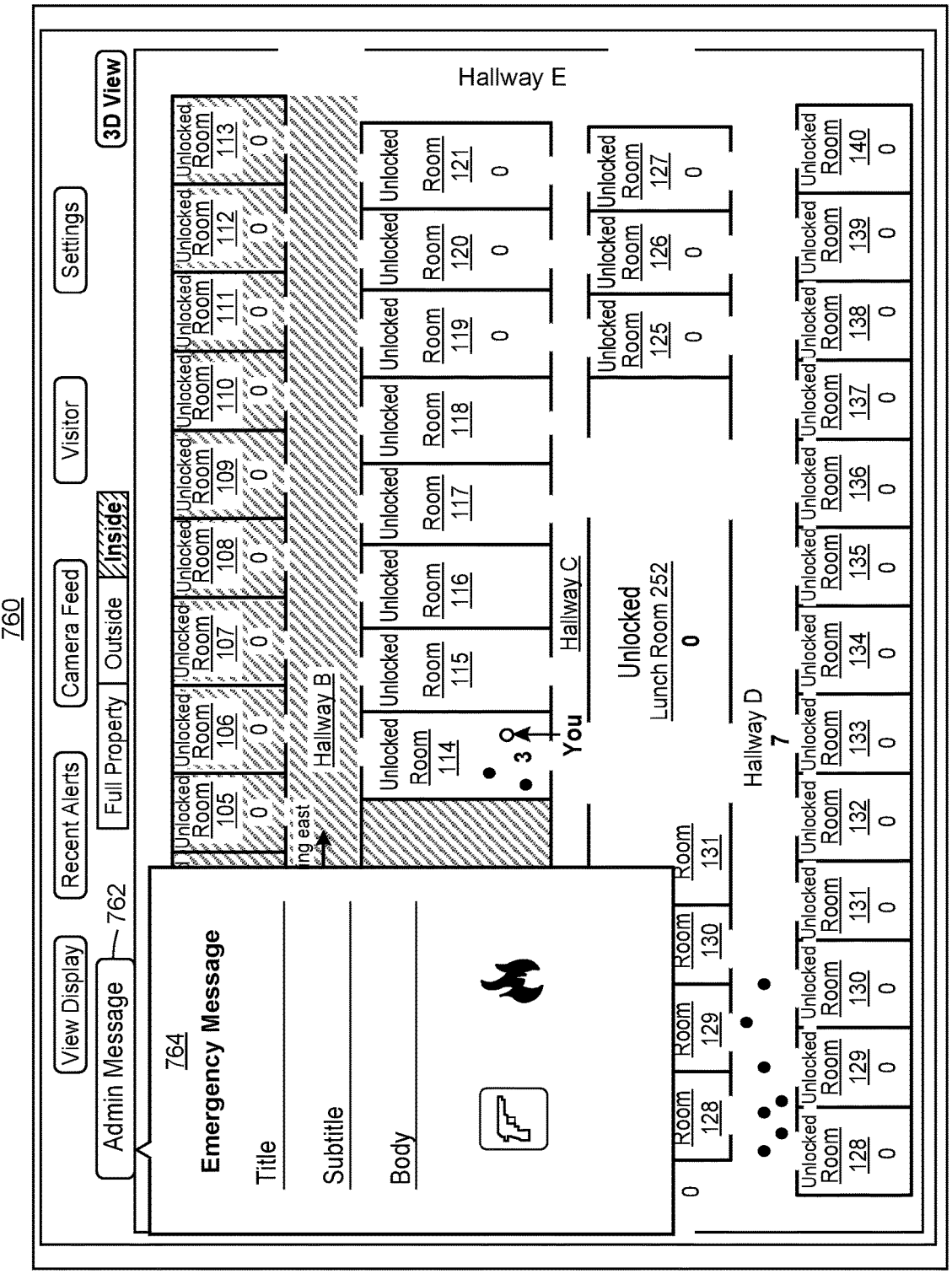
FIG. 7E illustrates an example status message screen of a student/occupant application for alerting administrators, parents, and/or emergency responders of the status of the user or other users.

In addition to displaying an indoor map of the building, the student/occupant application may include a user control for generating and sending emergency messages to administrators, parents, emergency responders, or other interested parties. FIG. 7E illustrates an indoor map display screen 760 having a user control 762, which when selected, presents a message display 764 for the student/occupant to enter an emergency message which may be sent to the administrator. In some embodiments, the emergency message may also be transmitted to parents, emergency responders, or other interested parties. The emergency message may include status information regarding the user or other occupants. For example, the user may notify the administrator that the user is safe. This notification may also be forwarded to the user's parents via the parent application. In another example, the user may notify the administrator that another occupant has been injured, and may include identification information and/or location information for the occupant. This notification may also be forwarded to emergency responders via the emergency responder application. When the emergency responder enters the building, they may proceed directly to the location of the injured occupant to treat the occupant.

Parent Application

The parent application presents similar information as the student/occupant application, such as an alert notifying the student/occupant that a gunshot or other dangerous event has been detected, and indoor map data including floor layouts, an indication of the location of the shooter, a danger zone, and indications of the number of occupants in each area of the building and precise locations of each occupant within a particular area. The parent application may also include information specific to the parent's child. For example, the parent may request to receive updated location information for her child, and the parent application may identify the location of the child and highlight the indication of the child in the indoor map display. Additionally, the parent application may present status updates regarding the child, such as, "Your child has been marked safe."

Figure 8A:
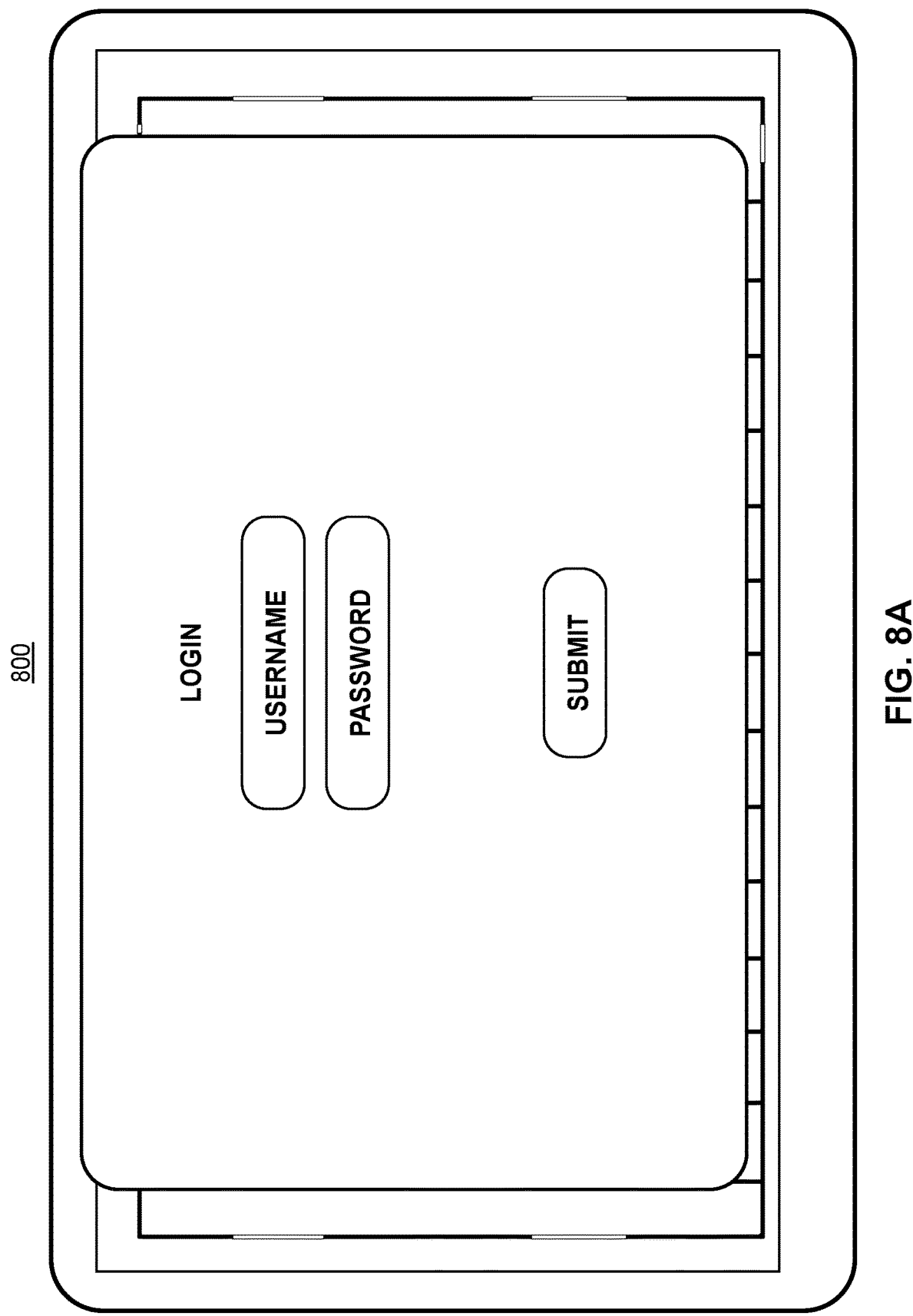
FIG. 8A illustrates an example login screen of a parent application.
Figure 8B:
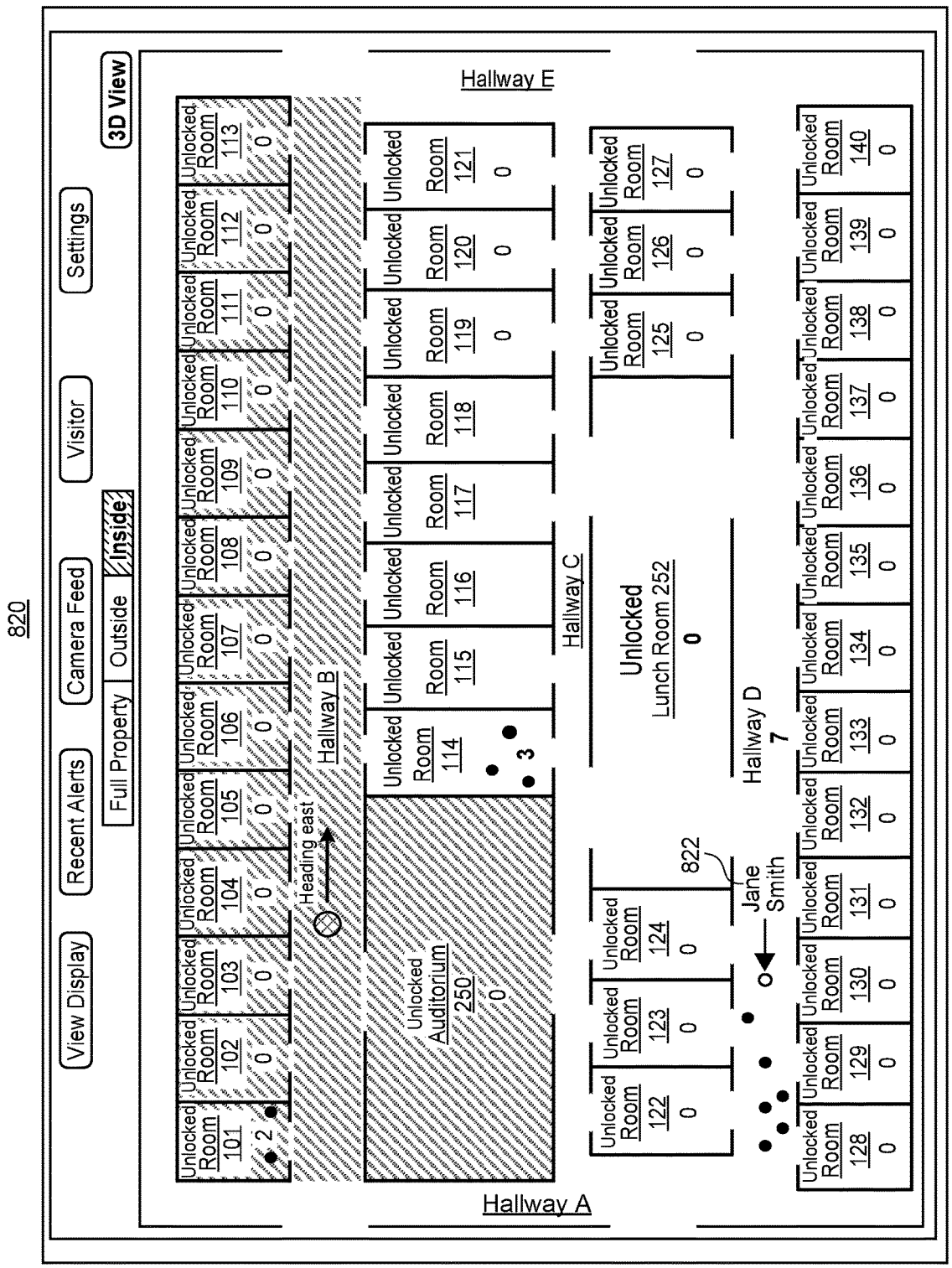
FIG. 8B illustrates an example indoor map display screen of a parent application.

In order to receive updated information regarding a particular student, a user may login to the parent application by entering identification information to verify that the user is a parent of a student of the school and is authorized to receive location information for the student. For example, as shown in the login screen 800 of FIG. 8A, the parent application may request a username and password. In response to receiving the username and password from the user, the parent application may transmit the username and password to the server computing device 302. The server computing device 302 may compare the username and password to usernames and passwords corresponding to several user profiles stored in the database 306. If there is a match, the server computing device 302 identifies the corresponding user profile and determines whether the user has any children at the school based on the user profile. For example, the user profile may include the names of each of the user's children along with the names of the schools that each of the children attend. If one or more of the children attend the school where a dangerous event is detected, the parent application may present an indoor map display 820 for the school as shown in FIG. 8B.

If the username and password do not match one of the usernames and passwords, the user may be prompted to enter the username and password again. Additionally, if the identified user profile indicates that the user does not have any children at a school experiencing a dangerous event, the parent application may present a message indicating that the school is currently safe.

In any event, the indoor map display 820 of the parent application is similar to the indoor map display screen 710 of the parent application. However, rather than including a different indication for the location of the user than for the other occupants as in the student/occupant application, the indoor map display 820 includes a different indication 822 for the location of the child than for the other occupants. For example, while the locations of the other occupants may be indicated with dark colored dots, the location of the child 822 may be indicated with a dot having a different color or shading. The location of the child 822 may also be highlighted with an arrow pointing to the location indicator for the child, and may include identification information for the child, such as the child's name (e.g., "Jane Smith").

The server computing device 302 the computing device 128 in a pod 100 may continuously or periodically determine the location of the child based on sensor data from the pods 100, and may provide real-time or near real-time location updates for the child which are presented in the indoor map display 820. Additionally, the server computing device 302 may receive status updates regarding the child. For example, as described above, the child may provide a status update to the administrator via the student/occupant application. In another example, the server computing device 302 may determine a status of the child based on the child's movement data or based on a voice communication received at a pod 100. If the child has not moved for more than a threshold time period, the server computing device 302 may determine that the child has been injured and may require emergency assistance. On the other hand, if the child's movement data indicates that the child has been approaching an exit and shortly after, the server computing device 302 cannot identify the child's location within the building, the server computing device 302 may determine that the child has exited the building and is safe.

Figure 8C:
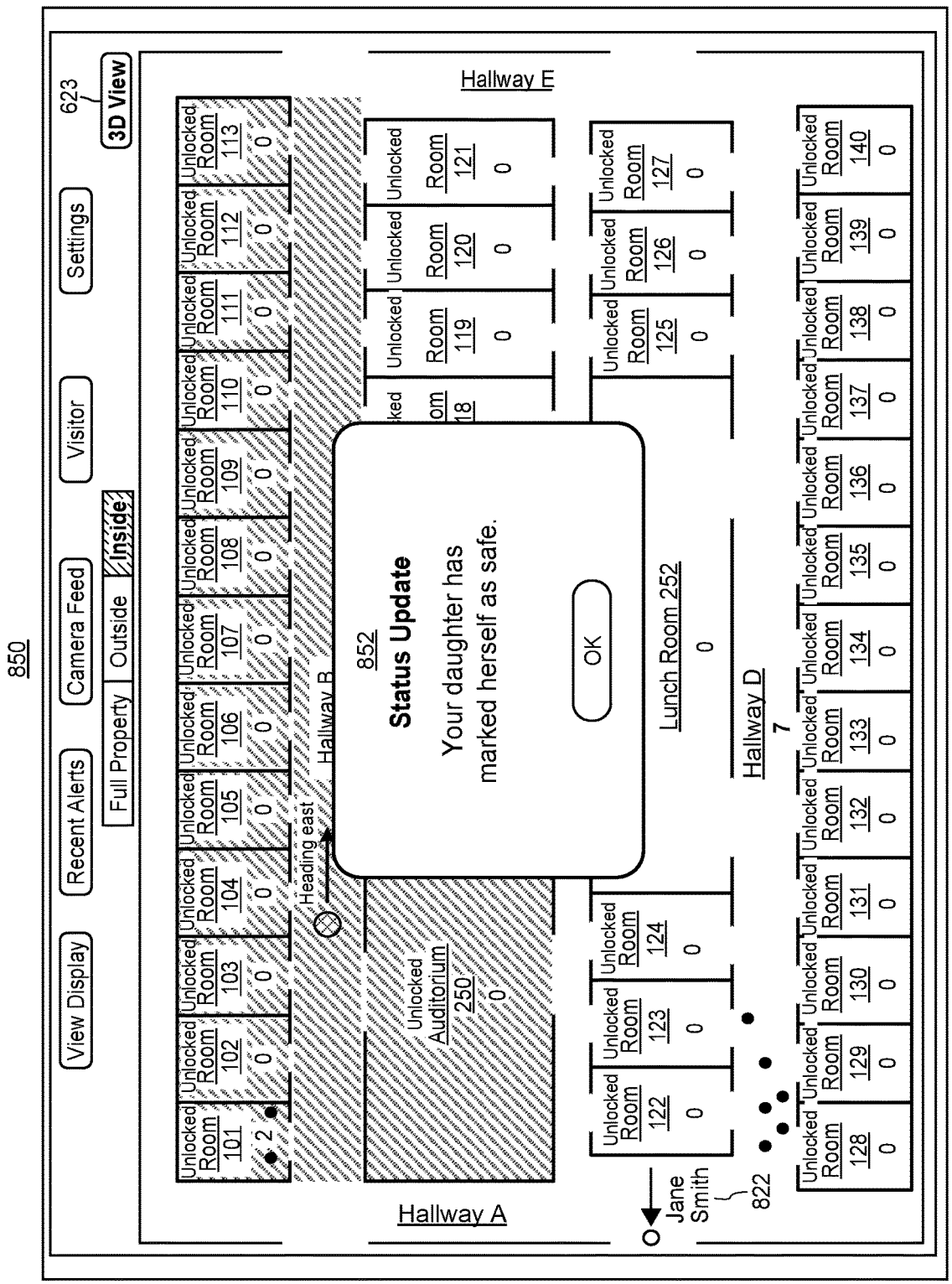
FIG. 8C illustrates another example indoor map display screen of a parent application with a status update indicating information regarding the user's child.

FIG. 8C illustrates an example indoor map display 850 having a status update 852 indicating that the user's daughter has marked herself as safe. For example, the user's daughter may have marked herself as safe via user controls on the student/occupant application, or via a status message provided to the administrator. As shown in the indoor map display 850, the user's daughter 822 is approaching the southwest exit and may leave the building.

Emergency Personnel Application

The emergency responder application presents similar information as the administrator application, such as an alert notifying the emergency responder that a gunshot or other dangerous event has been detected, and indoor map data including floor layouts, an indication of the location of the shooter, a danger zone, and indications of the number of occupants in each area of the building and precise locations of each occupant within a particular area. The emergency responder application also presents an indication of a recommended entrance for the emergency responder to use when entering the building and may present indications of the locations of injured occupants within the building. In this manner, the emergency responder may be made aware of the occupants that need immediate assistance.

The emergency responder application may be executed on the client computing devices 304 of emergency responders, such as police officers, fire fighters, paramedics, etc. More specifically, the emergency responder application may execute on a police officer's smart phone, tablet, or laptop such as a toughbook, and/or the emergency responder application may execute on the head unit or dashboard of the police officer's vehicle. In another example, the emergency responder application may execute on a client computing device 304 of a police dispatcher, such as laptop or desktop computer, and the police dispatcher may provide the information from the emergency responder application to police officers assigned to the building where the dangerous event is taking place.

In some embodiments, the server computing device 302 may transmit notifications or alerts to client computing devices 304 of emergency responders within a threshold distance of the building premises indicating that a dangerous event has occurred within the building premises and including a location of the building premises. More specifically, the server computing device 302 may store a list of Internet Protocol (IP) addresses corresponding to emergency responder client computing devices 304 such as toughbooks which are authorized to receive alerts and to respond to a dangerous event. The emergency responder client computing devices 304 may periodically (e.g., every minute, every 15 minutes, every hour, etc.) transmit location information for the emergency responder client computing devices 304 to the server computing device 302 indicating their current locations. When a dangerous event is detected, the server computing device 302 may identify a set of emergency responder client computing devices 304 within a threshold distance of the building premises (e.g., two miles) according to the received location information.

Then for each emergency responder client computing device 304 in the set, the server computing device 302 may transmit a notification or alert to the IP address in the list of authorized IP addresses corresponding to the emergency responder client computing device 304. The notification or alert may indicate that a dangerous event has occurred within the building premises, the location of the building premises, a type of dangerous event such as a gunshot, weapon, fire, gas leak or other airborne contaminant, water leak, suspicious bag, fight, vandalism, etc., a type of weapon, the number of students/occupants who have been injured and may require emergency assistance, a recommended entrance for the emergency responder to use when entering the building which is away from the danger zone, or any other suitable information for providing emergency assistance in response to a dangerous event.

In some scenarios, the server computing device 302 may transmit notifications or alerts to client computing devices 304 of emergency responders within a threshold distance of the building premises and to a client computing device 304 of a police dispatcher. In this manner, emergency responders within the immediate vicinity of the building premises may respond right away to the dangerous event while the police dispatcher may dispatch additional emergency responders to the building premises for further assistance, such as additional police officers, fire fighters, paramedics, etc.

Figure 9A:
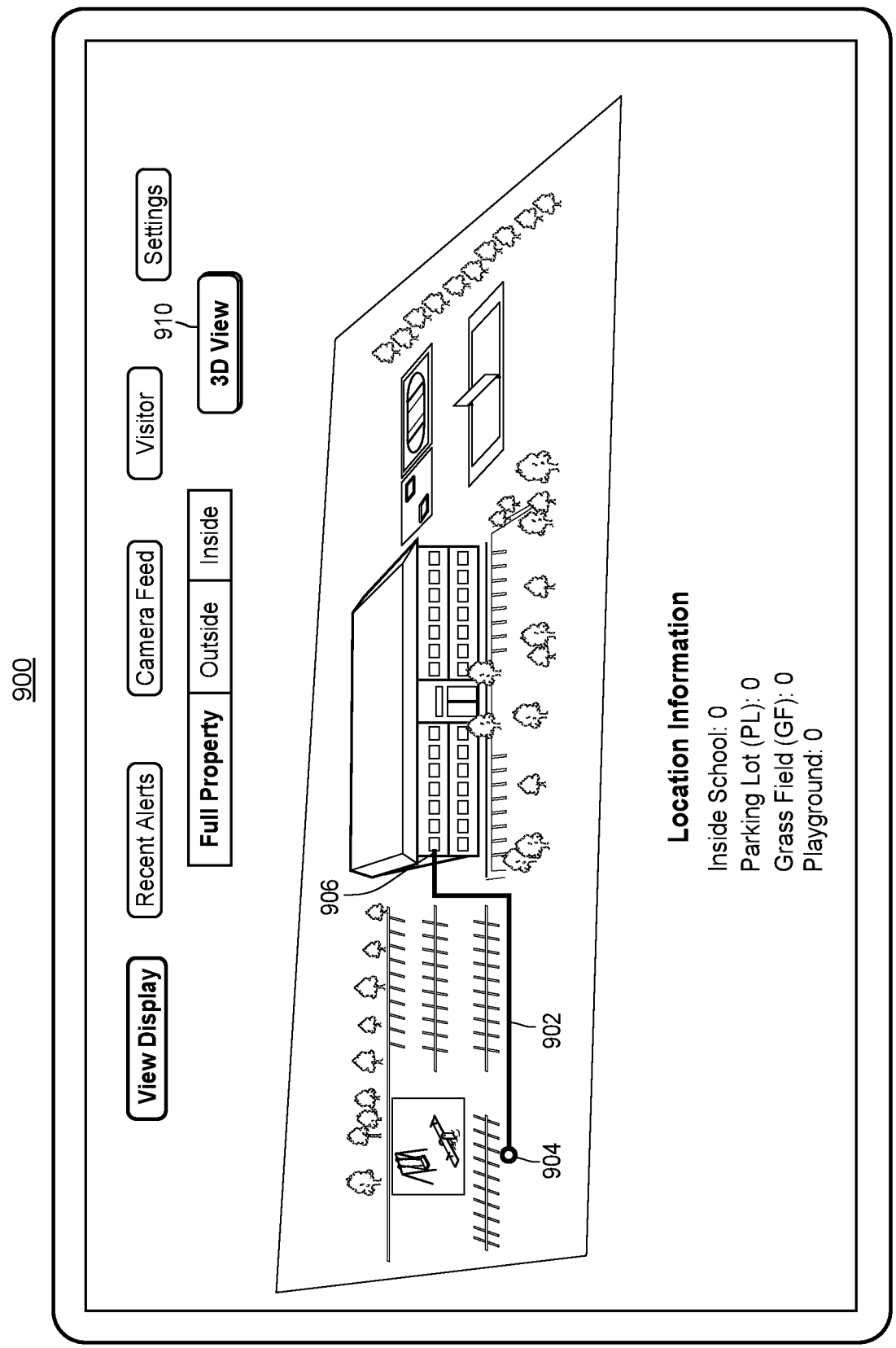
FIG. 9A illustrates an example outdoor map display screen of an emergency responder application which includes an example navigation route to a recommended entrance to the building.

FIG. 9A illustrates an example outdoor map display screen 900 of an emergency responder application, which is similar to the outdoor map display screen 500 of FIG. 5. The example outdoor map display screen 900 includes an indication of an example navigation route 902 from a starting location 904 to a recommended entrance 906 to the building. The server computing device 302 may determine the recommended entrance for the emergency responder by comparing the location of the shooter or of the dangerous event to the locations of each of the entrances. If an entrance is more than a predetermined threshold distance from the danger zone, the server computing device 302 may identify the entrance as a recommended entrance. In other embodiments, the server computing device 302 may also determine the direction in which the shooter is moving and may identify entrances away from the shooter's direction of movement. The server computing device 302 may generate proximity and direction scores, where the proximity score increases as the distance between the shooter and the entrance increases, and the direction score decreases when the shooter is moving in the direction of the exit. The proximity and direction scores may be aggregated, weighted, and/or combined in any suitable manner to generate an overall entrance score, and the server computing device 302 may select the highest scoring entrance as the recommended entrance.

The server computing device 302 may determine the starting location 904 based on a current location of the client computing device 304 executing the emergency responder application or may determine the starting location 904 based on an expected location where the emergency responder is likely to arrive at the building premises (e.g., a parking lot entrance). The server computing device 302 may generate the navigation route 902 by identifying a series of waypoints along a shortest path to the entrance 906 using a pathfinding method. More specifically, the server computing device 302 may generate a set of vertices in the outdoor map display 900 where each vertex is a point on the outdoor map display 900 which is not obstructed by a structure, such as a tree, light pole, etc. The vertices may be distributed throughout the outdoor map display 900, such that each vertex is at least a threshold distance away from the nearest vertex (e.g., one meter, three meters, etc. of real-world distance). Each pair of vertices may have an assigned weight according to the distance between the pair. The server computing device 302 may then find the shortest path to the entrance 906 by identifying a subset of the vertices having the shortest combined distance to the entrance 906 according to the respective weights. The subset of vertices may be referred to as waypoints.

Figure 9B:
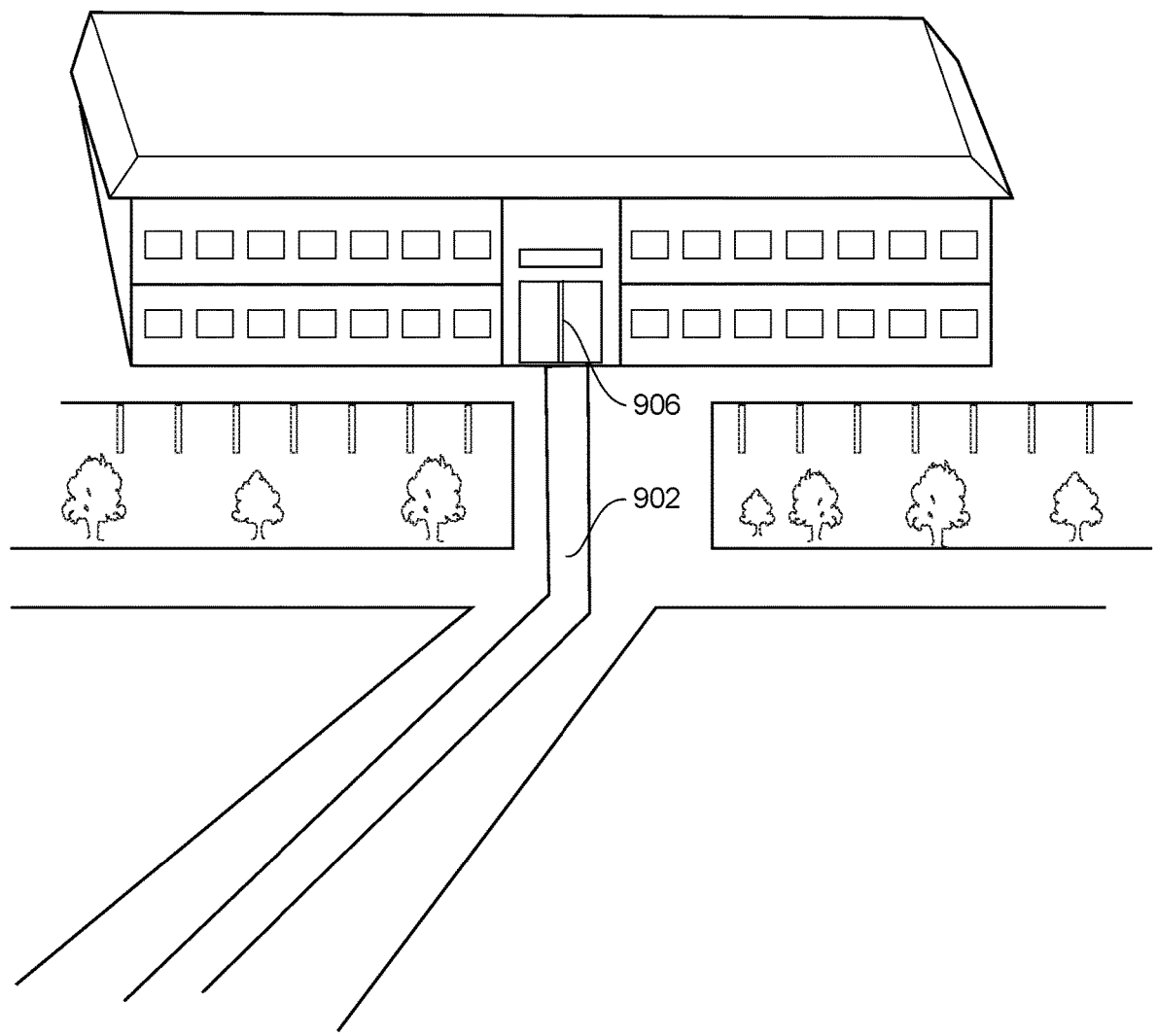
FIG. 9B illustrates an example three-dimensional model of an area surrounding an emergency responder's current location implemented in an emergency responder application for directing the emergency responder to a recommended entrance to the building.

In any event, the example navigation route 902 may be depicted with dashed lines along the route, by highlighting the route, or in any other suitable manner. In some scenarios, the emergency responder may have difficulty following the path to the entrance 906 via the 2D layout of the building premises in the outdoor map display screen 900. Accordingly, the outdoor map display screen 900 may include a user control 910 for presenting a 3D model of the building premises. FIG. 9B illustrates an example 3D model 950 of an area surrounding an emergency responder's current location for directing the emergency responder to a recommended entrance 906 to the building. The server computing device 302 may generate the 3D model 950 based on map data from the user's current location from a map database.

The server computing device 302 may generate the 3D model 950 from a viewpoint corresponding to the current location and current orientation of the emergency responder. More specifically, the client computing device 304 of the emergency responder may provide location and orientation information to the server computing device 302. The example 3D model 950 includes a depiction of the recommended entrance 906 from the viewpoint of the user's current location and orientation. Additionally, the example 3D model includes an indication of the route 902 to the recommended entrance 906. The user may see in the real world objects which are similar to those depicted in the 3D model, and may follow the route 902 to reach the recommended entrance 906.

In this example, the user is oriented such that the recommended entrance 906 is displayed within the 3D model. If the recommended entrance 906 is not located in the field of view of the 3D model from the user's current location and orientation, the 3D model 950 may generate an indicator or provide an instruction directing the user to turn in a particular direction to view the recommended entrance 906. For example, the user may be facing south and the recommended entrance may be east of the user's current location. Accordingly, the 3D model may include an indicator or an instruction to the user to turn left. Then when the user has turned a sufficient amount such that the recommended entrance 906 is within the field of view of the 3D model, the 3D model may present the indication of the navigation route 902.

When a user launches the emergency responder application, the home screen may initially display the outdoor map display screen 900. In other embodiments, the home screen may initially display an indoor map display depicting the interior of the building. In yet other embodiments, when a dangerous event occurs, the home screen may initially display the exterior or the interior of the building based on whether the danger zone for the dangerous event is at the exterior or the interior of the building. When the home screen initially displays the outdoor map display screen 900, an indoor map display screen may be presented in response to selecting the user control requesting an indoor map display.

Figure 10A:
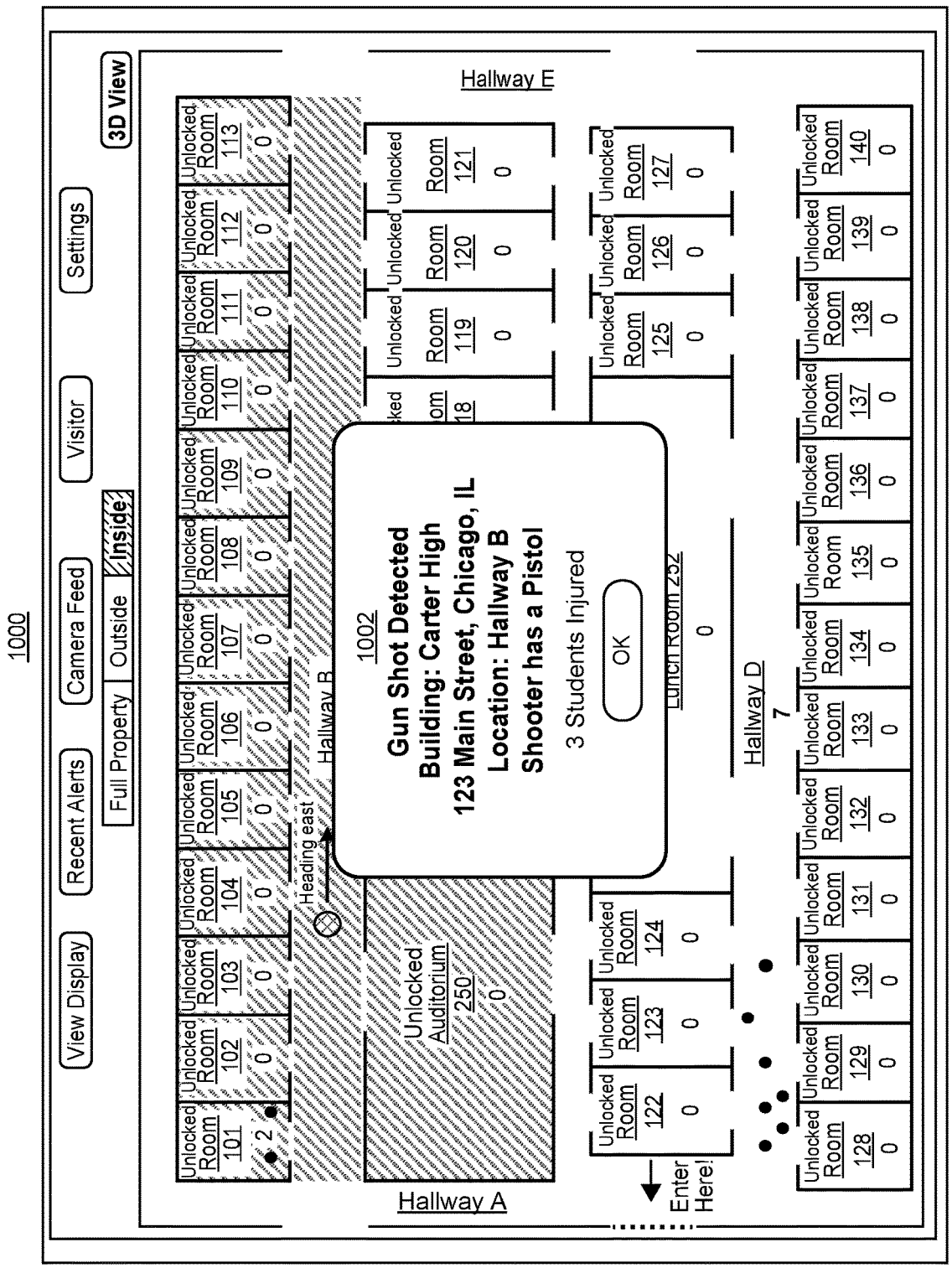
FIG. 10A illustrates an example gunshot alert screen of an emergency responder application.

FIG. 10A illustrates an example gunshot alert screen 1000 of an emergency responder application. The gunshot alert screen 1000 presents a gunshot alert 1002 indicating that a gunshot has been detected and the name and location of the building in which the gunshot occurred. The gunshot alert 1002 also indicates the location of the gunshot within the building (Hallway B), the type of weapon used, and the number of students/occupants who have been injured and may require emergency assistance. In this example, the gunshot alert screen 1000 is presented within an indoor map display for example, because the gunshot is detected in the interior of the building. The gunshot alert screen 1000 may be presented within the outdoor map display screen 900 of FIG. 9A, such as when the dangerous event is detected at a location exterior to the building.

As described above, the server computing device 302 or the computing device 128 within a pod 100 determines the type of weapon and/or the number of rounds fired based on the number of times the noise level from the sound data reaches the threshold noise level range. More specifically, the server computing device 302 or the computing device 128 within a pod 100 may identify an additional round has been fired each time the noise level from the sound data decreases from the threshold noise level range below a second threshold noise level and then increases once again to the threshold noise level range. The server computing device 302 or the computing device 128 within a pod 100 may identify the type of weapon based on the frequency in which rounds are fired (e.g., when the frequency exceeds a threshold frequency, the weapon may be an automatic weapon) and/or the number of rounds fired, the particular noise level within the noise level range associated with each blast (e.g., the noise level for a rifle may be 140 dB while the noise level for a pistol may be 175 dB), the temperature of the blast, and/or other sensor data characteristics such as visual characteristics of the weapon determined by analyzing the visible light images.

In some embodiments, the server computing device 302 or the computing device 128 within a pod 100 obtains characteristics of several types of weapons and compares the characteristics of each type of weapon to the characteristics of the weapon that was fired. The server computing device 302 or the computing device 128 within a pod 100 then identifies the type of weapon as the type having matching characteristics to the characteristics of the weapon that was fired. In other embodiments, the type of weapon is identified using machine learning techniques, such as random forests, boosting, nearest neighbors, Bayesian networks, neural networks, support vector machines, etc.

Furthermore, as described above, the server computing device 302 or the computing device 128 within a pod 100 determines the number of injured occupants based on movement data. The server computing device 302 or the computing device 128 within a pod 100 may utilize the movement data to identify occupants who have not moved over a threshold time period and may be injured. In some embodiments, the server computing device 302 or the computing device 128 within a pod 100 may determine whether an occupant is injured based on the movement data of the occupant and movement data of other occupants in the same area of the building as the occupant, such as the same room or hallway.

For example, if the occupant has not moved over a threshold time period and neither have any of the other occupants in the same room as the occupant, the server computing device 302 or the computing device 128 within a pod 100 may determine that the occupants in the room are hiding and may not be injured. On the other hand, if the occupant has not moved over a threshold time period, but the other occupants in the same room have each left the room, the server computing device 302 or the computing device 128 within a pod 100 may determine that the occupant is injured.

In some embodiments, the server computing device 302 or the computing device 128 within a pod 100 may generate a score corresponding to each occupant's likelihood of experiencing an injury. The score may be generated based on the occupant's movement data and the movement data of other occupants in the same area as the occupant. When the score exceeds a threshold injured occupant score, the server computing device 302 or the computing device 128 within a pod 100 may determine that the occupant is injured. Also as mentioned above, the server computing device 302 100 may receive status updates for the occupants from the student/occupant application which may indicate the occupants that have been injured and their respective locations. Accordingly, the server computing device 302 may determine the number of occupants who have been injured based on the occupants who have been reported injured and the occupants determined to be injured by the server computing device 302 or the computing device 128 within a pod 100.

The server computing device 302 then provides the name and location of the building in which the gunshot occurred, the type of weapon and/or the number of rounds fired, and/or the number of injured occupants and their respective locations to the client computing device 304 for display via the emergency responder application. In any event, when the server computing device 302, and more specifically, the gunshot detector 316 or the computing device 128 within a pod 100 identifies a dangerous event, the server computing device 302 provides the gunshot alert 1002 to the emergency responder application for display in the gunshot alert screen 1000. The server computing device 302 also begins recording video, image, and other sensor data collected from the pods 100 by storing the video data, image data, and other sensor data in the database 306.

Figure 10B:
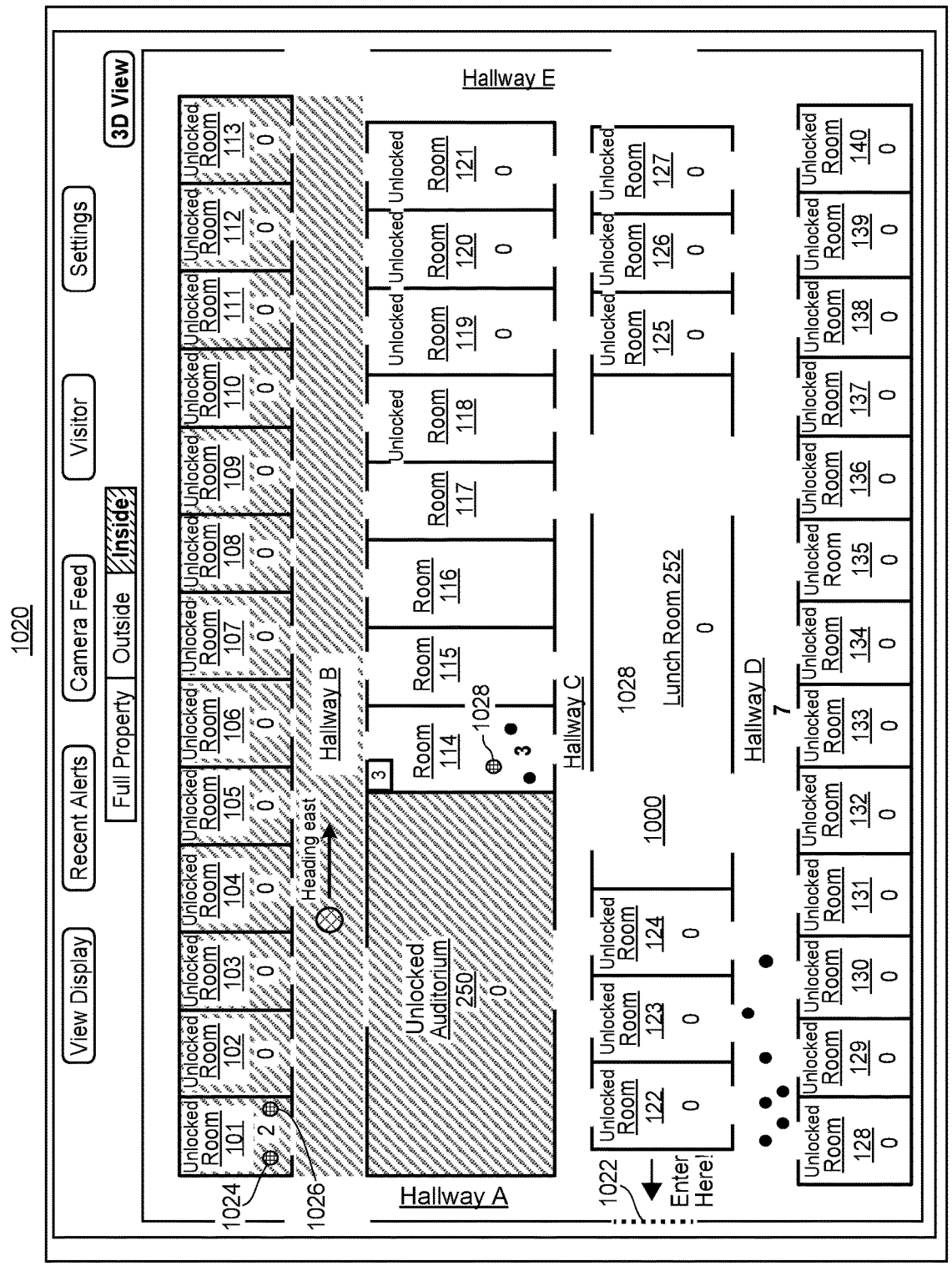
FIG. 10B illustrates an example indoor map display screen of an emergency responder application which highlights a recommended entrance for the emergency responder to enter.

The collected sensor data or interpretations of the collected sensor data is/are then used by the server computing device 302, and more specifically, the building map generator 318 to generate indoor map data for display on the client computing device 304, via the emergency responder application. FIG. 10B illustrates an example indoor map display screen 1020 of the emergency responder application. The indoor map display screen 1020 of the emergency responder application is similar to the indoor map display screen 610 of the administrator application. In some embodiments, the indoor map display screen 1020 of the emergency responder application includes different indications 1024-1028 for the locations of injured occupants than for the other occupants. For example, while the locations of the other occupants may be indicated with dark colored dots, the locations of the injured occupants 1024-1028 may be indicated with dots having a different color or shading.

The recommended entrance for the emergency responder to use when entering the building 1022 may be indicated in a different color or shading than the other entrances or may be highlighted relative to the other entrances. For example, the entrances in the indoor map display 1020 may be depicted with empty space, whereas the recommended entrance 1022 is depicted with a dashed line. The recommended entrance 1022 may also be highlighted with an arrow pointing to the recommended entrance, and may include an instruction referring to the entrance, such as "Enter Here!"

In any event, the server computing device 302 may continuously or periodically determine the location of the shooter based on sensor data from the pods 100. The server computing device 302 may determine the recommended entrance for the emergency responder by comparing the location of the shooter to the locations of each of the entrances. If an entrance is more than a predetermined threshold distance from the danger zone, the server computing device 302 may identify the entrance as a recommended entrance. In other embodiments, the server computing device 302 may also determine the direction in which the shooter is moving and may identify entrances away from the shooter's direction of movement. The server computing device 302 may generate proximity and direction scores, where the proximity score increases as the distance between the shooter and the entrance increases, and the direction score decreases when the shooter is moving in the direction of the exit. The proximity and direction scores may be aggregated, weighted, and/or combined in any suitable manner to generate an overall entrance score, and the server computing device 302 may select the highest scoring entrance as the recommended entrance.

In some embodiments, the emergency responder application may present a live video feed from one or several of the pods 100. For example, the emergency responder application may present a live video feed from the pod 100 closest to the shooter.

Example Safety/Security Methods During a Dangerous Event

Figure 11:
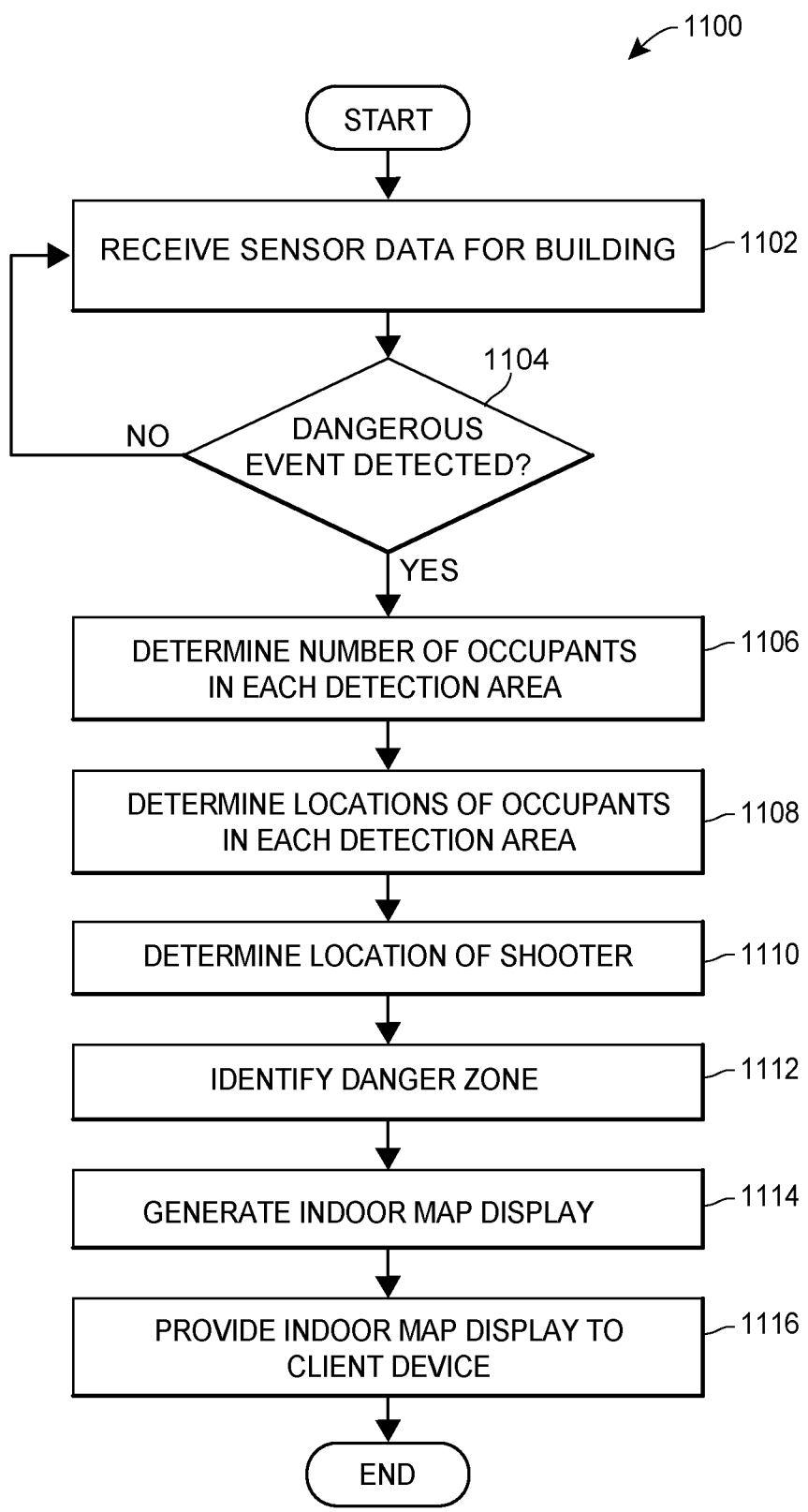
FIG. 11 illustrates a flow diagram of an example method for generating an indoor map display of a building during a dangerous event which can be implemented in a server computing device.

FIG. 11 illustrates a flow diagram of an example method 1100 for generating an indoor map display of a building during a dangerous event. The method 1100 can be implemented in a server computing device 302. More specifically, the method 1100 can be implemented by one or more of the gunshot detector 316, the building map generator 318, and the alert notification system 320.

At block 1102, the server computing device 302 receives sensor data or interpretations of the sensor data (e.g., an indication that a dangerous event has been detected, indications of the danger zone, indications of the locations of occupants within the building premises, an indication of the location of an active shooter, etc.) from pods 100 placed throughout the building, where each pod 100 has a detection area for collecting the sensor data. The sensor data may include image data, sound data, temperature data/heat signatures, flame data, gas leak data, voice data, etc. The server computing device 302 then detects a dangerous event, such as a fire or gunshot within the building.

For example, a computing device 128 within the pod 100 may analyze visible light images using image classification and/or machine learning techniques to identify a weapon in the building or a suspicious bag which may contain a weapon (e.g., a rifle bag). This may be identified before a gunshot is fired/detected. For example, the computing device 128 within the pod 100 may obtain template objects representing guns and other weapons and may identify features from these template objects. When the computing device 128 within the pod 100 obtains an image detected by the imaging camera 104, the computing device 128 within the pod 100 may identify features of the image. The features of the image may be compared to the template features of template objects representing weapons. The computing device 128 within the pod 100 may then determine whether the image includes a weapon based on the amount of similarity between the features of the image and the features for template objects that represent a weapon. Then the computing device 128 within the pod 100 provides an indication that a weapon has been identified to the server computing device 302 which detects a dangerous event based on the provided indication.

In another example, the computing device 128 within the pod 100 analyzes sound data and IR images over the same time period (e.g., over the previous second, over the previous ten seconds, etc.) to identify a gunshot. More specifically, to identify a gunshot the computing device 128 within the pod 100 compares the noise level from the sound data during a particular time period to a threshold noise level range indicative of a gunshot (e.g., 140-190 dB). If the noise level during the particular time period is within the threshold noise level range, the computing device 128 within the pod 100 compares temperature data from the IR images during the same time period to a threshold explosion temperature indicative of a blast from a bullet exiting the barrel of a gun (e.g., 200° C.). If the IR images during the same time period include temperatures or heat signatures exceeding the threshold explosion temperature and the sound data includes a noise level within the threshold noise level range, the computing device 128 within the pod 100 identifies a gunshot within the building. Then the computing device 128 within the pod 100 provides an indication that a gunshot has been detected to the server computing device 302 which detects a dangerous event based on the provided indication.

In any event, if a dangerous event is not detected, the server computing device 302 continues to receive sensor data or interpretations of the sensor data (block 1102). If a dangerous event is detected, the server computing device 302 determines the number of occupants in each detection area (block 1106).

To determine the number of occupants in a detection area, the computing device 128 within the pod 100 analyzes the visible light images and IR images over the same time period (e.g., over the previous second, over the previous ten seconds, etc.) from the pod 100 to identify objects, such as people in the detection area. The computing device 128 within the pod 100 then provides an indication of the number of occupants in the detection area to the server computing device 302 which in turn, determines the number of occupants in each detection area based on the received indications from each of the pods 100. The locations of each pod 100 within the building may be stored within a database. The server computing device 302 may retrieve the location for the pod 100 to determine the corresponding detection area for the pod 100.

To identify a person, the computing device 128 within the pod 100 compares temperature data or heat signatures from the IR images to a threshold body temperature range corresponding to a human (e.g., 92° F./33° C.-112° F./44° C.). If a portion of each image includes temperatures within the threshold body temperature range, the computing device 128 within the pod 100 analyzes the same portion (also referred to herein as an "object") of the visible light images and identifies features of the object within the visible light images, such as the geometry of the edges of the object, and RGB pixel values or colors within the object.

The computing device 128 within the pod 100 may compare the features identified for the object to features from template objects (also referred to herein as "template features") using image classification and/or machine learning techniques, where at least some of the template objects represent a person. For example, the widths and heights of people may be stored as template features along with skin tones for people, the widths and heights of noses, mouths, eyes, and their respective positions relative to each other. Then each of these template features may be compared to the features for an object.

The computing device 128 within the pod 100 may then determine whether the object is a human based on the amount of similarity between the features for the object and the features for template objects that represent a human. If the closest template objects represent a human and the temperature data from the IR images is within the threshold body temperature range, the object is identified as a human.

In addition to identifying the number of people within a particular detection area, the server computing device 302 may determine precise locations of each occupant within the detection area for the pod 100 (block 1108). More specifically, when a pod 100 is installed within a room of a building, for example, the pod 100 obtains measurements of dimensions of the detection area (e.g., the size of the room in which the pod 100 is installed is 10 m by 10 m). The pod 100 or the server computing device 302 then creates a mapping of the precise location of each pixel or group of pixels generated by the imaging camera 104 and/or the thermal camera 106 based on the size of the detection area and/or the orientations of the imaging camera 104 and/or the thermal camera 106. For example, if the room is 10 m wide, the width of an image is 10,000 pixels, and the orientation of the imaging camera 104 is such that the width of the image is parallel to the width of the room, each pixel may represent a physical width of approximately 1 mm. Then when the computing device 128 within the pod 100 identifies a person in the detection area, the computing device 128 within the pod 100 identifies the pixel locations of the group of pixels that include the person and maps the pixel locations to a precise physical location of the person within the detection area. The computing device 128 within the pod 100 then provides indications of the precise locations of each occupant within the detection area for the pod 100. When the server computing device 302 generates a map of the building, the server computing device may place an indicator on the map such as a dot at the precise physical location within the detection area where the person is identified.

The server computing device 302 also determines the location of the shooter based on the location of the gunshot (block 1110). More specifically, the server computing device 302 determines the location of the gunshot based on the pod 100 that captured the sound data and IR images indicative of a gunshot. The server computing device 302 then determines the location of the shooter based on the location of the gunshot and may track the location of the shooter to provide real-time updates on the shooter's location. More specifically, the server computing device 302 may determine the shooter's location based on movements from the shooter's initial location where the gunshot was fired or based on the locations of additional gunshots that are subsequently fired. The movements may be detected, for example, by continuously or periodically (e.g., every second, every minute, 10 times per second, 60 times period second, 100 times period second, etc.) identifying the location of the weapon based on visible light images from each pod 100.

In other embodiments, the computing device 128 within the pod 100 analyzes the sensor data to determine the location of the shooter based on the location of the gunshot for example, in the manner described above, and provides indications of the location of the shooter to the server computing device 302.

At block 1112, a danger zone is identified which may be an area within a threshold range of the shooter or within a threshold range of the center of the dangerous event. The danger zone may also include areas from which occupants cannot safely exit the building.

Then at block 1114, the server computing device 302 generates an indoor map display of the building. The indoor map display may include a floor layout indicating each area of the floor, such as rooms, hallways, auditoriums, cafeterias, etc. For buildings with multiple floors, the indoor map display may include several floor layouts with a user control for selecting one of the floors to display or may include several floor layouts presented in the same display. The indoor map display may also indicate each of the exits from the building or stairwells and exits from each of the rooms. Furthermore, the indoor map display may indicate the number of occupants in each area of the building, such as the number of occupants in each room and hallway. Still further, the indoor map display may include indications of the precise locations of each occupant within a particular area and may provide identification information for the occupants. Moreover, the indoor map display may indicate the location of the shooter and/or the direction in which the shooter is moving. The indoor map display may also indicate the danger zone by for example, highlighting the danger zone in a different color or shading from the rest of the floor layout.

In some embodiments, the indoor map display may indicate the location of a user of the client computing device 304 within the building and may indicate a closest and/or safest exit for the user and a path for the user to travel along to reach the exit. The closest or safest exit may be indicated in a different color or shading than the other exits or may be highlighted relative to the other exits. Also in some embodiments, the indoor map display may indicate a recommended entrance for emergency responder to enter the building. The recommended entrance may be indicated in a different color or shading than the other entrances or may be highlighted relative to the other exits. Furthermore, the indoor map display may indicate the locations of injured occupants using a different color or shading for the indications of the injured occupants than for the indications of the other occupants.

The server computing device 302 may then provide the indoor map display to a client computing device 304 which may present the indoor map display via an administrator application, a student/occupant application, a parent application, or an emergency application. In some embodiments, the server computing device 302 generates indoor map data and provides the indoor map data to the client computing device 304 which then renders the indoor map display based on the indoor map data. For example, the indoor map data may include location information for the location of an occupant, and the client computing device 304 may present an occupant location indicator at the received location.

Figure 12:
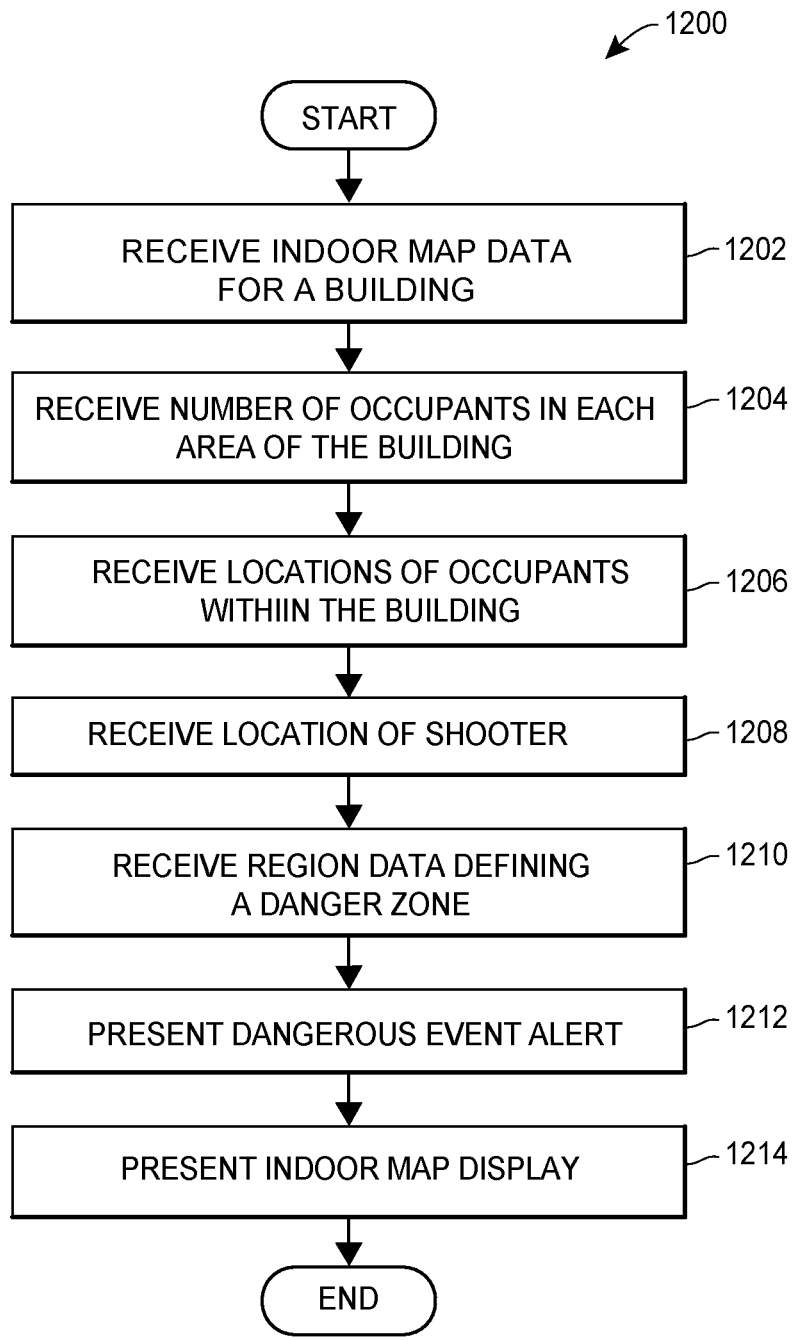
FIG. 12 illustrates a flow diagram of an example method for presenting an indoor map display of a building during a dangerous event which can be implemented in a client computing device.

FIG. 12 illustrates a flow diagram of an example method 1200 for presenting an indoor map display of a building during a dangerous event. The method 1200 can be implemented in a client computing device 304. More specifically, the method 1200 can be implemented by one or more of an administrator application, a student/occupant application, a parent application, or an emergency responder application executing on the client computing device 304.

At block 1202, the client computing device 304 receives indoor map data for a building from the server computing device 302. The indoor map data may include a floor layout indicating each area of the floor, such as rooms, hallways, auditoriums, cafeterias, etc. For buildings with multiple floors, the indoor map data may include several floor layouts with a user control for selecting one of the floors to display or may include several floor layouts presented in the same display. The indoor map data may also indicate each of the exits from the building or stairwells and exits from each of the rooms. Additionally, the client computing device 304 may receive an indication of the number of occupants in each area of the building (block 1204), such as an indication of the number of occupants in each room, hallway, cafeteria, auditorium, etc. Furthermore, the client computing device 304 may receive location information for each occupant within the building (block 1206) and location information for the shooter (block 1208). The client computing device 304 may also receive region data indicating an area of the building corresponding to a danger zone (block 1210). The danger zone may be an area within a threshold range of the shooter or within a threshold range of the center of the dangerous event. The danger zone may also include areas from which occupants cannot safely exit the building.

At block 1212, the client computing device 304 presents a dangerous event alert, such as the gunshot alerts 602, 702, 1002 presented via the administrator application, the student/occupant application, and the emergency responder application, respectively. The dangerous event alert may include an indication that a gunshot has been detected in a building, the name and location of the building in which the gunshot occurred, the type of weapon and/or the number of rounds fired, the location of the gunshot, the number of users in the danger zone, and/or the number of injured occupants and their respective locations. In some embodiments, the dangerous event alert may include a user control for sending an active shooter message to students/occupants, parents, emergency responders, or other interested parties. If the administrator selects the user control, the client computing device 304 may provide a request to the server computing device 302 to send an alert for the building. In turn, the server computing device 302 may identify each user having permission to receive alerts for the particular building, and may retrieve contact information (e.g., an email address, a phone number, an application identifier) for the users. The server computing device 302 may then provide alerts to each of the users via the contact information. For example, the server computing device 302 may send push notifications to each of the users alerting the users of the dangerous event.

At block 1214, the client computing device 304 presents an indoor map display based on the received indoor map data including the number of occupants in each area of the building, location information for each occupant within the building, location information for the shooter, and the region data indicating an area of the building corresponding to a danger zone. The indoor map display may include a floor layout indicating each area of the floor, such as rooms, hallways, auditoriums, cafeterias, etc. For buildings with multiple floors, the indoor map display may include several floor layouts with a user control for selecting one of the floors to display or may include several floor layouts presented in the same display. The indoor map display may also indicate each of the exits from the building or stairwells and exits from each of the rooms. Furthermore, the indoor map display may indicate the number of occupants in each area of the building, such as the number of occupants in each room and hallway. Still further, the indoor map display may include indications of the precise locations of each occupant within a particular area and may provide identification information for the occupants. Moreover, the indoor map display may indicate the location of the shooter and/or the direction in which the shooter is moving. The indoor map display may also indicate the danger zone by for example, highlighting the danger zone in a different color or shading from the rest of the floor layout.

In some embodiments, the indoor map display may indicate the location of a user of the client computing device 304 within the building and may indicate a closest and/or safest exit for the user and a path for the user to travel along to reach the exit. The closest or safest exit may be indicated in a different color or shading than the other exits or may be highlighted relative to the other exits. Also in some embodiments, the indoor map display may indicate a recommended entrance for emergency responders to enter the building. The recommended entrance may be indicated in a different color or shading than the other entrances or may be highlighted relative to the other exits. Furthermore, the indoor map display may indicate the locations of injured occupants using a different color or shading for the indications of the injured occupants than for the indications of the other occupants.

Figure 13:
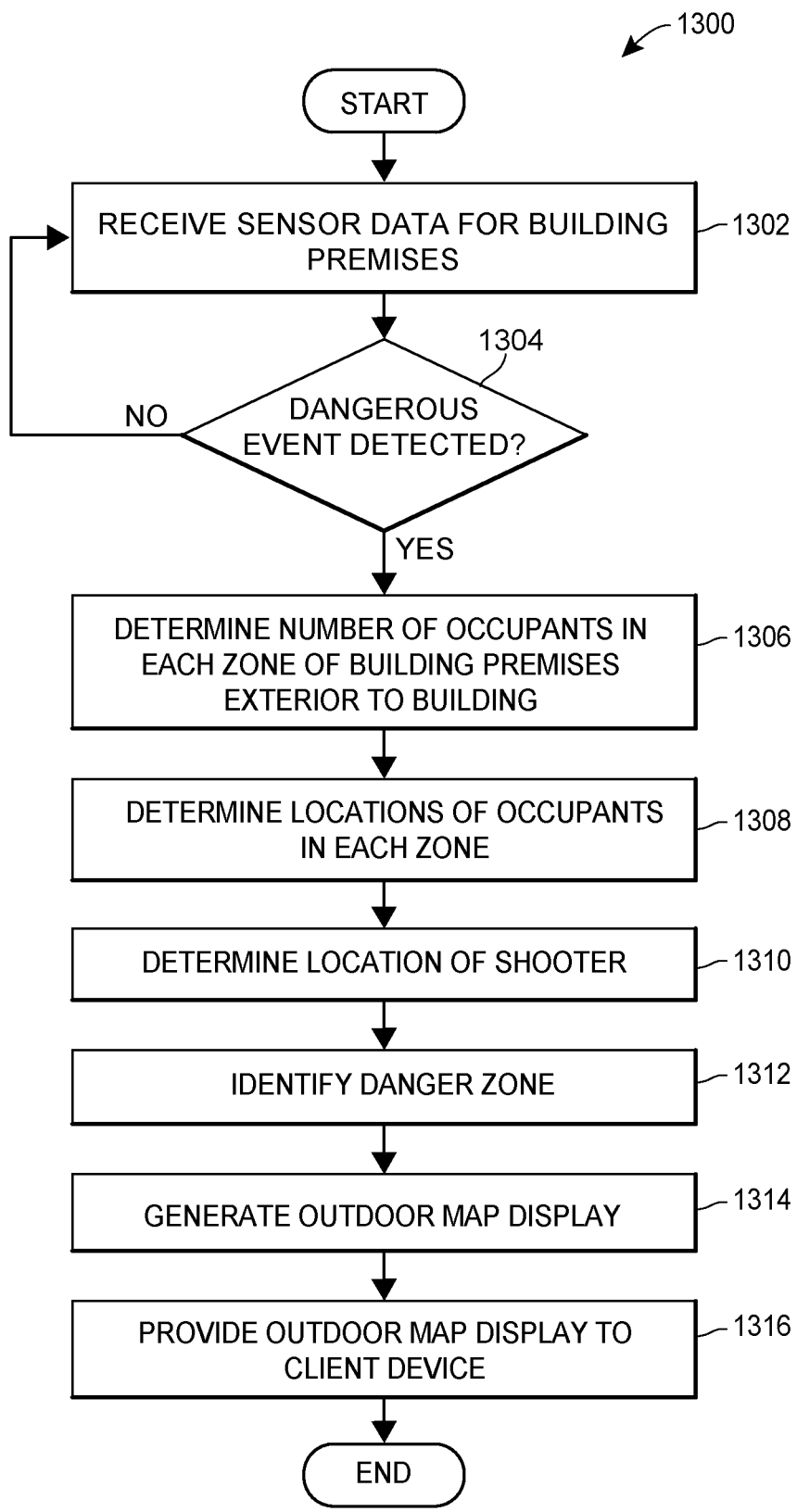
FIG. 13 illustrates a flow diagram of an example method for example method for generating an outdoor map display of building premises during a dangerous event which can be implemented in a server computing device.

FIG. 13 illustrates a flow diagram of an example method 1300 for generating an outdoor map display of premises surrounding a building during a dangerous event. The method 1300 can be implemented in a server computing device 302. More specifically, the method 1300 can be implemented by one or more of the gunshot detector 316, the building map generator 318, and the alert notification system 320.

At block 1302, the server computing device 302 receives sensor data or interpretations of the sensor data (e.g., an indication that a dangerous event has been detected, indications of the danger zone, indications of the locations of occupants within the building premises, an indication of the location of an active shooter, etc.) from pods 100 placed outside of the building within the building premises, such on light poles, the roof of the building, or other structures on the building premises exterior to the building, where each pod 100 has a detection area for collecting the sensor data. The sensor data may include image data, sound data, temperature data/heat signatures, flame data, gas leak data, voice data, etc. The server computing device 302 then detects a dangerous event, such as a fire or gunshot within the building premises.

For example, a computing device 128 within the pod 100 may analyze visible light images using image classification and/or machine learning techniques to identify a weapon in the building premises or a suspicious bag which may contain a weapon (e.g., a rifle bag). This may be identified before a gunshot is fired/detected. For example, the computing device 128 within the pod 100 may obtain template objects representing guns and other weapons and may identify features from these template objects. When the computing device 128 within the pod 100 obtains an image detected by the imaging camera 104, the computing device 128 within the pod 100 may identify features of the image. The features of the image may be compared to the template features of template objects representing weapons. The computing device 128 within the pod 100 may then determine whether the image includes a weapon based on the amount of similarity between the features of the image and the features for template objects that represent a weapon. Then the computing device 128 within the pod 100 provides an indication that a weapon has been identified to the server computing device 302 which detects a dangerous event based on the provided indication.

In another example, the computing device 128 within the pod 100 analyzes sound data and IR images over the same time period (e.g., over the previous second, over the previous ten seconds, etc.) to identify a gunshot. More specifically, to identify a gunshot the computing device 128 within the pod 100 compares the noise level from the sound data during a particular time period to a threshold noise level range indicative of a gunshot (e.g., 140-190 dB). If the noise level during the particular time period is within the threshold noise level range, the computing device 128 within the pod 100 compares temperature data from the IR images during the same time period to a threshold explosion temperature indicative of a blast from a bullet exiting the barrel of a gun (e.g., 200° C.). If the IR images during the same time period include temperatures or heat signatures exceeding the threshold explosion temperature and the sound data includes a noise level within the threshold noise level range, the computing device 128 within the pod 100 identifies a gunshot within the building premises. Then the computing device 128 within the pod 100 provides an indication that a gunshot has been detected to the server computing device 302 which detects a dangerous event based on the provided indication.

In any event, if a dangerous event is not detected, the server computing device 302 continues to receive sensor data or interpretations of the sensor data (block 1302). If a dangerous event is detected, the server computing device 302 determines the number of occupants in each zone of the building premises (block 1306). The building premises may be divided into multiple zones where each zone corresponds to a detection area of a pod 100, or each zone corresponds to different surface or structure within the building premises.

To determine the number of occupants in each zone, the computing device 128 within the pod 100 for a particular zone analyzes the visible light images and IR images over the same time period (e.g., over the previous second, over the previous ten seconds, etc.) from the particular pod 100 to identify objects, such as people in the detection area. The computing device 128 within the pod 100 then provides an indication of the number of occupants in the particular zone to the server computing device 302 which in turn, determines the number of occupants in each zone based on the received indications from each of the pods 100. The locations of each pod 100 within the building premises may be stored within a database. The server computing device 302 may retrieve the location for the pod 100 to determine the corresponding detection area for the pod 100.

To identify a person, the computing device 128 within the pod 100 compares temperature data or heat signatures from the IR images to a threshold body temperature range corresponding to a human (e.g., 33° C.-44° C.). If a portion of each image includes temperatures within the threshold body temperature range, the computing device 128 within the pod 100 analyzes the same portion (also referred to herein as an "object") of the visible light images and identifies features of the object within the visible light images, such as the geometry of the edges of the object, and RGB pixel values or colors within the object.

The computing device 128 within the pod 100 may compare the features identified for the object to features from template objects (also referred to herein as "template features") using image classification and/or machine learning techniques, where at least some of the template objects represent a person. For example, the widths and heights of people may be stored as template features along with skin tones for people, the widths and heights of noses, mouths, eyes, and their respective positions relative to each other. Then each of these template features may be compared to the features for an object.

The computing device 128 within the pod 100 may then determine whether the object is a human based on the amount of similarity between the features for the object and the features for template objects that represent a human. If the closest template objects represent a human and the temperature data from the IR images is within the threshold body temperature range, the object is identified as a human.

In addition to identifying the number of people within a particular zone, the server computing device 302 may determine precise locations of each occupant within the zone (block 1308). More specifically, when a pod 100 is installed within a particular zone of the building premises, for example, the pod 100 obtains measurements of dimensions of the zone (e.g., the size of the room in which the pod 100 is installed is 10 m by 10 m). The pod 100 or the server computing device 302 then creates a mapping of the precise location of each pixel or group of pixels generated by the imaging camera 104 and/or the thermal camera 106 based on the size of the zone and/or the orientations of the imaging camera 104 and/or the thermal camera 106. Then when the computing device 128 within the pod 100 identifies a person in the zone, the computing device 128 within the pod 100 identifies the pixel locations of the group of pixels that include the person and maps the pixel locations to a precise physical location of the person within the detection area. The computing device 128 within the pod 100 then provides indications of the precise locations of each occupant within the detection area for the pod 100. When the server computing device 302 generates a map of the building premises, the server computing device may place an indicator on the map such as a dot at the precise physical location within the zone where the person is identified.

The server computing device 302 also determines the location of the shooter based on the location of the gunshot (block 1310). More specifically, the server computing device 302 determines the location of the gunshot based on the pod 100 that captured the sound data and IR images indicative of a gunshot. The server computing device 302 then determines the location of the shooter based on the location of the gunshot and may track the location of the shooter to provide real-time updates on the shooter's location. More specifically, the server computing device 302 may determine the shooter's location based on movements from the shooter's initial location where the gunshot was fired or based on the locations of additional gunshots that are subsequently fired. The movements may be detected, for example, by continuously or periodically (e.g., every second, every minute, 10 times per second, 60 times period second, 100 times period second, etc.) identifying the location of the weapon based on visible light images from each pod 100.

In other embodiments, the computing device 128 within the pod 100 analyzes the sensor data to determine the location of the shooter based on the location of the gunshot for example, in the manner described above, and provides indications of the location of the shooter to the server computing device 302.

At block 1312, a danger zone is identified which may be an area within a threshold range of the shooter or within a threshold range of the center of the dangerous event.

Then at block 1314, the server computing device 302 generates an outdoor map display of the building premises. The outdoor map display may include a 3D model of the exterior of the building and a layout of the building premises. The 3D model of the exterior of the building may depict the location of the building within the building premises, entrances and exits to the building, etc. Additionally, the layout of the building premises may be divided into zones (e.g., Zones A-G) and may include an indication of the number of occupants in each zone (e.g., 0 occupants in Zone A) and/or indications of the precise locations of each occupant within a particular zone. Moreover, the outdoor map display may indicate the location of the shooter and/or the direction in which the shooter is moving. The outdoor map display may also indicate the danger zone by for example, highlighting the danger zone in a different color or shading from the rest of the floor layout. In some embodiments, the outdoor map display may indicate a recommended entrance for an emergency responder to enter the building, and an example navigation route from a starting location to the recommended entrance.

The server computing device 302 may then provide the outdoor map display to a client computing device 304 which may present the outdoor map display via an administrator application, a student/occupant application, a parent application, or an emergency application (block 1316). In some embodiments, the server computing device 302 generates outdoor map data and provides the outdoor map data to the client computing device 304 which then renders the outdoor map display based on the outdoor map data. For example, the outdoor map data may include location information for the location of an occupant, and the client computing device 304 may present an occupant location indicator at the received location.

Figure 14:
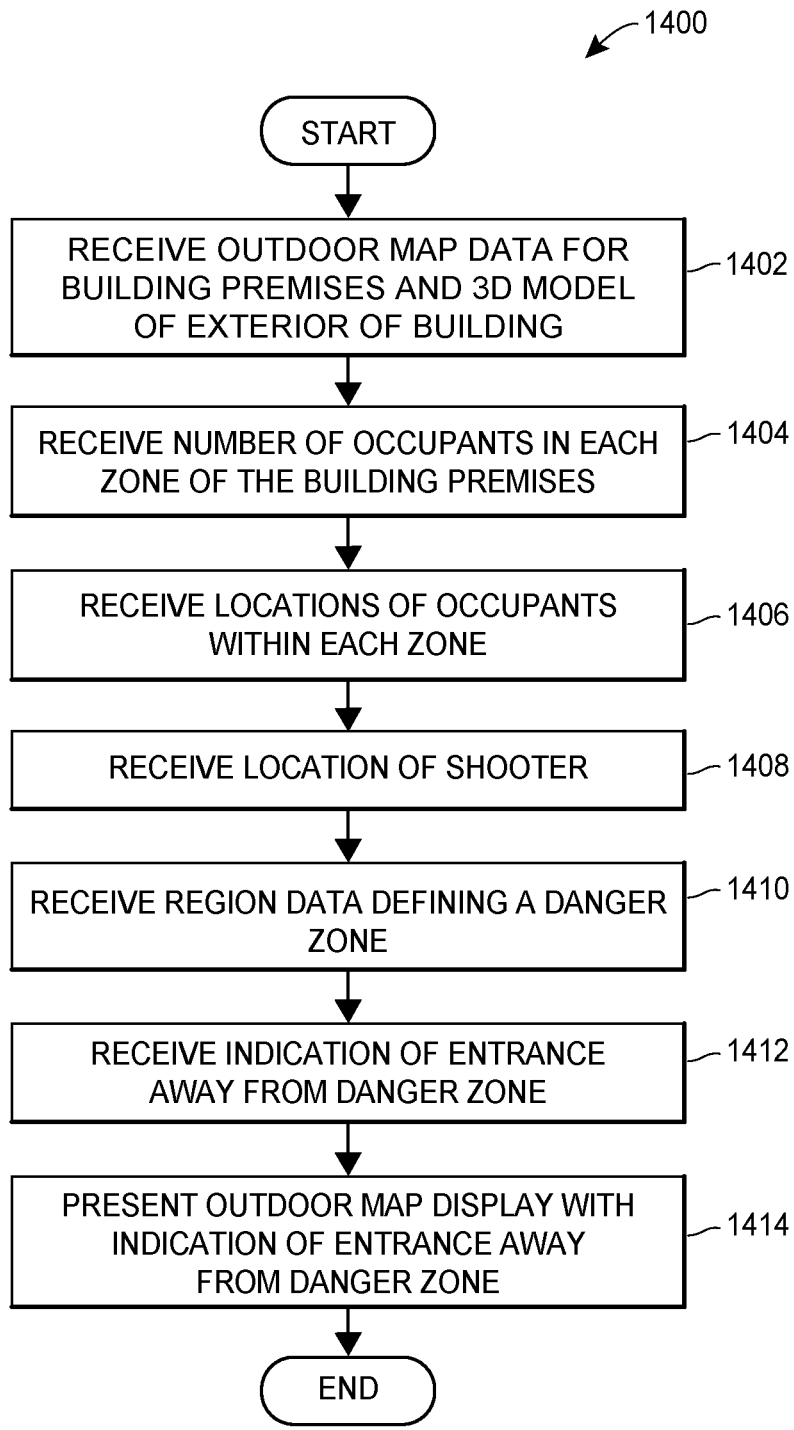
FIG. 14 illustrates a flow diagram of an example method for presenting an outdoor map display of building premises during a dangerous event which can be implemented in a client computing device.

FIG. 14 illustrates a flow diagram of an example method 1400 for presenting an outdoor map display of premises surrounding a building during a dangerous event. The method 1400 can be implemented in a client computing device 304. More specifically, the method 1400 can be implemented by one or more of an administrator application, a student/occupant application, a parent application, or an emergency responder application executing on the client computing device 304.

At block 1402, the client computing device 304 receives outdoor map data for building premises and a 3D model of the exterior of the building from the server computing device 302. The outdoor map data may include a layout of the building premises indicating zones within the building premises. For example, the layout of the building premises may be divided into five zones, where each zone corresponds to a different surface or structure of the building premises, such as a first zone corresponding to a playground, a second zone corresponding to a grass field, a third zone corresponding to a parking lot, a fourth zone corresponding to a basketball court, and a fifth zone corresponding to a pick-up line. The outdoor map data may also indicate each of the entrances to the building. Additionally, the client computing device 304 may receive an indication of the number of occupants in each zone of the building premises (block 1404). Furthermore, the client computing device 304 may receive location information for each occupant within the building premises (block 1406) and location information for the shooter (block 1408). The client computing device 304 may also receive region data indicating an area of the building premises corresponding to a danger zone (block 1410). The danger zone may be an area within a threshold range of the shooter or within a threshold range of the center of the dangerous event. The danger zone may also include areas from which occupants cannot safely exit the building.

At block 1412, the client computing device 304 receives an indication of a recommended entrance to the building which is away from the danger zone. For example, an entrance which is more than a predetermined threshold distance from the danger zone may be a recommended entrance.

Figure 15:
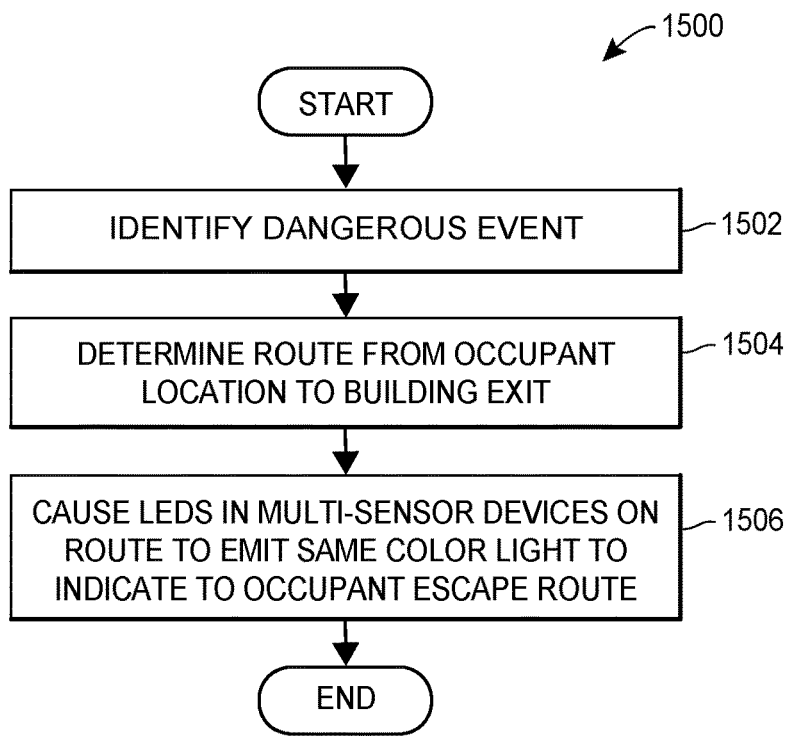
FIG. 15 illustrates a flow diagram of an example method for routing a user to a building exit during a dangerous event which can be implemented in one or more pods and/or a server computing device.

At block 1414, the client computing device 304 presents an outdoor map display based on the received outdoor map data and the 3D model of the exterior of the building including the number of occupants in each zone of the building premises, location information for each occupant within the building, location information for the shooter, and the region data indicating an area of the building premises corresponding to a danger zone. The outdoor map data may also indicate each of the entrances to the building. Furthermore, the outdoor map display may indicate the number of occupants in each zone of the building premises. Still further, the outdoor map display may include indications of the precise locations of each occupant within a particular zone and may provide identification information for the occupants. Moreover, the outdoor map display may indicate the location of the shooter and/or the direction in which the shooter is moving. The outdoor map display may also indicate the danger zone by for example, highlighting the danger zone in a different color or shading from the rest of the layout. The outdoor map display may indicate the recommended entrance for an emergency responder to enter the building, and an example navigation route from a starting location to the recommended entrance FIG. 15 illustrates a flow diagram of an example method 1500 for routing a user to a building exit during a dangerous event. The method 1500 can be implemented in a server computing device 302. In other embodiments, the method 1500 can be implemented by a computing device 128 in a pod 100, or any suitable combination of the server computing device 302 and/or the pods 100.

At block 1502, a dangerous event is identified. The dangerous event may be identified based on sensor data from the sensors in the pods 100. In some embodiments, the dangerous event may be identified from at least two different types of sensor data from at least two different sensors, where a first type of sensor data is used to detect a dangerous event and the second type of sensor data is used to verify the dangerous event.

In one example, when the dangerous event is a fire, the server computing device or the computing device 128 within the pod 100 may compare temperature data from the thermal camera 106 during a particular time period to a threshold fire temperature (e.g., 400° C.) indicative of a fire. The server computing device or the computing device 128 within the pod 100 may then detect a fire when the temperature data within the detection area includes temperatures which exceed the threshold fire temperature. To verify the existence of a fire, the server computing device or the computing device 128 within the pod 100 may analyze images detected by the imaging camera 104 or temperature data from the thermal camera 106 to for example, determine the size of the flame. If the size of the flame exceeds a threshold size (e.g., six inches), the server computing device or the computing device 128 within the pod 100 detects a fire. Otherwise, the server computing device or the computing device 128 within the pod 100 does not detect a fire.

In another example, when the dangerous event is a water leak, the server computing device or the computing device 128 within the pod 100 may compare temperature data from the thermal camera 106 during a particular time period to a threshold water temperature range (e.g., 10-15° C. and 40-50° C.) indicative of water. The water may need to be hot or cold water for the server computing device or the computing device 128 within the pod 100 to distinguish the water from the environment at room temperature. The server computing device or the computing device 128 within the pod 100 may then detect a water leak when the temperature data within the detection area includes temperatures which are within the threshold water temperature range. To verify the existence of the water leak, the server computing device or the computing device 128 within the pod 100 may analyze images detected by the imaging camera 104 to for example, determine the size of the water leak. If the size of the water leak exceeds a threshold size (e.g., one foot), the server computing device or the computing device 128 within the pod 100 detects a water leak.

In yet another example, as described above, when the dangerous event is a gunshot, the server computing device or the computing device 128 within the pod 100 compares temperature data from IR images from the thermal camera 106 to a threshold explosion temperature indicative of a blast from a bullet exiting the barrel of a gun (e.g., 200° C.). If the IR images include temperatures or heat signatures exceeding the threshold explosion temperature, the server computing device or the computing device 128 within the pod 100 detects a gunshot. To verify that the gunshot occurred, the server computing device or the computing device 128 within the pod 100 may compare the noise level from sound data from the acoustic sensor 114 captured during the same time period as the IR images to a threshold noise level range indicative of a gunshot (e.g., 140-190 dB). If the noise level during the particular time period is within the threshold noise level range, the server computing device or the computing device 128 within the pod 100 verifies that the gunshot occurred.

In another example, as described above, when the dangerous event is a weapon, the server computing device or the computing device 128 within the pod 100 may compare temperature data or heat signatures from the IR images from the thermal camera 106 to a threshold body temperature range corresponding to a human (e.g., 33° C.-44° C.) to identify an object including temperatures within the threshold body temperature range, and comparing features of the object to features from template objects using image classification and/or machine learning techniques, where at least some of the template objects represent a person.

In response to identifying a person, the server computing device or the computing device 128 within the pod 100 may identify a weapon attached to the person, such as a weapon being carried by the person or attached to the person's clothing based on differences in temperature data within the object corresponding to the person. More specifically, the server computing device or the computing device 128 may identify a portion of the object which includes temperatures outside of the body temperature range to generate a heat signature. For example, each image of a person may include several contiguous portions which are outside of the body temperature range. The server computing device or the computing device 128 may generate a heat signature for each contiguous portion. The server computing device or the computing device 128 may then identify features of each heat signature which may be compared to template features of template objects representing weapons. The server computing device or the computing device 128 may then determine whether each heat signature corresponds to a weapon (e.g., whether the heat signature is in the shape of a weapon) based on the amount of similarity, or the vector distance in the nearest neighbors algorithm, between the features of each heat signature and the features for template objects that represent a weapon.

To verify that there is a weapon in the building premises, the server computing device or the computing device 128 within the pod 100 may analyze the same portion of the visible light image as the portion of the thermal image that includes the heat signature corresponding to a weapon using image classification and/or machine learning techniques. If the same portion of the visible light image is identified as a weapon, the server computing device or the computing device 128 within the pod 100 verifies that there is a weapon in the building premises.

In any event, in response to identifying the dangerous event, a route is identified from the location of an occupant to the closest and/or safest exit from the building (block 1504). To determine the route from the occupant to the exit, the server computing device 302 may identify a series of waypoints along a shortest path to the exit using a pathfinding method. More specifically, the server computing device 302 may generate a set of vertices in an indoor map display where each vertex is a point on the indoor map display which is not obstructed by a wall or door. The vertices may be distributed throughout the indoor map display, such that each vertex is at least a threshold distance away from the nearest vertex (e.g., one meter, three meters, etc. of real-world distance). Each pair of vertices may have an assigned weight according to the distance between the pair. The server computing device 302 may then find the shortest path to the exit by identifying a subset of the vertices having the shortest combined distance to the exit according to the respective weights. If one of the waypoints intersects with a danger zone, the server computing device 302 may identify an alternate path from the previous waypoint to the exit.

Then at block 1506, the server computing device 302 or a computing device 128 within one of the pods 100 may communicate with the pods 100 on the route to cause each of the pods 100 on the route to activate light emitting elements 720 to signal to the occupant the path, for example by sending control signals to the pods 100 on the route. For example, each of the pods 100 along the route may activate LEDs having the same color (e.g., blue) or having the same blinking frequency or pattern (e.g., twice per second) to signal to the occupant the route. One or more of the pods 100 may announce via a respective speaker 108 the color or blinking frequency or pattern for the route. Occupants may then follow along the route according to the announced color or blinking frequency or pattern to reach the closest and/or safest exit.

In some scenarios, the closest and/or safest exit and path to the closest and/or safest exit may be different in different parts of the building. Accordingly, for a first occupant or set of occupants in a first area of the building, the server computing device 302 may determine a first route on a first path to a first exit. For a second occupant or set of occupants in a second area of the building, the server computing device 302 may determine a second route on a second path to a second exit. The server computing device 302 may also identify a first set of pods 100 along the first path and a second set of pods 100 along the second path. The server computing device 302 may then cause each of the first set of pods 100 along the first path to activate LEDs having a first color (e.g., yellow) or blinking frequency or pattern (e.g., once per second), and may also cause each of the second set of pods 100 along the second path to activate LEDs having a second color (e.g., purple) or blinking frequency or pattern (e.g., every two seconds) different from the first color or blinking frequency. One or more of the pods 100 in the first set of pods 100 may announce via a respective speaker 108 the color or blinking frequency or pattern for the first path, and one or more of the pods 100 in the second set of pods 100 may announce via a respective speaker 108 the color or blinking frequency or pattern for the second path. Then the occupants may follow along the corresponding path according to the announced color or blinking frequency to reach the closest and/or safest exit.

Figure 16:
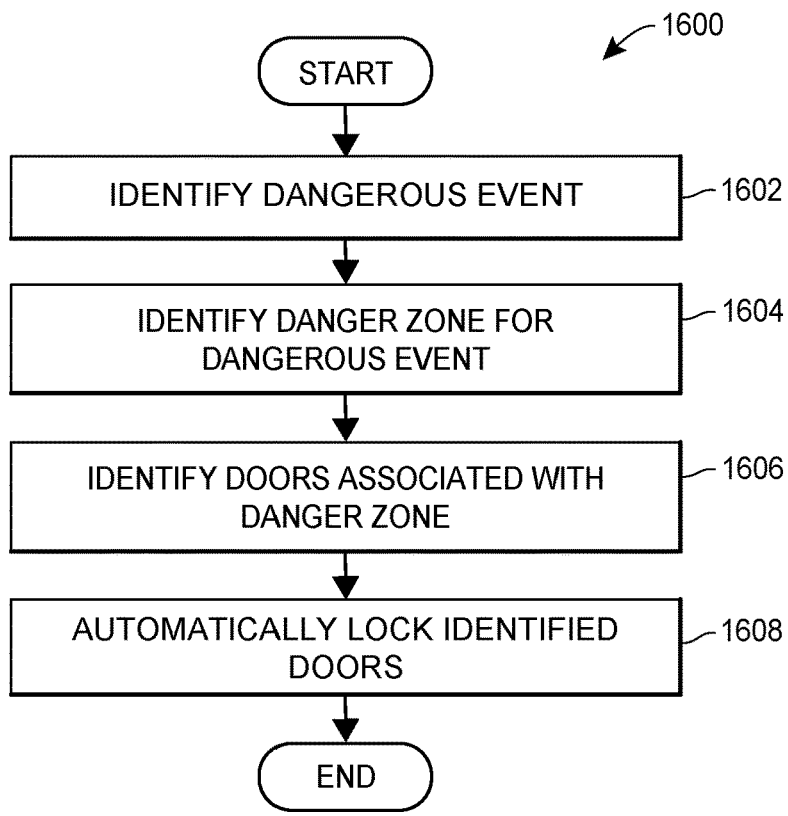
FIG. 16 illustrates a flow diagram of an example method for automatically locking a door in a building during a dangerous event which can be implemented in one or more pods and/or a server computing device.

FIG. 16 illustrates a flow diagram of an example method 1600 for automatically locking a door in a building during a dangerous event. The method 1600 can be implemented in a server computing device 302. In other embodiments, the method 1600 can be implemented by a computing device 128 in a pod 100, or any suitable combination of the server computing device 302 and/or the pods 100.

At block 1602, a dangerous event is identified. The dangerous event may be identified based on sensor data from the sensors in the pods 100. In some embodiments, the dangerous event may be identified from at least two different types of sensor data from at least two different sensors, where a first type of sensor data is used to detect a dangerous event and the second type of sensor data is used to verify the dangerous event.

In one example, when the dangerous event is a fire, the server computing device or the computing device 128 within the pod 100 may compare temperature data from the thermal camera 106 during a particular time period to a threshold fire temperature (e.g., 400° C.) indicative of a fire. The server computing device or the computing device 128 within the pod 100 may then detect a fire when the temperature data within the detection area includes temperatures which exceed the threshold fire temperature. To verify the existence of a fire, the server computing device or the computing device 128 within the pod 100 may analyze images detected by the imaging camera 104 or temperature data from the thermal camera 106 to for example, determine the size of the flame. If the size of the flame exceeds a threshold size (e.g., six inches), the server computing device or the computing device 128 within the pod 100 detects a fire. Otherwise, the server computing device or the computing device 128 within the pod 100 does not detect a fire.

In another example, when the dangerous event is a water leak, the server computing device or the computing device 128 within the pod 100 may compare temperature data from the thermal camera 106 during a particular time period to a threshold water temperature range (e.g., 10-15° C. and 40-50° C.) indicative of water. The water may need to be hot or cold water for the server computing device or the computing device 128 within the pod 100 to distinguish the water from the environment at room temperature. The server computing device or the computing device 128 within the pod 100 may then detect a water leak when the temperature data within the detection area includes temperatures which are within the threshold water temperature range. To verify the existence of the water leak, the server computing device or the computing device 128 within the pod 100 may analyze images detected by the imaging camera 104 to for example, determine the size of the water leak. If the size of the water leak exceeds a threshold size (e.g., one foot), the server computing device or the computing device 128 within the pod 100 detects a water leak.

In yet another example, as described above, when the dangerous event is a gunshot, the server computing device or the computing device 128 within the pod 100 compares temperature data from IR images from the thermal camera 106 to a threshold explosion temperature indicative of a blast from a bullet exiting the barrel of a gun (e.g., 200° C.). If the IR images include temperatures or heat signatures exceeding the threshold explosion temperature, the server computing device or the computing device 128 within the pod 100 detects a gunshot. To verify that the gunshot occurred, the server computing device or the computing device 128 within the pod 100 may compare the noise level from sound data from the acoustic sensor 114 captured during the same time period as the IR images to a threshold noise level range indicative of a gunshot (e.g., 140-190 dB). If the noise level during the particular time period is within the threshold noise level range, the server computing device or the computing device 128 within the pod 100 verifies that the gunshot occurred.

In another example, as described above, when the dangerous event is a weapon, the server computing device or the computing device 128 within the pod 100 may compare temperature data or heat signatures from the IR images from the thermal camera 106 to a threshold body temperature range corresponding to a human (e.g., 33° C.-44° C.) to identify an object including temperatures within the threshold body temperature range, and comparing features of the object to features from template objects using image classification and/or machine learning techniques, where at least some of the template objects represent a person.

In response to identifying a person, the server computing device or the computing device 128 within the pod 100 may identify a weapon attached to the person, such as a weapon being carried by the person or attached to the person's clothing based on differences in temperature data within the object corresponding to the person. More specifically, the server computing device or the computing device 128 may identify a portion of the object which includes temperatures outside of the body temperature range to generate a heat signature. For example, each image of a person may include several contiguous portions which are outside of the body temperature range. The server computing device or the computing device 128 may generate a heat signature for each contiguous portion. The server computing device or the computing device 128 may then identify features of each heat signature which may be compared to template features of template objects representing weapons. The server computing device or the computing device 128 may then determine whether each heat signature corresponds to a weapon (e.g., whether the heat signature is in the shape of a weapon) based on the amount of similarity, or the vector distance in the nearest neighbors algorithm, between the features of each heat signature and the features for template objects that represent a weapon.

To verify that there is a weapon in the building premises, the server computing device or the computing device 128 within the pod 100 may analyze the same portion of the visible light image as the portion of the thermal image that includes the heat signature corresponding to a weapon using image classification and/or machine learning techniques. If the same portion of the visible light image is identified as a weapon, the server computing device 302 or the computing device 128 within the pod 100 verifies that there is a weapon in the building premises.

In any event, a danger zone is also identified for the dangerous event (block 1604). The danger zone may be an area within the building premises which includes locations within a predetermined threshold distance of the center of the dangerous event or an area from which occupants cannot safely exit the building. In response to identifying the dangerous event, the server computing device or the computing device 128 within the pod 100 identifies doors within the building which are associated with the danger zone (block 1606). Doors associated with the danger zone may be doors within a threshold distance of the danger zone, doors leading to areas from which occupants cannot safely exit the building, or doors along the perimeter of the building that provide access to and/or egress from the building when the danger zone is outside the building.

At block 1608, the server computing device 302 or the computing device 128 within the pod 100 may cause each of the identified doors to be locked. Each of the doors may include electronically-controlled locking mechanisms which have communication interfaces to communicate over short- and long-range communication links, such as the August Smart Lock®, which can be locked and unlocked remotely by sending control signals to the electronically-controlled locking mechanism from a computing device 128 within the pod 100, the server computing device 302, or the client computing devices 304. Accordingly, the server computing device 302 or the computing device 128 within the pod 100 may automatically lock the doors by transmitting control signals to the electronically-controlled locking mechanisms instructing the electronically-controlled locking mechanisms to cause the lock state to change from unlocked to locked.

Additionally, the administrator application may present notifications when doors are locked and unlocked including the location of each door which is locked or unlocked. The administrator application may also present indications of current lock states (e.g., locked or unlocked) of each of the doors. For example, the administrator application may present an indoor map display including indications of each of the doors and their current lock states.

Figure 17:
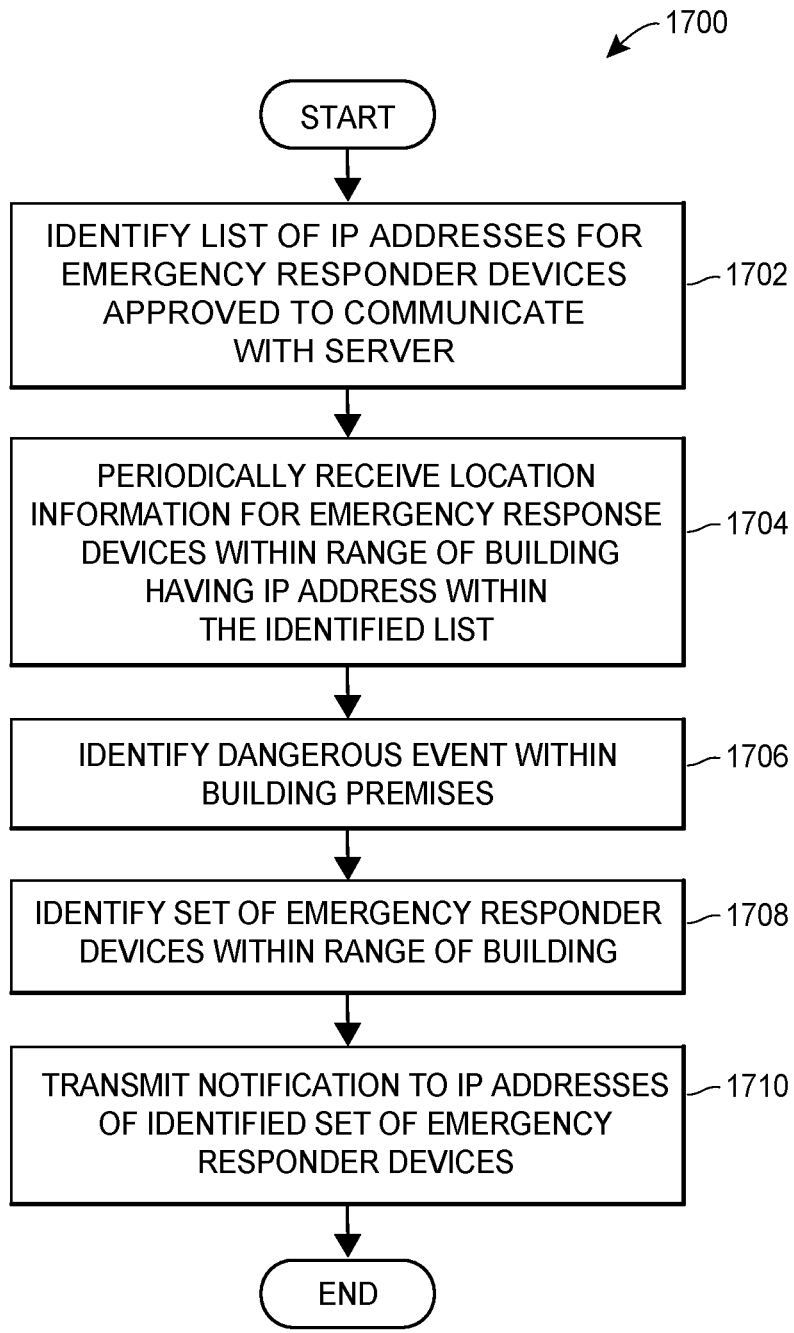
FIG. 17 illustrates a flow diagram of an example method for broadcasting a notification of a dangerous event to an emergency responder device which can be implemented in one or more pods and/or a server computing device.

FIG. 17 illustrates a flow diagram of an example method 1700 for broadcasting a notification of a dangerous event to an emergency responder device. The method 1700 can be implemented in a server computing device 302. In other embodiments, the method 1700 can be implemented by a computing device 128 in a pod 100, or any suitable combination of the server computing device 302 and/or the pods 100.

At block 1702, a list of Internet Protocol (IP) addresses are identified corresponding to emergency responder client computing devices 304 such as toughbooks which are authorized to receive alerts and to respond to a dangerous event. Then at block 1704, location information is periodically received from the emergency responder client computing devices 304 indicating their current locations.

At block 1706, a dangerous event is detected within building premises of a building. The dangerous event may be identified based on sensor data from the sensors in the pods 100. In some embodiments, the dangerous event may be identified from at least two different types of sensor data from at least two different sensors, where a first type of sensor data is used to detect a dangerous event and the second type of sensor data is used to verify the dangerous event.

In one example, when the dangerous event is a fire, the server computing device or the computing device 128 within the pod 100 may compare temperature data from the thermal camera 106 during a particular time period to a threshold fire temperature (e.g., 400° C.) indicative of a fire. The server computing device or the computing device 128 within the pod 100 may then detect a fire when the temperature data within the detection area includes temperatures which exceed the threshold fire temperature. To verify the existence of a fire, the server computing device or the computing device 128 within the pod 100 may analyze images detected by the imaging camera 104 or temperature data from the thermal camera 106 to for example, determine the size of the flame. If the size of the flame exceeds a threshold size (e.g., six inches), the server computing device or the computing device 128 within the pod 100 detects a fire. Otherwise, the server computing device or the computing device 128 within the pod 100 does not detect a fire.

In another example, when the dangerous event is a water leak, the server computing device or the computing device 128 within the pod 100 may compare temperature data from the thermal camera 106 during a particular time period to a threshold water temperature range (e.g., 10-15° C. and 40-50° C.) indicative of water. The water may need to be hot or cold water for the server computing device or the computing device 128 within the pod 100 to distinguish the water from the environment at room temperature. The server computing device or the computing device 128 within the pod 100 may then detect a water leak when the temperature data within the detection area includes temperatures which are within the threshold water temperature range. To verify the existence of the water leak, the server computing device or the computing device 128 within the pod 100 may analyze images detected by the imaging camera 104 to for example, determine the size of the water leak. If the size of the water leak exceeds a threshold size (e.g., one foot), the server computing device or the computing device 128 within the pod 100 detects a water leak.

In yet another example, as described above, when the dangerous event is a gunshot, the server computing device or the computing device 128 within the pod 100 compares temperature data from IR images from the thermal camera 106 to a threshold explosion temperature indicative of a blast from a bullet exiting the barrel of a gun (e.g., 200° C.). If the IR images include temperatures or heat signatures exceeding the threshold explosion temperature, the server computing device or the computing device 128 within the pod 100 detects a gunshot. To verify that the gunshot occurred, the server computing device or the computing device 128 within the pod 100 may compare the noise level from sound data from the acoustic sensor 114 captured during the same time period as the IR images to a threshold noise level range indicative of a gunshot (e.g., 140-190 dB). If the noise level during the particular time period is within the threshold noise level range, the server computing device or the computing device 128 within the pod 100 verifies that the gunshot occurred.

In another example, as described above, when the dangerous event is a weapon, the server computing device or the computing device 128 within the pod 100 may compare temperature data or heat signatures from the IR images from the thermal camera 106 to a threshold body temperature range corresponding to a human (e.g., 33° C.-44° C.) to identify an object including temperatures within the threshold body temperature range, and comparing features of the object to features from template objects using image classification and/or machine learning techniques, where at least some of the template objects represent a person.

In response to identifying a person, the server computing device or the computing device 128 within the pod 100 may identify a weapon attached to the person, such as a weapon being carried by the person or attached to the person's clothing based on differences in temperature data within the object corresponding to the person. More specifically, the server computing device or the computing device 128 may identify a portion of the object which includes temperatures outside of the body temperature range to generate a heat signature. For example, each image of a person may include several contiguous portions which are outside of the body temperature range. The server computing device or the computing device 128 may generate a heat signature for each contiguous portion. The server computing device or the computing device 128 may then identify features of each heat signature which may be compared to template features of template objects representing weapons. The server computing device or the computing device 128 may then determine whether each heat signature corresponds to a weapon (e.g., whether the heat signature is in the shape of a weapon) based on the amount of similarity, or the vector distance in the nearest neighbors algorithm, between the features of each heat signature and the features for template objects that represent a weapon.

To verify that there is a weapon in the building premises, the server computing device or the computing device 128 within the pod 100 may analyze the same portion of the visible light image as the portion of the thermal image that includes the heat signature corresponding to a weapon using image classification and/or machine learning techniques. If the same portion of the visible light image is identified as a weapon, the server computing device 302 or the computing device 128 within the pod 100 verifies that there is a weapon in the building premises.

In any event, in response to detecting the dangerous event, a set of emergency responder client computing devices 304 may be identified which are within a threshold distance of the building premises (e.g., two miles) according to the received location information (block 1708). Then for each emergency responder client computing device 304 in the set, the server computing device 302 or the computing device 128 in the pod 100 may transmit a notification or alert to the IP address in the list of authorized IP addresses corresponding to the emergency responder client computing device 304 (block 1710). The notification or alert may indicate that a dangerous event has occurred within the building premises, the location of the building premises, a type of dangerous event such as a gunshot, weapon, fire, gas leak or other airborne contaminant, water leak, suspicious bag, fight, vandalism, etc., a type of weapon, the number of students/occupants who have been injured and may require emergency assistance, a recommended entrance for the emergency responder to use when entering the building which is away from the danger zone, or any other suitable information for providing emergency assistance in response to a dangerous event.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

The following list of aspects reflects a variety of the embodiments explicitly contemplated by the present application. Those of ordinary skill in the art will readily appreciate that the aspects below are neither limiting of the embodiments disclosed herein, nor exhaustive of all of the embodiments conceivable from the disclosure above, but are instead meant to be exemplary in nature.

Section A

1A. A security system comprising: a multi-sensor device including: a camera configured to capture images within a detection area of the multi-sensor device; and a thermal camera configured to detect heat signatures from objects within the detection area; and a computing device including: one or more processors; and a non-transitory computer-readable memory coupled to the one or more processors and storing instructions thereon that, when executed by the one or more processors, cause the computing device to: receive image data, and heat signatures from the camera, and the thermal camera, respectively; analyze the image data, and heat signatures to identify a dangerous event at the detection area; and provide an alert indicating the dangerous event at the detection area.

2A. The security system according to aspect 1A, wherein the multi-sensor device is encased in a bulletproof material.

3A. The security system according to any of the previous aspects in this section, wherein the instructions further cause the computing device to: detect a person within the detection area by: analyzing the image data to identify an object within the image having features corresponding to a person; analyzing the heat signature for the object to determine whether the heat signature for the person is within a body temperature range; and detecting the person when the object within the image has features corresponding to the person and the heat signature is within the body temperature range.

4A. The security system according to any of the previous aspects in this section, wherein the instructions further cause the computing device to: generate a map of the detection area including indications of people within the detection area and an indication of a dangerous person or object within the detection area.

5A. The security system according to any of the previous aspects in this section, wherein the multi-sensor device further includes an acoustic sensor configured to detect sound within the detection area, wherein to analyze the image data, heat signatures, and sound data to identify a dangerous event at the detection area, the instructions cause the computing device to: compare a heat signature to a threshold explosion temperature; compare a sound to a threshold noise level range; and detect a gunshot based on the heat signature being above the threshold explosion temperature and the sound being within the threshold noise level range.

6A. The security system according to any of the previous aspects in this section, wherein the instructions further cause the computing device to: in response to detecting the gunshot: identify a number of blasts based on the sound data.

7A. The security system according to any of the previous aspects in this section, wherein the instructions further cause the computing device to: identify a noise level associated with each blast from the sound data; and identify a type of weapon corresponding to the gunshot based on the number of blasts and the noise level associated with each blast.

8A. The security system according to any of the previous aspects in this section, wherein the instructions further cause the computing device to: in response to detecting the gunshot: analyze a change in position of the heat signatures that are above the threshold explosion temperature over time to determine a trajectory of a projectile.

9A. The security system according to any of the previous aspects in this section, wherein the instructions further cause the computing device to: store the image data in response to identifying the dangerous event at the detection area.

10A. The security system according to any of the previous aspects in this section, wherein the security system includes a plurality of multi-sensor devices dispersed throughout a building.

11A. The security system according to any of the previous aspects in this section, wherein the plurality of multi-sensor devices communicate with each other to track a location of a danger zone within a predetermined threshold distance of the dangerous event.

12A. The security system according to any of the previous aspects in this section, wherein the multi-sensor device further includes a speaker and the instructions further cause the computing device to: provide, via the speaker, an alert specific to the detection area for the multi-sensor device.

13A. The security system according to any of the previous aspects in this section, wherein the alert includes information regarding the dangerous event.

14A. The security system according to any of the previous aspects in this section, wherein the information regarding the dangerous event includes a location of an active shooter.

15A. The security system according to any of the previous aspects in this section, wherein the multi-sensor device further includes a communication interface configured to communicate with portable devices via a short-range communication link and configured to communicate with the computing device via a long-range communication link.

16A. The security system according to any of the previous aspects in this section, wherein one of the portable devices determines that the portable device is within the detection area of the multi-sensor device in response to receiving a transmission from the multi-sensor device via the short-range communication link.

17A. The security system according to any of the previous aspects in this section, wherein the transmission includes a unique identifier for the multi-sensor device to identify the multi-sensor device of a plurality of multi-sensor devices and a corresponding detection area.

18A. The security system according to any of the previous aspects in this section, wherein one of the portable devices is a visitor badge.

19A. The security system according to any of the previous aspects in this section, wherein to analyze the image data, and heat signatures to identify a dangerous event at the detection area, the instructions cause the computing device to: compare a heat signature of the heat signatures to a threshold fire temperature; and detect a fire based on the heat signature being above the threshold fire temperature.

20A. The security system according to any of the previous aspects in this section wherein the multi-sensor device further includes: a gas sensor configured to detect gas within the detection area.

21A. The security system according to any of the previous aspects in this section, wherein the instructions further cause the computing device to: receive an indication of a gas leak from the gas sensor; and provide an alert of the gas leak within the detection area.

22A. The security system according to any of the previous aspects in this section, wherein the gas sensor is configured to detect air quality within the detection area.

23A. The security system according to any of the previous aspects in this section, wherein the gas sensor is configured to detect at least one of: carbon monoxide, carbon dioxide, acetylene, methanol, or ethanol.

24A. The security system according to any of the previous aspects in this section, wherein the multi-sensor device further includes: a microphone configured to receive voice communications within the detection area for interacting with an administrator or emergency responder.

25A. The security system according to any of the previous aspects in this section, wherein to analyze the image data, and heat signatures to identify a dangerous event at the detection area, the instructions cause the computing device to: analyze the image data to identify an object within the image having features corresponding to a weapon prior to detecting a gunshot.

26A. The security system according to any of the previous aspects in this section, wherein the multi-sensor device further includes: a rechargeable power cell configured to provide power to sensors within the multi-sensor device; and one or more generators configured to generate additional power and provide the additional power to recharge the rechargeable power cell.

27A. The security system according to any of the previous aspects in this section, wherein the multi-sensor device further includes: one or more fasteners for attaching a casing to the multi-sensor device; a sensor communicatively coupled to at least one of the fasteners configured to detect whether the at least one fastener has been removed; wherein in response to the sensor detecting that the at least one fastener has been removed, the instructions further cause the computing device to transmit an alert indicating that the multi-sensor device has been tampered with.

28A. The security system according to any of the previous aspects in this section, wherein the multi-sensor device further includes: one or more light emitting elements; wherein in response to the sensor detecting that the fastener has been removed, the instructions further cause the computing device to activate the one or more light emitting elements.

29A. The security system according to any of the previous aspects in this section, wherein the dangerous event includes at least one of: a gunshot, a weapon, a fire, a gas leak or other airborne contaminant, a water leak, a suspicious bag, a fight, or vandalism.

30A. The security system according to any of the previous aspects in this section, wherein the instructions further cause the computing device to: identify a danger zone within building premises corresponding to locations within a predetermined threshold distance of the dangerous event; determine a route from a location of one or more occupants to a building exit which avoids the danger zone; and communicate the route to the one or more occupants.

31A. The security system according to any of the previous aspects in this section, wherein the multi-sensor device further includes a speaker and the instructions further cause the computing device to: provide, via the speaker, announcements for a building which includes the multi-sensor device.

Section B

1B. A gunshot detection system comprising: an acoustic sensor configured to detect sound within a detection area of the gunshot detection system; and a thermal camera configured to detect heat signatures from objects within the detection area, wherein a gunshot is detected in response to detecting a heat signature above a threshold temperature and a sound within a threshold noise level range.

2B. The gunshot detection system according to aspect 1B, further comprising: one or more processors; and a non-transitory computer-readable memory coupled to the one or more processors and storing instructions thereon that, when executed by the one or more processors, cause the one or more processors to: compare the sound to the threshold noise level range; compare the heat signature to the threshold temperature; and detect the gunshot in response to determining that the sound is in the threshold noise level range, the heat signature is above the threshold temperature, and the sound and the heat signature are detected within a same time period.

3B. The gunshot detection system according to any of the previous aspects in this section, wherein the threshold noise level range is between 140 and 190 decibels (dB) and the threshold temperature is 200 degrees Celsius.

Section C

1C. A multi-sensor device comprising: a first sensor configured to capture a first type of sensor data within a detection area of the multi-sensor device; a second sensor configured to capture a second type of sensor data within the detection area different from the first type of sensor data; one or more processors; and a non-transitory computer-readable memory coupled to the one or more processors and storing instructions thereon that, when executed by the one or more processors, cause the multi-sensor device to: analyze the first type of sensor data to identify a dangerous event at the detection area; and analyze the second type of sensor data to verify the dangerous event has occurred.

2C. The multi-sensor device according to aspect 1C, wherein the first sensor is a thermal camera configured to detect heat signatures from objects within a detection area of the multi-sensor device and the second sensor is a camera configured to capture images within the detection area.

3C. The multi-sensor device according to any of the previous aspects in this section, wherein the dangerous event is a fire, wherein to analyze the first type of sensor data, the instructions cause the multi-sensor device to compare a heat signature for an object to a fire threshold to identify the fire, and wherein to analyze the second type of sensor data, the instructions cause the multi-sensor device to: analyze the images from the camera to determine a size of the fire; compare the size of the fire to a threshold size; and verify the dangerous event has occurred in response to determining that the size of the fire exceeds the threshold size.

4C. The multi-sensor device according to any of the previous aspects in this section, wherein the dangerous event is a water leak, wherein to analyze the first type of sensor data, the instructions cause the multi-sensor device to compare a heat signature for an object to a water threshold to identify the water leak, and wherein to analyze the second type of sensor data, the instructions cause the multi-sensor device to: analyze the images from the camera to determine a size of the water leak; compare the size of the water leak to a threshold size; and verify the dangerous event has occurred in response to determining that the size of the water leak exceeds the threshold size.

Section D

1D. A method for routing a user to a building exit during a dangerous event, the method comprising: identifying, by one or more processors, a dangerous event within a building occupied by an occupant; in response to identifying the dangerous event within the building, determining, by the one or more processors, a route from a location of the occupant to a building exit which avoids a danger zone corresponding to the dangerous event; and causing, by the one or more processors, an indication of the route to be presented to the occupant by controlling one or more lights on a path corresponding to the route.

2D. The method according to claim 1D, wherein controlling one or more lights on a path corresponding to the route includes: identifying a set of multi-sensor devices on the path corresponding to the route, each multi-sensor device including one or more light emitting elements; and sending a control signal to each of the set of multi-sensor devices to activate the one or more light emitting elements.

3D. The method according to any of the previous aspects in this section, wherein each multi-sensor device is configured to emit light having a plurality of different colors via the one or more light emitting elements, and wherein the control signal includes an instruction for each multi-sensor device to cause the one or more light emitting elements to emit a particular color of a plurality of colors.

4D. The method according to any of the previous aspects in this section, wherein the occupant is a first occupant, the route is a first route, the path is a first path, the set of multi-sensor devices is a first set of multi-sensor devices, the one or more light emitting elements are first light emitting elements, and further comprising: determining, by the one or more processors, a second route from a location of a second occupant to a building exit which avoids the danger zone; identifying a second set of multi-sensor devices on a second path corresponding to the second route, each multi-sensor device including one or more second light emitting elements; causing, by the one or more processors, the indication of the first route to be presented to the first occupant by sending a first control signal to each of the first set of multi-sensor devices on the first path to cause the one or more first light emitting elements to emit a first color; and causing, by the one or more processors, an indication of the second route to be presented to the second occupant by sending a second control signal to each of the second set of multi-sensor devices on the second path to cause the one or more second light emitting elements to emit a second color different from the first color.

5D. The method according to any of the previous aspects in this section, wherein the one or more light emitting elements for each of the set of multi-sensor devices illuminate a surface to which the respective multi-sensor device is mounted.

6D. The method according to any of the previous aspects in this section, wherein identifying the dangerous event includes: obtaining, by the one or more processors, sound data indicative of sound within the building from an acoustic sensor; obtaining, by the one or more processors, a heat signature from an object within the building from a thermal camera; and detecting, by the one or more processors, a gunshot in response to determining that the heat signature is above a threshold temperature and the sound is within a threshold noise level range.

7D. The method according to any of the previous aspects in this section, wherein identifying the dangerous event includes: obtaining, by the one or more processors, a heat signature from an object within the building from a thermal camera; and detecting, by the one or more processors, a fire in response to determining that the heat signature above is above a threshold fire temperature.

8D. The method according to any of the previous aspects in this section, wherein identifying the dangerous event includes: detecting, by the one or more processors, a gas leak based on chemical data from a gas sensor.

9D. The method according to any of the previous aspects in this section, wherein identifying the dangerous event includes: obtaining, by the one or more processors, image data for an object within the building from a camera; obtaining, by the one or more processors, a heat signature from the object from a thermal camera; detecting, by the one or more processors, a person by analyzing the image data to identify that the object includes features corresponding to a person, and analyzing the temperature data for the object to determine that the temperature data includes temperatures for the person within a body temperature range; and detecting, by the one or more processors, a weapon attached to the person based on differences in temperature data within the object, wherein the differences in temperature data include temperatures outside of the body temperature range which generate a heat signature corresponding to a weapon.

Section E

1E. A method for automatically locking a door in a building during a dangerous event, the method comprising: identifying, by one or more processors, a dangerous event within building premises; and in response to identifying the dangerous event within the building premises, automatically locking, by the one or more processors, one or more doors within the building premises.

2E. The method according to aspect 1E, wherein automatically locking one or more doors within the building premises includes: for each of the one or more doors, providing, by the one or more processors to an electronically-controlled locking mechanism attached to the door, a control signal to lock the door.

3E. The method according to any of the previous aspects in this section, further comprising: identifying, by the one or more processors, a danger zone within the building premises corresponding to locations within a predetermined threshold distance of the dangerous event; identifying, by the one or more processors, one or more doors associated with the danger zone; and automatically locking, by the one or more processors, the one or more doors associated with the danger zone.

4E. The method according to any of the previous aspects in this section, wherein the danger zone corresponds to locations exterior to the building and automatically locking the one or more doors associated with the danger zone includes automatically locking each door along a perimeter of the building that provides access to and egress from the building.

5E. The method according to any of the previous aspects in this section, wherein the danger zone corresponds to locations interior to the building and automatically locking the one or more doors associated with the danger zone includes automatically locking each door within a threshold distance of the danger zone.

6E. The method according to any of the previous aspects in this section, further comprising: identifying, by the one or more processors, the danger zone corresponding to a first set of locations at a first time; identifying, by the one or more processors, that the danger zone has moved to a second set of locations at a second time; and in response to determining that a door of the one or more doors is no longer associated with the danger zone at the second time, automatically unlocking, by the one or more processors, the door to allow occupants to exit the building.

7E. The method according to any of the previous aspects in this section, wherein identifying the dangerous event includes: obtaining, by the one or more processors, sound data indicative of sound within the building from an acoustic sensor; obtaining, by the one or more processors, a heat signature from an object within the building from a thermal camera; and detecting, by the one or more processors, a gunshot in response to determining that the heat signature is above a threshold temperature and the sound is within a threshold noise level range.

8E. The method according to any of the previous aspects in this section, wherein identifying the dangerous event includes: obtaining, by the one or more processors, a heat signature from an object within the building from a thermal camera; and detecting, by the one or more processors, a fire in response to determining that the heat signature above is above a threshold fire temperature.

9E. The method according to any of the previous aspects in this section, wherein identifying the dangerous event includes: detecting, by the one or more processors, a gas leak based on chemical data from a gas sensor.

10E. The method according to any of the previous aspects in this section, wherein identifying the dangerous event includes: obtaining, by the one or more processors, image data for an object within the building from a camera; obtaining, by the one or more processors, a heat signature from the object from a thermal camera; detecting, by the one or more processors, a person by analyzing the image data to identify that the object includes features corresponding to a person, and analyzing the temperature data for the object to determine that the temperature data includes temperatures for the person within a body temperature range; and detecting, by the one or more processors, a weapon attached to the person based on differences in temperature data within the object, wherein the differences in temperature data include temperatures outside of the body temperature range which generate a heat signature corresponding to a weapon.

Section F

1F. A method for identifying a weapon according to a heat signature, the method comprising: obtaining from a camera, by one or more processors, image data for an object; obtaining from a thermal camera, by the one or more processors, temperature data for the object; detecting, by the one or more processors, a person by analyzing the image data to identify that the object includes features corresponding to a person, and analyzing the temperature data for the object to determine that the temperature data includes temperatures for the person within a body temperature range; and detecting, by the one or more processors, a weapon attached to the person based on differences in temperature data within the object, wherein the differences in temperature data include temperatures outside of the body temperature range which generate a heat signature corresponding to a weapon.

2F. The method according to aspect 1F, wherein detecting the weapon attached to the person based on differences in temperature data within the object includes identifying, by the one more processors, a heat signature of temperatures outside of the body temperature range, which is in a shape of a weapon.

3F. The method according to any of the previous aspects in this section, wherein identifying the heat signature of temperatures outside of the body temperature range, which is in the shape of a weapon, includes: identifying, by the one or more processors, features of the heat signature including a geometry of edges of the heat signature; comparing, by the one or more processors, the features of the heat signature to features of template objects representing weapons; and detecting, by the one or more processors, that the heat signature is for a weapon when the features of the heat signature correspond to a set of features for one of the template objects.

Section G

1G. A security system for tracking individuals comprising: a radio-frequency identification tag associated with an individual located within a detection area; a radio-frequency identification reader configured to detect a signal from the radio-frequency identification tag; and a computing device including: one or more processors; and a non-transitory computer-readable memory coupled to the one or more processors and storing machine readable instructions thereon that, when executed by the one or more processors, cause the computing device to: obtain radio-frequency identification tag information from the signal from the radio-frequency identification tag; analyze the signal from the radio-frequency identification tag to identify a location of the radio-frequency identification tag; analyze the radio-frequency tag information to obtain identification information for the individual associated with the radio-frequency identification tag; obtain indications of locations that the individual is authorized to enter; determine that the individual is at an unauthorized location; and provide an alert that the individual is at the unauthorized location, the alert indicating the identity of the individual associated with the radio-frequency identification tag and the location of the radio-frequency identification tag.

2G. The security system according to aspect 1G, wherein the radio-frequency identification tag is coupled to at least one of a lanyard, an identification card, a wristband, a ring, or an item to be carried in a pocket.

3G. The security system according to any of the previous aspects in this section, further comprising an accelerometer coupled to the radio-frequency identification tag; and wherein the machine readable instructions further cause the computing device to: obtain acceleration data from the z-axis accelerometer; determine, based on the acceleration data, that the radio-frequency identification tag has been removed from the individual; and provide an alert indicating that the radio-frequency identification tag has been removed.

4G. The security system according to any of the previous aspects in this section, wherein to determine that the radio-frequency identification tag has been removed from the individual, the machine readable instructions further cause the computing device to: compare the acceleration data from the z-axis accelerometer to a threshold acceleration; and determine that the radio-frequency identification tag has been removed from the individual in response to determining that the acceleration data includes an acceleration above the threshold acceleration.

5G. The security system according to any of the previous aspects in this section, wherein to determine that the radio-frequency identification tag has been removed from the individual, the machine readable instructions further cause the computing device to: train a machine learning model using (i) a plurality of sets of acceleration data for a plurality of users having a plurality of radio-frequency identification tags, and for each user, (ii) an indication of whether or not the user removed a corresponding radio-frequency identification tag; and apply the acceleration data from the z-axis accelerometer to the machine learning model to determine whether the radio-frequency identification tag has been removed from the individual.

6G. The security system according to any of the previous aspects in this section further comprising: a rechargeable power cell configured to provide power to the radio-frequency identification tag; and a radio-frequency identification tag hub configured to be selectively coupled to the radio-frequency identification tag and configured to: charge the power cell of the radio-frequency identification tag; erase data stored on the radio-frequency identification tag; and write to the radio-frequency identification tag.

7G. The security system according to any of the previous aspects in this section, wherein the machine readable instructions further cause the computing device to provide an indoor map display of the building including an indication of the individual associated with the radio-frequency identification tag and an indication of the location of the individual within the building.

8G. The security system according to any of the previous aspects in this section, wherein the radio-frequency identification reader includes a plurality of radio-frequency identification readers dispersed throughout a building.

9G. A client computing device for providing a location of a visitor, the client computing device comprising: a radio-frequency identification tag configured to transmit a signal indicating identification information for the client computing device associated with a visitor for locating the visitor; an accelerometer configured to generate acceleration data indicative of acceleration of the client computing device; one or more processors; and a non-transitory computer-readable memory coupled to the one or more processors and storing machine readable instructions thereon that, when executed by the one or more processors, cause the client computing device to: obtain acceleration data from the accelerometer; determine, based on the acceleration data, that the radio-frequency identification tag has been removed from the visitor; and provide an alert indicating that the radio-frequency identification tag has been removed.

10G. The client computing device of claim 9G, wherein to determine that the radio-frequency identification tag has been removed from the visitor, the machine readable instructions further cause the client computing device to: compare the acceleration data from the accelerometer to a threshold acceleration; and determine that the radio-frequency identification tag has been removed from the visitor in response to determining that the acceleration data includes an acceleration above the threshold acceleration.

11G. The client computing device of claim 9G or claim 10G, wherein to determine that the radio-frequency identification tag has been removed from the visitor, the machine readable instructions further cause the client computing device to: train a machine learning model using (i) a plurality of sets of acceleration data for a plurality of users having a plurality of radio-frequency identification tags, and for each user, (ii) an indication of whether or not the user removed a corresponding radio-frequency identification tag; and apply the acceleration data from the accelerometer to the machine learning model to determine whether the radio-frequency identification tag has been removed from the visitor.

Section H

1H. A rechargeable power cell comprising: a primary battery configured to power a resistive load; a backup battery configured to selectively provide power to the primary battery cell; a direct to alternating current inverter configured to receive a direct electrical current from the backup battery, and convert the direct electrical signal to an alternating electrical signal; a generator configured to receive the alternating electrical signal from the director current to alternating current inverter, and further configured to generate an alternating electrical current signal; and an alternating to direct current rectifier configured to receive the generated alternating electrical current signal, convert the generated alternating electrical current signal to a direct current signal, and provide the converted direct current signal to the primary battery.

2H. The rechargeable power cell according to aspect 1H, wherein the primary battery comprises: a first power cell; and a second power cell.

3H. The rechargeable power cell according to any of the previous aspects in this section, wherein the backup battery comprises: a first power cell; and a second power cell.

4H. The rechargeable power cell according to any of the previous aspects in this section, further comprising a low dropout linear voltage regulator in electrical communication with the backup battery to regulate the electric current signal provided from the backup battery to the direct to alternating current inverter.

5H. The rechargeable power cell according to any of the previous aspects in this section, wherein the backup battery is configured to selectively provide power to the primary battery based on a current voltage value of the primary battery.

6H. The rechargeable power cell according to any of the previous aspects in this section, wherein the backup battery is configured to selectively provide power to the primary battery based on a current voltage value of a first power cell of the primary battery.

7H. The rechargeable power cell according to any of the previous aspects in this section, wherein the backup battery is configured to selectively provide power to the primary battery based on a current voltage of a second power cell of the primary battery.

8H. The rechargeable power cell according to any of the previous aspects in this section, wherein the backup battery is configured to selectively provide power to the primary battery based on a current voltage value of a first power cell, and a second power cell, of the primary battery.

9H. The rechargeable power cell according to any of the previous aspects in this section, wherein the backup battery is configured to provide power to the primary battery when the voltage of the primary battery voltage reaches a value below a threshold voltage.

Section I

1I. A method for presenting an indoor map display of a building during a dangerous event, the method comprising: in response to a dangerous event being detected, receiving, at one or more processors in a client device, indoor map data for a building, including information indicative of a floor layout of the building indicating a plurality of areas within the building and exits from the building; presenting, by one or more processors, an indoor map display of the building, based on the indoor map data; and for each of the plurality of areas within the building: receiving, at the one or more processors, an indication of a number of occupants within the area; and presenting, by the one or more processors, the indication of the number of occupants on a portion of the indoor map display corresponding to the area.

2I. The method according to aspect 1I, further comprising: for each of the plurality of areas, receiving, at the one or more processors, locations of each of the occupants within the area; and for each occupant, presenting, by the one or more processors, an indication of the occupant at a position within the indoor map display corresponding to the location of the occupant.

3I. The method according to any of the previous aspects in this section, wherein presenting an indication of the occupant includes presenting at the position within the indoor map display corresponding to the location of the occupant, by the one or more processors, identification information for the occupant.

4I. The method according to any of the previous aspects in this section, further comprising: transmitting, by the one or more processors, a request to receive updated information for a particular occupant; presenting, by the one or more processors, an indication of the particular occupant at a position within the indoor map display corresponding to the location of the particular occupant, including highlighting the indication of the particular occupant relative to the indications of other occupants.

5I. The method according to any of the previous aspects in this section, wherein the dangerous event is an active shooter event, and further comprising: receiving, at the one or more processors, a location of an active shooter; and presenting, by the one or more processors, an indication of the active shooter at a position within the indoor map display corresponding to the location of the active shooter.

6I. The method according to any of the previous aspects in this section, further comprising: determining, by the one or more processors, a location of a user of the client device; and presenting, by the one or more processors, an indication of the user at a position within the indoor map display corresponding to the location of the user.

7I. The method according to any of the previous aspects in this section, further comprising: determining, by the one or more processors, an exit from the building closest to the user; and presenting to the user in the indoor map display, by the one or more processors, an indication of the exit from the building.

8I. The method according to any of the previous aspects in this section, further comprising: presenting, by the one or more processors, an indication of a route from the location of the user to the exit.

9I. The method according to any of the previous aspects in this section, further comprising: presenting to the user, by the one or more processors, instructions based on the location of the user for handling the dangerous event.

10I. The method according to any of the previous aspects in this section, further comprising: identifying, by the one or more processors, a recommended entrance to the building that is more than a predetermined threshold distance from the danger zone; and presenting, by the one or more processors, an indication of the recommended entrance for emergency responders to enter the building.

11I. The method according to any of the previous aspects in this section, further comprising: receiving, by the one or more processors, location data for one or more occupants in need of emergency assistance; and presenting at respective positions within the indoor map display corresponding to the location data, by the one or more processors, indications of the one or more occupants in need of emergency assistance.

12I. The method according to any of the previous aspects in this section, further comprising: receiving, at the one or more processors, region data defining a danger zone within the building corresponding to locations within a predetermined threshold distance of the active shooter; and presenting on a corresponding portion of the indoor map display, by the one or more processors, an indication of the danger zone.

13I. The method according to any of the previous aspects in this section, wherein presenting an indication of the danger zone includes highlighting, by the one or more processors, the danger zone.

14I. The method according to any of the previous aspects in this section, wherein presenting an indoor map display of the building includes presenting, by one or more processors, the indoor map display including a plurality of floor layouts corresponding to a plurality of floors in the building; and further comprising: presenting, by the one or more processors, a user control for selecting one of the plurality of floor layouts to display; and in response to receiving a selection of the user control indicating a selected floor layout, adjusting a viewport of the indoor map display from an initial floor layout to the selected floor layout.

15I. The method according to any of the previous aspects in this section, wherein the plurality of areas include rooms and hallways.

16I. A client device for presenting an indoor map display of a building during a dangerous event, the client device comprising: a user interface; one or more processors; and a non-transitory computer-readable memory coupled to the one or more processors and the user interface and storing instructions thereon that, when executed by the one or more processors, cause the client device to perform the steps of any of the preceding claims in this section.

Section J

1J. A method for presenting during a dangerous event an outdoor map display of premises surrounding a building, the method comprising: in response to a dangerous event being detected, receiving, at one or more processors in a client device, a three-dimensional model of an exterior of a building and outdoor map data of building premises indicating a plurality of zones within the building premises and entrances to the building; presenting, by the one or more processors, an outdoor map display including the three-dimensional model of the exterior of the building and a layout of the building premises based on the outdoor map data; and for each of the plurality of zones within the building premises: receiving, at the one or more processors, an indication of a number of occupants within the zone; and presenting on a portion of the outdoor map display corresponding to the zone, by the one or more processors, the indication of the number of occupants.

2J. The method according to aspect 1J, further comprising: for each of the plurality of zones, receiving, at the one or more processors, locations of each of the occupants within the zone; and for each occupant, presenting at a position within the outdoor map display corresponding to the location of the occupant, by the one or more processors, an indication of the occupant.

3J. The method according to any of the previous aspects in this section, wherein presenting an indication of the occupant includes presenting at the position within the outdoor map display corresponding to the location of the occupant, by the one or more processors, identification information for the occupant.

4J. The method according to any of the previous aspects in this section, further comprising: transmitting, by the one or more processors, a request to receive updated information for a particular occupant; presenting at a position within the outdoor map display corresponding to the location of the particular occupant, by the one or more processors, an indication of the particular occupant including highlighting the indication of the particular occupant relative to the indications of other occupants.

5J. The method according to any of the previous aspects in this section, further comprising: determining, by the one or more processors, a location of a user of the client device; and presenting at a position within the outdoor map display corresponding to the location of the user, by the one or more processors, an indication of the user.

6J. The method according to any of the previous aspects in this section, further comprising: receiving, at the one or more processors, an indication of an entrance to the building for emergency responders to enter the building, which is away from a danger zone of the dangerous event occurring within the building; and presenting in the outdoor map display, by the one or more processors, an indication of the entrance.

7J. The method according to any of the previous aspects in this section, further comprising: determining, by the one or more processors, a current location of a user of the client device; and presenting, by the one or more processors, an indication of a route from the current location of the user to the entrance.

8J. The method according to any of the previous aspects in this section, further comprising: determining, by the one or more processors, a current orientation of the user; presenting, by the one or more processors, a three-dimensional model of the building premises from a viewpoint corresponding to the current location and current orientation of the user; and presenting within the three-dimensional model, by the one or more processors, the indication of the route from the current location to the entrance.

9J. A client device for presenting an outdoor map display of premises surrounding a building during a dangerous event, the client device comprising: a user interface; one or more processors; and a non-transitory computer-readable memory coupled to the one or more processors and the user interface and storing instructions thereon that, when executed by the one or more processors, cause the client device to perform the steps of any of the preceding claims in this section.

Section K

1K. A server device for generating an indoor map display of a building during a dangerous event, the server device comprising: one or more processors; and a non-transitory computer-readable memory coupled to the one or more processors and storing instructions thereon that, when executed by the one or more processors, cause the server device to: receive data from one or more multi-sensor devices in the building each having a respective detection area; identify a dangerous event based on the data; and in response to identifying the dangerous event: for each of a plurality of areas within the building, determine a number of occupants within the area based on the data; generate an indoor map display of the building including a floor layout indicating the areas within the building and exits from the building; for each of the plurality of areas, generate on a corresponding portion of the indoor map display an indication of the number of occupants within the area for display; and provide the indoor map display for presentation on a client device.

2K. The server device according to aspect 1K, wherein for each of the plurality of areas, the instructions further cause the server device to: determine locations of each of the occupants within the area based on the sensor data; and for each occupant, generate an indication of the occupant for display at a position within the indoor map display corresponding to the location of the occupant.

3K. The server device according to any of the previous aspects in this section 1, wherein to generate an indication of the occupant for display, the instructions cause the server device to: generate at the position within the indoor map display corresponding to the location of the occupant identification information for the occupant for display.

4K. The server device according to any of the previous aspects in this section, wherein the instructions further cause the server device to: receive, from the client device, a request to receive updated information for a particular occupant; verify that a user of the client device is authorized to receive location information for the particular occupant; in response to determining that the user of the client device is authorized to receive location information for the particular occupant, determine a location within the building of the particular occupant; and generate, at a position within the indoor map display corresponding to the location of the particular occupant, an indication of the particular occupant, wherein the client device highlights the indication of the particular occupant relative to the indications of other occupants.

5K. The server device according to any of the previous aspects in this section, wherein the dangerous event is an active shooter event, and the instructions further cause the server device to: determine a location of an active shooter based on the sensor data; and generate an indication of the active shooter for display at a position within the indoor map display corresponding to the location of the active shooter.

6K. The server device according to any of the previous aspects in this section, wherein the instructions further cause the server device to: identify a danger zone within the building corresponding to locations within a predetermined threshold distance of the active shooter; and generate an indication of the danger zone for display on a corresponding portion of the indoor map display.

7K The server device according to any of the previous aspects in this section, wherein the instructions further cause the server device to provide a dangerous event alert for display on the client device in response to detecting the dangerous event.

8K. The server device according to any of the previous aspects in this section, wherein to detect the dangerous event the instructions cause the server device to detect a fire or an active shooter in the building based on the sensor data.

9K. The server device according to any of the previous aspects in this section, wherein to generate an indoor map display of the building including a floor layout, the instructions cause the server device to generate an indoor map display including a plurality of floor layouts corresponding to a plurality of floors in the building and one or more user controls for selecting one of the plurality of floor layouts.

10K. A method comprising the steps of any of the preceding claims in this section.

Section L

1L. A server device for generating an outdoor map display of premises surrounding a building during a dangerous event, the server device comprising: one or more processors; and a non-transitory computer-readable memory coupled to the one or more processors and storing instructions thereon that, when executed by the one or more processors, cause the server device to: receive data from one or more multi-sensor devices on building premises each having a respective detection area; identify a dangerous event based on the data; and in response to identifying the dangerous event: for each of a plurality of zones within the building premises, determine based on the data a number of occupants within the zone; generate an outdoor map display including a three-dimensional model of an exterior of the building and a layout of the building premises; for each of the plurality of zones within the building premises, generate an indication of the number of occupants within the zone for display on a corresponding portion of the outdoor map display; and provide the outdoor map display for presentation on a client device.

2L. The server device according to aspect 1L, wherein for each of the plurality of zones, the instructions further cause the server device to: determine locations of each of the occupants within the zone based on the sensor data; and for each occupant, generate an indication of the occupant for display at a position within the outdoor map display corresponding to the location of the occupant.

3L. The server device according to any of the previous aspects in this section, wherein to generate an indication of the occupant for display, the instructions cause the server device to: generate identification information for the occupant for display at the position within the outdoor map display corresponding to the location of the occupant.

4L. The server device according to any of the previous aspects in this section, wherein the instructions further cause the server device to: receive, from the client device, a request to receive updated information for a particular occupant; verify that a user of the client device is authorized to receive location information for the particular occupant; in response to determining that the user of the client device is authorized to receive location information for the particular occupant, determine a location of the particular occupant within the building premises; and generate an indication of the particular occupant at a position within the outdoor map display corresponding to the location of the particular occupant, wherein the client device highlights the indication of the particular occupant relative to the indications of other occupants.

5L. The server device according to any of the previous aspects in this section, wherein the instructions further cause the server device to: determine a location of a user of the client device; and generate at a position within the outdoor map display corresponding to the location of the user an indication of the user.

6L. The server device according to any of the previous aspects in this section, wherein the instructions further cause the server device to: identify a danger zone within the building corresponding to locations within a predetermined threshold distance of the dangerous event; identify an entrance to the building for emergency responders to enter which is away from the danger zone; generate an indication of the entrance in the outdoor map display; and provide the indication of the entrance for display on the client device.

7L The server device according to any of the previous aspects in this section, wherein the instructions further cause the server device to: determine a current location of a user of the client device; generate an indication of a route from the current location of the user to the entrance; and provide the indication of the route for display on the client device.

8L. The server device according to any of the previous aspects in this section, wherein the instructions further cause the server device to: determine a current orientation of the user; generate a three-dimensional model of the building premises from a viewpoint corresponding to the current location and current orientation of the user; generate the indication of the route from the current to the entrance within the three-dimensional model; and provide the three-dimensional model of the building premises and the indication of the route for display on the client device.

9L. The server device according to any of the previous aspects in this section, wherein to detect the dangerous event the instructions cause the server device to detect a fire or an active shooter in the building based on the sensor data.

10L. A method comprising the steps of any of the preceding claims in this section.

Section M

1M. A method for broadcasting a notification of a dangerous event to an emergency responder device, the method comprising: periodically receiving, at one or more processors, location information for emergency responder devices within a predetermined threshold range of a building; identifying, by the one or more processors, a dangerous event within building premises; and in response to identifying the dangerous event within the building premises: identifying, by the one or more processors, a set of emergency responder devices currently within the predetermined threshold range of the building based on the received location information; and transmitting, by the one or more processors to each emergency responder device in the set of emergency responder devices, a notification indicating that the dangerous event has occurred within the building premises and including a location of the building premises.

2M. The method according to aspect 1M, further comprising: identifying, by the one or more processors, a plurality of Internet Protocol (IP) addresses for a plurality of emergency responder devices that are approved to communicate with the one or more processors; wherein periodically receiving location information includes periodically receiving, at the one or more processors, location information for emergency responder devices within the predetermined threshold range of the building having IP addresses that correspond to the identified plurality of IP addresses; and wherein transmitting the notification to each emergency responder device includes, for each emergency responder device in the set of emergency responder devices, transmitting, by the one or more processors, the notification to an IP address in the identified plurality of IP addresses that corresponds to the emergency responder device.

3M. The method according to any of the previous aspects in this section, wherein transmitting the notification includes transmitting, by the one or more processors, the notification indicating a type of the dangerous event.

4M. The method according to any of the previous aspects in this section, further comprising: identifying, by the one or more processors, a danger zone within the building corresponding to locations within a predetermined threshold distance of the dangerous event; and identifying, by the one or more processors, an entrance to the building for emergency responders to enter that is away from the danger zone; wherein transmitting the notification includes transmitting, by the one or more processors, the notification indicating the entrance to the building for the emergency responders to enter.

5M. The method according to any of the previous aspects in this section, wherein identifying the dangerous event includes: obtaining, by the one or more processors, sound data indicative of sound within the building from an acoustic sensor; obtaining, by the one or more processors, a heat signature from an object within the building from a thermal camera; and detecting, by the one or more processors, a gunshot in response to determining that the heat signature is above a threshold temperature and the sound is within a threshold noise level range.

6M. The method according to any of the previous aspects in this section, wherein identifying the dangerous event includes: obtaining from a thermal camera, by the one or more processors, a heat signature from an object within the building; and detecting, by the one or more processors, a fire in response to determining that the heat signature above is above a threshold fire temperature.

7M. The method according to any of the previous aspects in this section, wherein identifying the dangerous event includes: detecting, by the one or more processors, a gas leak based on chemical data from a gas sensor.

8M. The method according to any of the previous aspects in this section, wherein identifying the dangerous event includes: obtaining from a camera, by the one or more processors, image data for an object within the building; obtaining from a thermal camera, by the one or more processors, a heat signature from the object; detecting, by the one or more processors, a person by analyzing the image data to identify that the object includes features corresponding to a person, and analyzing the temperature data for the object to determine that the temperature data includes temperatures for the person that are within a body temperature range; and detecting, based on differences in temperature data within the object, by the one or more processors, a weapon attached to the person, wherein the differences in temperature data include temperatures outside of the body temperature range, which generate a heat signature corresponding to a weapon.

9M. A server device for broadcasting a notification of a dangerous event to an emergency responder device, the server device comprising: one or more processors; and a non-transitory computer-readable memory coupled to the one or more processors and storing instructions thereon that, when executed by the one or more processors, cause the server device to perform the steps of any of the preceding claims.

The invention claimed is:

1. A method for presenting an indoor map display of a building during a dangerous event, the method comprising:
in response to a dangerous event being detected, receiving, at one or more processors in a client device, indoor map data for a building, including information indicative of a floor layout of the building indicating a plurality of areas within the building and exits from the building;
presenting, by one or more processors, an indoor map display of the building, based on the indoor map data; and
for each of the plurality of areas within the building:
receiving, at the one or more processors, an indication of a number of occupants within the area determined via a multi-sensor device including an imaging camera and a thermal camera; and
presenting, by the one or more processors, the indication of the number of occupants on a portion of the indoor map display corresponding to the area, the indication identifying locations of each of the occupants within the portion of the indoor map display corresponding to the area.

2. The method of claim 1, further comprising:
for each of the plurality of areas, receiving, at the one or more processors, locations of each of the occupants within the area; and
for each occupant, presenting, by the one or more processors, an indication of the occupant at a position within the indoor map display corresponding to the location of the occupant.

3. The method of claim 2, wherein presenting an indication of the occupant includes presenting at the position within the indoor map display corresponding to the location of the occupant, by the one or more processors, identification information for the occupant.

4. The method of claim 2, further comprising:
transmitting, by the one or more processors, a request to receive updated information for a particular occupant; and
presenting, by the one or more processors, an indication of the particular occupant at a position within the indoor map display corresponding to the location of the particular occupant, including highlighting the indication of the particular occupant relative to the indications of other occupants.

5. The method of claim 1, wherein the dangerous event is an active shooter event, and further comprising:
receiving, at the one or more processors, a location of an active shooter; and
presenting, by the one or more processors, an indication of the active shooter at a position within the indoor map display corresponding to the location of the active shooter.

6. The method of claim 5, further comprising:
receiving, at the one or more processors, region data defining a danger zone within the building corresponding to locations within a predetermined threshold distance of the active shooter; and
presenting on a corresponding portion of the indoor map display, by the one or more processors, an indication of the danger zone.

7. The method of claim 6, further comprising:
identifying, by the one or more processors, a recommended entrance to the building that is more than a predetermined threshold distance from the danger zone; and
presenting, by the one or more processors, an indication of the recommended entrance for emergency responders to enter the building.

8. The method of claim 6, wherein presenting an indication of the danger zone includes highlighting, by the one or more processors, the danger zone.

9. The method of claim 1, further comprising:
determining, by the one or more processors, a location of a user of the client device; and
presenting, by the one or more processors, an indication of the user at a position within the indoor map display corresponding to the location of the user.

10. The method of claim 9, further comprising:
determining, by the one or more processors, an exit from the building closest to the user; and
presenting to the user in the indoor map display, by the one or more processors, an indication of the exit from the building.

11. The method of claim 10, further comprising:
presenting, by the one or more processors, an indication of a route from the location of the user to the exit.

12. The method of claim 9, further comprising:
presenting to the user, by the one or more processors, instructions based on the location of the user for handling the dangerous event.

13. The method of claim 1, further comprising:
receiving, by the one or more processors, location data for one or more occupants in need of emergency assistance; and
presenting at respective positions within the indoor map display corresponding to the location data, by the one or more processors, indications of the one or more occupants in need of emergency assistance.

14. The method of claim 1, wherein presenting an indoor map display of the building includes presenting, by one or more processors, the indoor map display including a plurality of floor layouts corresponding to a plurality of floors in the building; and further comprising:

presenting, by the one or more processors, a user control for selecting one of the plurality of floor layouts to display; and
in response to receiving a selection of the user control indicating a selected floor layout, adjusting a viewport of the indoor map display from an initial floor layout to the selected floor layout.

15. The method of claim 1, wherein the plurality of areas include rooms and hallways.

16. A client device for presenting an indoor map display of a building during a dangerous event, the client device comprising:
a user interface;
one or more processors; and
a non-transitory computer-readable memory coupled to the one or more processors and the user interface and storing instructions thereon that, when executed by the one or more processors, cause the client device to:
in response to a dangerous event being detected, receive indoor map data for a building, including information indicative of a floor layout of the building indicating a plurality of areas within the building and exits from the building;
present an indoor map display of the building, based on the indoor map data; and
for each of the plurality of areas within the building:
receive an indication of a number of occupants within the area determined via a multi-sensor device including an imaging camera and a thermal camera; and
present the indication of the number of occupants on a portion of the indoor map display corresponding to the area, the indication identifying locations of each of the occupants within the portion of the indoor map display corresponding to the area.

17. The client device of claim 16, wherein the instructions further cause the client device to:
for each of the plurality of areas, receive locations of each of the occupants within the area; and
for each occupant, present an indication of the occupant at a position within the indoor map display corresponding to the location of the occupant.

18. The client device of claim 17, wherein identification information for the occupant is presented at the position within the indoor map display corresponding to the location of the occupant.

19. The client device of claim 17, wherein the instructions further cause the client device to:
transmit a request to receive updated information for a particular occupant; and
present an indication of the particular occupant at a position within the indoor map display corresponding to the location of the particular occupant, including highlighting the indication of the particular occupant relative to the indications of other occupants.

20. The client device of claim 16, wherein the dangerous event is an active shooter event, and wherein the instructions further cause the client device to:
receive a location of an active shooter; and
present an indication of the active shooter at a position within the indoor map display corresponding to the location of the active shooter.

* * * * *